US007529705B1

(12) United States Patent
Bartels et al.

(10) Patent No.: US 7,529,705 B1
(45) Date of Patent: May 5, 2009

(54) ELECTRONIC TRADING SYSTEM FOR SIMULATING THE TRADING OF CARBON DIOXIDE EQUIVALENT EMISSION REDUCTIONS AND METHODS OF USE

(75) Inventors: Carlton Bartels, Staten Island, NY (US); Jane Bartels, legal representative, Staten Island, NY (US); Adam White, Atlanta, GA (US); Shelby White, legal representative, Atlanta, GA (US); Melissa Turnage, legal representative, Cockeysville, MA (US)

(73) Assignee: CantorCO2E, LLC, New York, NY (US)

( * ) Notice: Subject to any disclaimer, the term of this patent is extended or adjusted under 35 U.S.C. 154(b) by 569 days.

(21) Appl. No.: 09/967,272

(22) Filed: Sep. 28, 2001

Related U.S. Application Data

(60) Provisional application No. 60/313,842, filed on Aug. 21, 2001.

(51) Int. Cl.
*G06Q 40/00* (2006.01)
(52) U.S. Cl. .......................... 705/37; 705/35
(58) Field of Classification Search .................. 705/37, 705/80, 26, 35, 1, 500
See application file for complete search history.

(56) References Cited

U.S. PATENT DOCUMENTS

| 4,412,287 A | 10/1983 | Braddock, III ............ 364/408 |
| 4,674,044 A | 6/1987 | Kalmus et al. ............ 364/408 |
| 4,677,552 A | 6/1987 | Sibley, Jr. ................ 364/408 |
| 4,731,575 A | 3/1988 | Sloan |
| 4,750,119 A | 6/1988 | Cohen et al. |
| 4,903,201 A | 2/1990 | Wagner .................... 364/408 |
| 5,101,353 A | 3/1992 | Lupien et al. ............ 364/408 |
| 5,126,936 A | 6/1992 | Champion et al. ........ 364/408 |
| 5,237,507 A | 8/1993 | Chasek |
| 5,297,026 A | 3/1994 | Hoffman |
| 5,519,622 A | 5/1996 | Chasek |
| 5,532,928 A | 7/1996 | Stanczyk et al. |
| 5,621,654 A | 4/1997 | Cohen et al. |

(Continued)

FOREIGN PATENT DOCUMENTS

WO    WO 98/49639    11/1998

(Continued)

OTHER PUBLICATIONS

"The world's first markets for trading emissions credits . . . ," Dow Jones Business News, Oct. 17, 2000.

(Continued)

*Primary Examiner*—Hani Kazimi
*Assistant Examiner*—Daniel Kesack
(74) *Attorney, Agent, or Firm*—Glen R. Farbanish

(57) ABSTRACT

An electronic trading system for simulating the trading of carbon dioxide equivalent ($CO_2e$) emission reductions and methods of use are provided. An electronic trading application may allow a user to participate in an electronic trading simulation. An electronic trading application may allow a simulation administrator to modify parameters in connection with the electronic trading simulation in real-time. For example, the simulation administrator may be allowed to modify a real-time timeline for the electronic trading simulation, create and release a news announcement, or perform any other suitable modification in connection with the electronic trading simulation.

29 Claims, 37 Drawing Sheets

U.S. PATENT DOCUMENTS

| | | | |
|---|---|---|---|
| 5,664,112 | A | 9/1997 | Sturgeon et al. |
| 5,696,695 | A | 12/1997 | Ehlers et al. |
| 5,715,402 | A | 2/1998 | Popolo ..................... 395/237 |
| 5,726,884 | A | 3/1998 | Sturgeon et al. |
| 5,794,212 | A | 8/1998 | Mistr, Jr. |
| 5,799,151 | A * | 8/1998 | Hoffer ..................... 709/204 |
| 5,894,422 | A | 4/1999 | Chasek |
| 5,905,975 | A * | 5/1999 | Ausubel ..................... 705/37 |
| 5,915,244 | A | 6/1999 | Jack et al. |
| 5,924,486 | A | 7/1999 | Ehlers et al. |
| 5,930,773 | A | 7/1999 | Crooks et al. |
| 5,962,989 | A | 10/1999 | Baker |
| 6,021,398 | A * | 2/2000 | Ausubel ..................... 705/37 |
| 6,047,274 | A | 4/2000 | Johnson et al. ............ 705/412 |
| 6,058,379 | A * | 5/2000 | Odom et al. ................. 705/37 |
| 6,067,549 | A | 5/2000 | Smalley et al. |
| 6,115,698 | A | 9/2000 | Tuck et al. ................... 705/37 |
| 6,161,099 | A * | 12/2000 | Harrington et al. ........... 705/37 |
| 6,169,979 | B1 | 1/2001 | Johnson et al. |
| 6,233,566 | B1* | 5/2001 | Levine et al. ................ 705/37 |
| 6,243,691 | B1* | 6/2001 | Fisher et al. ................. 705/37 |
| 6,256,640 | B1 | 7/2001 | Smalley et al. |
| 6,285,989 | B1* | 9/2001 | Shoham ...................... 705/37 |
| 6,601,033 | B1* | 7/2003 | Sowinski ...................... 705/1 |
| 6,678,620 | B1 | 1/2004 | Tamai et al. |
| 6,709,330 | B1* | 3/2004 | Klein et al. ..................... 463/9 |
| 6,904,336 | B2 | 6/2005 | Raines et al. |
| 2001/0032168 | A1 | 10/2001 | Adamson et al. ............ 705/37 |
| 2001/0037278 | A1* | 11/2001 | Messmer et al. ............ 705/37 |
| 2001/0039530 | A1* | 11/2001 | Annunziata .................. 705/37 |
| 2001/0044751 | A1* | 11/2001 | Pugliese et al. .............. 705/26 |
| 2001/0049651 | A1* | 12/2001 | Selleck ......................... 705/37 |
| 2002/0035496 | A1 | 3/2002 | Fukushima et al. |
| 2002/0040356 | A1 | 4/2002 | Gluck et al. |
| 2002/0143693 | A1* | 10/2002 | Soestbergen et al. .......... 705/37 |
| 2002/0178047 | A1 | 11/2002 | Or et al. |
| 2002/0188459 | A1* | 12/2002 | Erickson ......................... 705/1 |
| 2003/0055665 | A1 | 3/2003 | Fleming |
| 2003/0083980 | A1* | 5/2003 | Satake ......................... 705/37 |
| 2003/0085179 | A1 | 5/2003 | Kim et al. |
| 2003/0101062 | A1 | 5/2003 | Taber, Jr. |
| 2003/0110116 | A1 | 6/2003 | Inubushi |
| 2003/0229572 | A1 | 12/2003 | Raines et al. |
| 2004/0088179 | A1 | 5/2004 | Cogen et al. |

FOREIGN PATENT DOCUMENTS

| | | |
|---|---|---|
| WO | WO 02/037433 | 5/2002 |
| WO | WO 03/058385 | 7/2003 |
| WO | WO 03/058386 | 7/2003 |

OTHER PUBLICATIONS

"Cantor Fitzgerald and PricewaterhouseCoopers to Create Global Hub of Carbon Commerce: Market to be Powered by B2B Leader, eSpeed," Business Wire, Oct. 17, 2000.
"Cantor Fitzgerald and PricewaterhouseCoopers to Create Global Hub of Carbon Commerce: Market to be Powered by B2B Leader, eSpeed," Press Release, Oct. 17, 2000.
John J. Fialka, "New Emission-Credits Market is Expected To Resemble Fast Commodity Exchange," The Wall Street Journal, Oct. 17, 2000.
"EU Introduces 10-Year Environment Plan," Reuters, Oct. 17, 2000 as published by EIN Publishing Daily Newsletter "Global Warming Today," dated Oct. 26, 2000.
"Cantor Fitzgerald, PWC Join on GHG Trading," Business Wire, Oct. 17, 2000 as published by EIN Publishing Daily Newsletter "Global Warming Today," dated Oct. 26, 2000.
Jason T. Cone, "Trading greenhouse gas emissions goes online," Earth Times News Service, Oct. 18, 2000.
"Want to Trade in Carbon Emission Credits? CO2e.com Is the Answer!", EarthDot, Oct. 18, 2000.

"Emissions Trading Site Launched; CO2e.com: Brief Article," Energy Intelligence Group, Oct. 18, 2000.
Andrew C. Revkin, "7 Companies Agree to Cut Gas Emissions," The New York Times, Oct. 18, 2000.
"Cantor and PricewaterhouseCoopers Develop On-line Greenhouse Market," The Oil Daily, Oct. 20, 2000.
"Cantor and PricewaterhouseCoopers Develop On-line Greenhouse Market," Utility Environment Report, Oct. 20, 2000.
"CSU Study to Examine Carbon Sequestration," CSU-Chico Release, Oct. 23, 2000 as published by EIN Publishing Daily Newsletter "Global Warming Today," dated Oct. 26, 2000.
"CO2 May Cause Ragweed to Increase," M2 Communications, EIN Publishing, Oct. 24, 2000 as published by EIN Publishing Daily Newsletter "Global Warming Today," dated Oct. 26, 2000.
"CO2e.com—The Global Hub for Carbon Commerce," Environmental Finance Supplement, Oct. 2000.
Cheryl A. McMullen, "Web site fosters emissions trading," Waste News, Nov. 6, 2000.
Janet Ginsburg, "Letting the Free Market Clear the Air," Waste News, Nov. 6, 2000.
Eric Sorenson, "Washington State Researchers Monitor Forests to Help Save Environment," The Seattle Times, Nov. 13, 2000.
"CO2e.com, the Global Hub for Carbon Commerce, Goes Live at COP6 Climate Conference," Business Week, Nov. 14, 2000.
Vanessa Houlder, "Business sees green controls as a prospect, not just a cost," Financial Times, Nov. 18, 2000.
"BT Moves to Halt Brain Drain," The Sunday Telegraph, Nov. 18, 2000.
Mary Fagan, "PwC to launch online CO2 exchange," Electronic Telegraph, Nov. 19, 2000.
Michael Harrison, "Row Mars Launch of Online Market for Trading Greenhouse Gas 'Permits'," The Sunday Telegraph (London), Nov. 19, 2000.
"PwC/Greenhouse gases ING Group," The Sunday Telegraph, Nov. 19, 2000.
Mary Fagan, "PwC to launch online $CO^2$ exchange," The Sunday Telegraph, Nov. 19, 2000.
"Greenhouse emissions trading site opens on internet," Platt's Commodity News, Nov. 20, 2000.
Michael Harrison, "Row mars launch of online market," The Independent, Nov. 20, 2000.
"What the Sunday Business Papers Said," The Independent (London), Nov. 20, 2000.
Steve Levine, "Ex-Soviet States See Gold in Emission Quotas," Wall Street Journal Europe, Nov. 20, 2000.
"PwC launches internet emissions trading bourse," Reuters, Nov. 20, 2000.
"Global Marketplace for Carbon Commerce Opens for Business," Press Release, Nov. 20, 2000.
"CO2e.com Announces the Completion of Two Significant Trades," Press Relase, Nov. 20, 2000.
Steve Levine, "Decline in Industry Proves Profitable for Soviet Plants," Wall Street Journal, Nov. 21, 2000.
"Consultants PricewaterhouseCoopers and financial brokers Cantor Fitzgerald have launched a global Internet exchange for trading greenhouse gas emissions," ZD Net Australia, Nov. 21, 2000.
"Ontario Power Generation buys carbon credits," Megawatt Daily, Nov. 21, 2000.
"Canadian group agrees to CO2 reduction deal," Megawatt Daily, Nov. 21, 2000.
Yasmin D. Arquiza, "Meet tackles effect of climate change on environment," Business World (Philippines), Nov. 22, 2000.
Simon Mann, "Pollution traders ready to clean up," The Sydney Morning Herald, Nov. 23, 2000.
Simon Mann, "Business—Clearing the air on trade in CO2," The Age, Nov. 23, 2000.
"Estonia could earn billions with greenhouse gases," Estonian News Agency, Nov. 23, 2000.
"PwC reveals CO2.com exchange," Accountancy Age website, Nov. 23, 2000.
"Houston: we have carbon trading," Utility Week, Nov. 24, 2000.
Nick Hordern, "Global warming: the greens have the numbers," Financial Review (UK), Nov. 25, 2000.

Nick Hordern, "Industry breathes easier, for now," Australian Financial Review, Nov. 27, 2000.
"Petro Source Logs CO2 Trades," The Oil Daily Co., Nov. 27, 2000.
"Online trading—emissions," European Chemical News, Nov. 27, 2000.
Wade O'Leary, "Online greenies—Bottom of the Harbour," The Daily Telegraph, Nov. 27, 2000.
"E-exchange continue to trade pollution allowances," http://www.silicon.com, Nov. 28, 2000.
"Global law firm Baker & McKenzie . . . ," AAP News Feed, Nov. 28, 2000.
Caspar Henderson, "An exchange in climate," Director, Jan. 2001.
"EU maps out $CO_2$ strategy," Steel Times, Mar. 2001.
Roger Milne, "UK and Denmark mull carbon trade linkage," Reed Business Information (UK), May 4, 2001.
Cait Murphy, "First/Opinion/Slings and Arrows—Kyoto is Bush-Whacked—That's okay," Fortune, May 14, 2001.
Robin Lancaster, "Carbon goes dotcom," Energy Power Risk Management, May 2001.
Germana Canzi, "Greenhouse Gas Mkt Set to Double in 2001," Dow Jones Newswires, Jul. 20, 2001.
Paul Brown, "UK may take lead in carbon trading," Guardian, Jul. 24, 2001.
Vanessa Houlder, "Carbon trading plans may be hampered by the politics of pollution," Financial Times, Aug. 14, 2001.
Laurent Belsie, "Firms climb toward 'climate neutral' Boldest bids to cut emissions now being led by some big polluters of yore," Christian Science Monitor, Aug. 20, 2001.
"Greenhouse Gas Trading Simulations an Essential Tool," Carbon Monitor, vol. 6, Issue 9, Sep. 2001.
"The Climate for Business is Changing," Environmental Finance Supplement, Oct. 2001.
Ron Feemster, "Don't like emissions? Trade 'em under Kyoto," undated.
Chinn, Lily N., "Can the Market Be Fair and Efficient? An Environmental Justice Critique of Emissions Trading", 26 Ecology L.Q. 80 (1999).
Driesen, David, "Is Emissions Trading An Economic Incentive Program?: Replacing The Command And Control/Economic Incentive Dichotomy", 55 Wash. & Lee L. Rev. 289 (1998).
Gorrell, M., "Taking Pollution To The 'Bank' Pays Dividends Program Offers Utah Firms A Reward For Cleaning Up", The Salt Lake Tribune, May 29, 1995, at D3.
Holly, Chris, "EC Moves On Greenhouse Emissions Trading Plan", The Energy Daily, 28 (53), Mar. 2000.
Jarman, M., "Utilities Set For Pinch In Resources", The Arizona Republic, Dec. 2000, at B1.
Pallasch, Abdon M., "City To Receive Millions From HUD To Reclaim Brownfields; 5 Industrial Locations Expected To Attract New Factories, Jobs", Chi. Trib., Nov. 17, 1998, at 5.
Porter, N., "Legislators Begin Emissions Talks Resolution Sought To Untangle Conflict", Bangor Daily News, Aug. 4, 1994.
Rosenfeld, Arthur, et al., "Policies To Reduce Heat Islands: Magnitudes Of Benefits And Incentives To Achieve Them", Proceedings of the ACEEE Summer Study on Energy Efficiency in Buildings, vol. 9 (1996) at 177.
"Cold Facts On Hot Topic", The Calgary Sun, Nov. 18, 2000, at SE3.
"EPSA Says California Discourages Generators", Generation Week, 2 (44), Nov. 1, 2000.
"EPSA: Don't Exclude New Plants From NOx Trading", The Electricity Daily, 9 (108), Dec. 5, 1997.
"Green Power Is Too Gray", Electrical World, 211 (5), May 1997, at 44.
"Climate Change: A Backgrounder; Petroleum Communication Foundation", Oilweek, 45 (46), Nov. 14, 1994, at S1.
"Indiana House Passes Bill Allowing Pre-Approval Of Compliance Costs", Utility Environment Report, Apr. 19, 1991, at 3.
"SCAQMD Proposes Adding Natural Gas Cuts To Its Reclaim Trading Program", Utility Environment Report, May 27, 1994, at 9.
"Waffling On Warming: Canada Has No Clear Policy On Climate Change", Calgary Herald, Mar. 2, 1998, at A16.
California Energy Commission, "1999 Electricity Generation Emissions Report", Jul. 1999.
"Green Light", The National Journal, 25 (24), Jun. 12, 1993, at 1421.
"Canada's first greenhouse gas emission reduction exchange opens," Oil and Gas Inquirer v12:7, Jul. 2000, at 40-41.
Colton et al "Keys to Successful Carbon Dioxide Market: Program Structure and Secondary Trading," Energy Efficiency and Global Environment—Biennial Conference, 1995, at 61-74.
U.S. Appl. No. 09/967,375, entitled "Systems and Methods for Electronic Trading of Carbon Dioxide Equivalent Emission Reductions", filed Sep. 28, 2001 in the name of Carlton Bartels et al.,.
U.S. Appl. No. 11/204,825, entitled "Systems and Methods for Electronic Trading of Carbon Dioxide Equivalent Emission Reductions", filed Aug. 16, 2005 in the name of Carlton Bartels et al.,.
U.S. Appl. No. 10/824,954, entitled "Systems and Methods for Trading Emission Reduction Benefits", filed Apr. 14, 2004 in the name of Stephen Drummond et al.,.
USPTO Office Action for U.S. Appl. No. 10/824,954, filed Jan. 23, 2008, 35 pp.
USPTO Office Action for U.S. Appl. No. 10/824,954, filed Sep. 3, 2008, 11 pp.
USPTO Office Action for U.S. Appl. No. 09/967,375, filed Nov. 7, 2003, 7 pp.
USPTO Office Action for U.S. Appl. No. 09/967,375, filed May 18, 2004, 6 pp.
USPTO Office Action for U.S. Appl. No. 09/967,375, filed Sep. 28, 2005, 7 pp.
USPTO Office Action for U.S. Appl. No. 09/967,375, filed Mar. 9, 2006, 7 pp.
USPTO Examiner Interview Summary Record, for U.S. Appl. No. 09/967,375, filed May 11, 2006, 3 pp.
USPTO Examiner Interview Summary Record, for U.S. Appl. No. 09/967,375, filed Dec. 13, 2005, 2 pp.
EIN Publishing Daily Newsletter "Global Warming Today", dated Oct. 26, 2000.

* cited by examiner

CO2e.COM

THE GLOBAL HUB FOR CARBON COMMERCE

CANTOR FITZGERALD
IN ASSOCIATION WITH
PRICEWATERHOUSECOOPERS

HOME | TRADING | CO2e STRATEGIES | TOOLS | NEWS & INSIGHTS | MEMBERSHIP

LOG ON
FAQS
GLOSSARY

SEARCH
ABOUT US
CONTACT US
POLICIES

LOG ON OR REGISTER

WELCOME TO CO2E.COM.
IF YOU ARE ALREADY A TRADING MEMBER OR A VIRTUAL TRADER, PLEASE ENTER YOUR USERNAME AND PASSWORD BELOW.

USERNAME: _____ 302
PASSWORD: _____ 304

( LOG ON ) 306

BECOME A TRADING MEMBER

IF YOU WOULD LIKE TO REGISTER AS A TRADING MEMBER OR A VIRTUAL TRADER FOR TRADING SIMULATIONS, CLICK BELOW.

( TRADING MEMBER ) 308

LOG ON HELP

I HAVE FORGOTTEN MY USERNAME  } 310
I HAVE FORGOTTEN MY PASSWORD

COPYRIGHT ©2001 CO2E.COM LLC. ALL RIGHTS RESERVED.    BACK TO TOP ▲

CO2e.COM — THE GLOBAL HUB FOR CARBON COMMERCE

CANTOR FITZGERALD IN ASSOCIATION WITH PRICEWATERHOUSECOOPERS

HOME | TRADING | CO2e STRATEGIES | TOOLS | NEWS & INSIGHTS | MEMBERSHIP

BUSINESS TOOLS
INTERNAL MARKETS
TRADING SIMULATIONS
CORPORATE TRADING SESSIONS

LOG OUT
SEARCH
ABOUT US
CONTACT US
POLICIES

TRADING SIMULATION

BECOME A VIRTUAL TRADER

SELECT THE COMPANY THAT YOU WOULD LIKE TO ROLE-PLAY-INVESTIGATE YOUR INTERNAL EMISSION ABATEMENT CURVES AND BUSINESS-AS-USUAL EMISSIONS FORECASTS - ENGAGE THE TRADING ENGINE - AND TRADE AWAY ON CO2e.COM'S ONLINE TRADING SIMULATION.

THIS SIMULATION IS INTERNET-DELIVERED TO YOU BY CO2e.CM AND POWERED BY ESPEED – THE INSTITUTIONAL TRADING ENGINE THAT MANAGES THE EXCHANGE OF US$150 BILLION IN GLOBAL COMMODITIES AND GOVERNMENT SECURITIES DAILY.

THE TRADING SIMULATION IS DESIGNED TO DEVELOP AN UNDERSTANDING OF THE OPERATION OF A MORE COMMODITISED CARBON MARKET AND DETERMINE HOW POLICY DECISIONS MAY IMPACT THIS EMERGING MARKETPLACE.

NO PUBLIC SIMULATIONS ARE CURRENTLY SCHEDULED. PLEASE CONSULT THIS PAGE REGULARLY FOR UPDATES. CLICK HERE TO RUN THE SIMULATION (IF A SIMULATION IS SCHEDULED OR CURRENTLY RUNNING).

NOTE: THE TRADING SIMULATION HAS BEEN TUNED FOR THE MICROSOFT INTERNET EXPLORER BROWSER, VERSION 5.0 AND HIGHER. PLEASE USE ONLY THIS BROWSER CONFIGURATION TO ACCESS THE SIMULATION.

TRADING SIMULATION PROVIDES

AN INTERACTIVE SIMULATION THAT MODELS THE IMPACTS OF KEY POLICY DECISIONS THAT ARE CURRENTLY IN THE REGULATORY DEBATE

A WINDOW INTO THE POSSIBLE FUTURE OF THE CO2e TRADING MARKET

A SIMULATION THAT IS EQUALLY ENGAGING TO CARBON-CONSTRAINED CORPORATE INTERESTS, CARBON REDUCTIONS/OFFSET SUPPLIERS, EMISSION TRADERS, CONSULTANTS AND ADVISORS - NOVICES AND EXPERTS ALIKE.

HOWEVER, THE CO2e TRADING SIMULATION DOES NOT PROVIDE EITHER A CONCLUSIVE PREDICTION OF THE CLEARING PRICE OF CARBON, OR AN ANALYSIS OF THE MACRO-ECONOMIC IMPACTS OF THE KYOTO FLEXIBILITY MECHANISMS.

WITH A CLEAR UNDERSTANDING OF THE INTENT OF THIS TOOL - ENJOY THE GAME - AND MAY THE BEST TRADER WIN! TO PARTICIPATE IN THE TRADING SIMULATION, YOU MUST BE REGISTERED AS A CO2e.COM TRADING MEMBER OR VIRTUAL TRADER.

CLICK HERE TO REVIEW YOUR CO2e.COM REGISTRATION OPTIONS.

FIG. 8

ABOUT THE SIMULATION

THE CO2e.COM TRADING SIMULATION IS A PLATFORM TO LEARN ABOUT THE OPERATION OF A MORE COMMODITISED CARBON MARKET, AND THE POTENTIAL IMPLICATIONS OF MAJOR POLICY DECISIONS ON THIS EMERGING MARKETPLACE. IT REPRESENTS A SIMPLIFIED MODEL OF HOW INTERNATIONAL OR DOMESTIC CARBON TRADING MIGHT DEVELOP. THE SIMULATION COMBINES MANY OF THE KEY ELEMENTS OF EMERGING POLICY WITH SOPHISTICATED TRADING TECHNOLOGY FROM ONE OF WALL STREET'S FASTEST GROWING B2B ELECTRONIC SOLUTION PROVIDER, eSPEED INC., TO CREATE A HIGHLY USABLE, ENJOYABLE AND INSTRUCTIVE SIMULATION.

BROAD ASSUMPTIONS

SEVERAL KEY ASSUMPTION HAVE BEEN MAKE IN THE DESIGN OF CO2e.COM'S TRADING SIMULATION.

- THE SIMULATED TRADING REGIME IS ONE THAT COULD BE ESTABLISHED BY AN INTERNATIONAL INTERPRETATION OF THE KYOTO PROTOCOL, WITH OR WITHOUT AN ADVANCED DOMESTIC TRADING ENVIRONMENT
- ALL CREDIT TYPES ARE FULLY DEFINED AND TRANSFERABLE ACROSS INTERNATIONAL BOUNDARIES
- PARTICIPANTS IN NON-ANNEX B COUNTRIES CAN SELL AND BUY CREDITS

IT IS IMPORTANT TO RECOGNIZE THESE ASSUMPTIONS BEFORE ENGAGING THE SIMULATION.

SIMULATION ELEMENTS

FOUR DIFFERENT TYPES OF ENTITIES PARTICIPATE IN THE SIMULATION, EACH WITH DIFFERENT CHARACTERISTICS AND GOALS.

BUYERS FACE CAPS ON THEIR CARBON DIOXIDE EQUIVALENT (CO2e) EMISSIONS AND MUST UNDERTAKE INTERNAL ACTIONS AND MAY ENGAGE IN TRADING TO COMPLY WITH EMISSIONS TARGETS AT THE LEAST COST AND AVOID COMPLIANCE PENALTIES.

SUPPLIERS ARE CAPABLE OF PRODUCING JOINT IMPLEMENTATION (JI) OR CLEAN DEVELOPMENT MECHANISM (CDM) CREDITS AND ATTEMPT TO MAXIMISE PROFIT FROM THE SALE OF THESE CREDITS.

TRADERS TAKE SPECULATIVE POSITIONS IN THE MARKET FOR PROFIT THROUGH THE CAREFUL ANALYSIS OF LATE-BREAKING NEWS AND THE OBSERVATION OF MARKET BEHAVIOUR. TRADERS ADD LIQUIDITY TO THE MARKET.

NGOS SEEK TO ACHIEVE THE GREATEST ENVIRONMENTAL "GOOD" AT THE LEAST ECONOMIC COST BY PURCHASING AND HOLDING ON TO CREDITS FOR ULTIMATE RETIREMENT WITH LIMITED ECONOMIC RESOURCES.

THE PARTICIPANTS ARE LOCATED IN ONE OF THREE FICTITIOUS COUNTRIES. NARNIA AND UTOPIA ARE BOTH ANNEX B (CAPPED) NATIONS. THE BUYERS AND TRADERS ARE EXCLUSIVELY LOCATED IN THESE COUNTRIES. THE SINGLE NON-ANNEX B COUNTRY, GONDWANA, IS HOME TO ROUGHLY TWO-THIRDS OF THE SUPPLIERS, WITH THE REST LOCATED IN THE CAPPED NATIONS.

BUYERS ARE ASSIGNED EMISSIONS ALLOWANCES (EAs) AFTER A DEFINED "ANNOUNCEMENT YEAR" FOR USE DURING THE COMMITMENT PERIOD. EAs ARE TRADEABLE. INTERNAL REDUCTIONS (IRs) ARE CREATED BY BUYERS UNDERTAKING EMISSION REDUCTION OR SEQUESTRATION PROJECTS INTERNALLY; THESE REDUCTIONS ARE NOT TRADEABLE.

SUPPLIERS CREATE CDM OR JI CREDITS, DEPENDING ON THE JURISDICTIONS IN WHICH THEY ARE LOCATED. CREDITS ARE DISTINGUISHED BY VINTAGE (YEAR) AND WHILE CREDITS MAY BE BANKED FOR FUTURE USE (DEPENDING ON THE PARTICULAR "RULES" OF EACH CREDIT TYPE), THEY MAY NOT BE BORROWED FOR PRIOR YEAR COMPLIANCE.

FIG. 10

ORGANISATION REVIEW
US DEMO

THE DETAILS OF YOUR SELECTED ORGANISATION ARE OUTLINED BELOW.

NOTE: REFER TO YOUR CURRENT STATUS AFTER EACH ROUND TO ENSURE THAT YOU REMAIN SOLVENT. INSOLVENT, OR BANKRUPT PARTICIPANTS WILL NOT BE PERMITTED TO CONTINUE WITH THE SIMULATION.

ORGANISATION INFORMATION

| | |
|---|---|
| ORGANISATION NAME | LAURA'S CEMENT CO. |
| TYPE | BUYER |
| CURRENT STATUS | SOLVENT |
| COUNTRY | UTOPIA |
| ANNUAL CASH ALLOWANCE | US$ 1,000,000/YEAR |
| BORROWING LIMIT | US$ 10,000,000 |
| CREDIT TYPE(S) CREATED | IR-INTERNAL REDUCTIONS |
| DESCRIPTION | INDUSTRIAL NRG, INC. OWNS AND OPERATES A SINGLE-CYCLE GAS POWER GENERATION FACILITY IN SOUTH CENTRAL NARNIA. |

(SEE POSITION DATA)

ORGANISATION
POSITION
ORIGINATE
TRADE
NEWS
REPORTING
TIMELINE
DEMO
LOG OUT

ABOUT THE SIMULATION

COPYRIGHT ©2001 CO2e.COM LLC. ALL RIGHTS RESERVED.

BACK TO TOP

FIG. 13

ORIGINATE
US DEMO

THE ORIGINATION UTILITY IS PROVIDED TO ALLOW PARTICIPANTS TO GENERATE CREDITS (FOR SUPPLIERS) OR INTERNAL REDUCTIONS (IRs) (FOR BUYERS).

TO ORIGINATE CREDITS OR IRs, PLEASE TAKE THE FOLLOWING SIMPLE STEPS:

① INPUT THE TOTAL AMOUNT OF TONNES THAT YOU WOULD LIKE TO PRODUCE OVER THE 10-YEAR LIFESPAN OF YOUR PROJECT IN THE 'TOTAL VOLUME' FIELD BELOW
② CLICK 'CALCULATE' TO DETERMINE THE TOTAL COST FOR THIS ORIGINATION (TOTAL COST IS A FUNCTION OF YOUR ORGANISATION'S MARGINAL ABATEMENT/SUPPLY COST CURVE)
③ CLICK 'ACCEPT' (ONLY ONCE) IF YOU WISH TO ORIGINATE THE CREDITS OR IRs, OR 'CANCEL' TO RESET THE ORIGINATION UTILITY

REMEMBER: THE TOTAL VOLUME OF CREDITS OR IRs WILL BE SPREAD OVER THE LIFESPAN OF YOUR PROJECT (10 YEARS), SO 1/10TH OF THE TOTAL VOLUME AMOUNT WILL BE ASSIGNED TO EACH YEAR. IF THE ORIGINATION REACHES PAST THE END OF THE COMMITMENT PERIOD, THE CREDITS OR IRs WILL BE ASSIGNED AS 'POST 2012' TONNES AND WILL BE VALUED AS AN ASSET AT THE END OF THE SIMULATION.

ORGANISATION    COMPLIANCE TESTER - 3
ISSUE CLASS     IR
PROJECT TYPE    INTERNAL REDUCTIONS (INT)
TOTAL VOLUME    [100000] TONNES OVER 10 YEARS
                (IN BLOCKS OF 100,000)
TOTAL COST      US$ 100,000.00

CALCULATE   ACCEPT   CANCEL

MARGINAL ABATEMENT/SUPPLY COST
VOLUME FROM   0        100,000  200,000  300,000  400,000  500,000  600,000  700,000  800,000  900,000  1,000,000 1,100,000 1,200,000 1,300,000
VOLUME TO     100,000  200,000  300,000  400,000  500,000  600,000  700,000  800,000  900,000  1,000,000 1,100,000 1,200,000 1,300,000 1,400,000
US$ PER TONNE $1.00    $1.00    $1.00    $1.00    $1.00    $1.00    $1.00    $1.00    $1.00    $1.00    $1.00     $1.00     $1.00     $1.00

GRAPH

TOTAL ORIGINATED   0

FOR A MORE DETAILED DEFINITION OF THE ORIGINATION PROCESS, SEE THE ORIGINATION DESCRIPTION>>.

ORGANISATION
POSITION
ORIGINATE
TRADE
NEWS
REPORTING
TIMELINE
DEMO
LOG OUT

ABOUT THE SIMULATION

POSITION REVIEW
US DEMO  1502

| ORGANISATION | | | | | | | | | | | | |
|---|---|---|---|---|---|---|---|---|---|---|---|---|
| POSITION | LATE BREAKING NEWS... PLEASE CHECK THE NEWS PAGE FOR FURTHER DETAILS. HISTORIC AND REAL-TIME POSITIONS FOR YOUR ORGANIZATION ARE PLOTTED BELOW. CHART YOUR POSITION BY SELECTING THE GRAPH OPTION (BUYERS AND SUPPLIERS ONLY). | | | | | | | | | | | |
| ORIGINATE | RETURN TO THIS PAGE FREQUENTLY DURING THE SIMULATION TO KEEP TRACK OF YOUR CHANGING POSITION DATA. REFRESH THIS PAGE PERIODICALLY TO UPDATE YOUR POSITION INFORMATION. | | | | | | | | | | | |
| TRADE | | | | | | | | | | | | |
| NEWS | FOR A DETAILED DEFINITION OF THE POSITIONS DATA BELOW, SEE THE DATA DESCRIPTIONS>>. | | | | | | | | | | | |
| REPORTING | SEE ORGANIZATION DATA | | | | | | | | | | | |
| TIMELINE | CURRENT CASH POSITION  US $ 3,000,000 | | | | | | | | | | | |

EMISSIONS AND REDUCTIONS

| | PRE-CP AGGREGATION | 2003 | 2004 | 2005 | 2006 | 2007 | 2008 | 2009 | 2010 | 2011 | 2012 | POST 2012 |
|---|---|---|---|---|---|---|---|---|---|---|---|---|
| BUSINESS-AS-USUAL EMISSIONS (BAU) | 1,000,000 | 500,000 | 500,000 | 500,000 | 500,000 | 500,000 | 500,000 | 500,000 | 500,000 | 500,000 | 500,000 | |
| INTERNAL REDUCTIONS PRODUCED (IRs) | – | – | – | – | – | – | – | – | – | – | – | |
| ACTUAL EMISSIONS (BAU-IRs) | 1,000,000 | 500,000 | 500,000 | 500,000 | 500,000 | 500,000 | 500,000 | 500,000 | 500,000 | 500,000 | 500,000 | |

CREDITS

| | PRE-CP AGGREGATION | 2003 | 2004 | 2005 | 2006 | 2007 | 2008 | 2009 | 2010 | 2011 | 2012 | POST 2012 |
|---|---|---|---|---|---|---|---|---|---|---|---|---|
| EA | | 300,000 | 300,000 | 300,000 | 300,000 | 300,000 | 300,000 | 300,000 | 300,000 | 300,000 | 300,000 | |
| TOTAL | 0 | 300,000 | 300,000 | 300,000 | 300,000 | 300,000 | 300,000 | 300,000 | 300,000 | 300,000 | 300,000 | |

COMPLIANCE CALCULATOR

| | PRE-CP AGGREGATION | 2003 | 2004 | 2005 | 2006 | 2007 | 2008 | 2009 | 2010 | 2011 | 2012 | CP TOTALS |
|---|---|---|---|---|---|---|---|---|---|---|---|---|
| ACTUAL EMISSIONS (BAU-IRs) | 1,000,000 | 500,000 | 500,000 | 500,000 | 500,000 | 500,000 | 500,000 | 500,000 | 500,000 | 500,000 | 500,000 | 5,000,000* |
| CREDIT HELD AFTER BANKING | – | 300,000 | 300,000 | 300,000 | 300,000 | 300,000 | 300,000 | 300,000 | 300,000 | 300,000 | 300,000 | 3,000,000 |
| COMPLIANCE REQUIREMENT | – | 200,000 | 200,000 | 200,000 | 200,000 | 200,000 | 200,000 | 200,000 | 200,000 | 200,000 | 200,000 | 2,000,000** |

ABOUT THE SIMULATION

*FIG. 16*

SIMULATION TIMELINE

US DEMO — 1704

00:00:11 TIME REMAINING IN CURRENT ROUND

CO2e.COM'S TRADING SIMULATIONS ARE DEPLOYED GLOBALLY, BUT THE TECHNOLOGY IS SEATED ON THE 103RD FLOOR OF NEW YORK CITY'S WORLD TRADE CENTER. THE SEVER TIME LISTED BELOW, IS WALL STREET TIME.

CURRENT SERVER TIME 6/14/01 11:49 — 1706

| SESSION | START TIME | END TIME | STATUS |
|---|---|---|---|
| REGISTRATION | 6/14/01 10:50 | 6/14/01 11:00 | COMPLETED |
| ANALYSIS | 6/14/01 11:00 | 6/14/01 11:05 | COMPLETED |
| TRADE (2001-2002) | 6/14/01 11:05 | 6/14/01 11:15 | COMPLETED |
| ANALYSIS | 6/14/01 11:15 | 6/14/01 11:20 | COMPLETED |
| TRADE (2003-2004) | 6/14/01 11:20 | 6/14/01 11:30 | COMPLETED |
| ANALYSIS | 6/14/01 11:30 | 6/14/01 11:35 | COMPLETED |
| TRADE (2005-2006) | 6/14/01 11:35 | 6/14/01 11:40 | COMPLETED |
| ANALYSIS | 6/14/01 11:40 | 6/14/01 11:45 | COMPLETED |
| TRADE (2007-2008) | 6/14/01 11:45 | 6/14/01 11:50 | COMPLETED |
| RECONCILIATION | 6/14/01 12:15 | 6/14/01 12:20 | EXECUTING |

Sidebar: ORGANISATION, POSITION, ORIGINATE, TRADE, NEWS, REPORTING, TIMELINE, DEMO, LOG OUT, ABOUT THE SIMULATION COPYRIGHT ©2001 CO2e.COM LLC. ALL RIGHTS RESERVED.

BACK TO TOP

| ORGANISATION |
|---|
| POSITION |
| ORIGINATE |
| TRADE |
| NEWS |
| REPORTING |
| TIMELINE |
| DEMO |
| LOG OUT |

◄ 1900

ABOUT THE SIMULATION

THE TRADING SIMULATION IS ONE OF A SERIES OF INTERACTIVE TRADING TOOLS THAT HAS BEEN BROUGHT TO MARKET BY CO2e.COM.

THE CO2e.COM TRADING SIMULATION IS A PLATFORM TO LEARN ABOUT THE OPERATION OF A MORE COMMODITISED CARBON MARKET, AND THE POTENTIAL IMPLICATIONS OF MAJOR POLICY DECISIONS ON THIS EMERGING MARKETPLACE. IT REPRESENTS A SIMPLIFIED MODEL OF HOW INTERNATIONAL OR DOMESTIC CARBON TRADING MIGHT DEVELOP. THE SIMULATION COMBINES MANY OF THE KEY ELEMENTS OF EMERGING POLICY WITH SOPHISTICATED TRADING TECHNOLOGY FROM ONE OF WALL STREET'S FASTEST GROWING B2B ELECTRONIC SOLUTIONS PROVIDER, eSPEED, INC., TO CREATE A HIGHLY USABLE, ENJOYABLE AND INSTRUCTIVE SIMULATION.

BROAD ASSUMPTIONS

SEVERAL KEY ASSUMPTIONS HAVE BEEN MADE IN THE DESIGN OF CO2e.COM'S TRADING SIMULATION. THESE ASSUMPTIONS ARE AS FOLLOWS:

- THE SIMULATED TRADING REGIME IS ONE THAT COULD BE ESTABLISHED BY AN INTERNATIONAL INTERPRETATION OF THE KYOTO PROTOCOL, WITH OR WITHOUT AN ADVANCED DOMESTIC TRADING ENVIRONMENT
- ALL CREDIT TYPES ARE FULLY DEFINED AND TRANSFERABLE ACROSS INTERNATIONAL BOUNDARIES
- PARTICIPANTS IN NON-ANNEX B COUNTRIES CAN SELL AND BUY CREDITS

IT IS IMPORTANT TO RECOGNIZE THESE ASSUMPTIONS BEFORE ENGAGING THE SIMULATION.

SIMULATION ELEMENTS

836 ⟩

FOUR DIFFERENT TYPES OF ENTITIES PARTICIPATE IN THE SIMULATION, EACH WITH DIFFERENT CHARACTERISTICS AND GOALS:

BUYERS FACE CAPS ON THEIR CARBON DIOXIDE EQUIVALENT (CO2e) EMISSIONS AND MUST UNDERTAKE INTERNAL ACTIONS AND MAY ENGAGE IN TRADING TO COMPLY WITH EMISSIONS TARGETS AT THE LEAST COST AND AVOID COMPLIANCE PENALTIES.

SUPPLIERS ARE CAPABLE OF PRODUCING JOINT IMPLEMENTATION (JI) OR CLEAN DEVELOPMENT MECHANISM (CDM) CREDITS AND ATTEMPT TO MAXIMIZE PROFIT FROM THE SALE OF THESE CREDITS.

TRADERS TAKE SPECULATIVE POSITIONS IN THE MARKET FOR PROFIT THROUGH THE CAREFUL ANALYSIS OF LATE-BREAKING NEWS AND THE OBSERVATION OF MARKET BEHAVIOUR. TRADERS ADD LIQUIDITY TO THE MARKET.

NGOS SEEK TO ACHIEVE THE GREATEST ENVIRONMENTAL "GOOD" AT THE LEAST ECONOMIC COST BY PURCHASING AND HOLDING ON TO CREDITS FOR ULTIMATE RETIREMENT WITH LIMITED ECONOMIC RESOURCES.

ABOUT THE SIMULATION

THE PARTICIPANTS ARE LOCATED IN ONE OF THREE FICTITIOUS COUNTRIES. NARNIA AND UTOPIA ARE BOTH ANNEX B (CAPPED) NATIONS. THE BUYERS AND TRADERS ARE EXCLUSIVELY LOCATED IN THESE COUNTRIES. THE SINGLE NON-ANNEX B COUNTRY, GONDWANA, IS HOME TO ROUGHLY TWO-THIRDS OF THE SUPPLIERS, WITH THE REST LOCATED IN THE CAPPED NATIONS.

FIG. 22

MAINTAIN REAL TIMES
(THIS PAGE WILL BE REFRESHED EVERY 5 MINUTES.)

US DEMO

| NUMBER | TYPE | START DATE | TIME | START DATE | TIME |
|---|---|---|---|---|---|
| 1 | REGISTRATION | 06/14/2001 | 10:50 | 06/14/2001 | 11:00 |
| 2 | TRADE | 06/14/2001 | 11:05 | 06/14/2001 | 11:15 |
| 3 | TRADE | 06/14/2001 | 11:20 | [06]/[14]/[2001] [11]:[25] |
| 4 | TRADE | [06]/[14]/[2001] [11]:[30] | [06]/[14]/[2001] [11]:[35] |
| 5 | TRADE | [06]/[14]/[2001] [11]:[40] | [06]/[14]/[2001] [11]:[45] |
| 6 | RECONCILIATION | [06]/[14]/[2001] [12]:[10] | [06]/[14]/[2001] [12]:[15] |

NOTE: ALL DATES FORMATTED AS "MM/DD/YYYY" AND TIMES ARE IN 24 HOUR FORMAT.

INCREASE TIME BY [5]  ● MINUTE(S)  ○ HOUR(S)  ○ DAY(S)

(CLEAR ALL)  (SUBMIT)

Sidebar:
- ORGANISATION POSITION
- ORIGINATE TRADE
- NEWS
- REPORTING
- TIMELINE
- MAINTAIN REAL TIMES
- CUSTOMISE NEWS LINKS
- DISPLAY CATEGORY WINNERS
- SIMULATION MAINTENANCE
- ORGANISATION MAINTENANCE
- COUNTRY MAINTENANCE
- START/STOP SIMULATION
- LOG OUT
- ABOUT THE SIMULATION COPYRIGHT ©2001 CO2e.COM LLC. ALL RIGHTS RESERVED.

FIG. 27

MAINTAIN SIMULATION PARAMETERS - UPDATE

NAME: US DEMO
ANNOUNCEMENT YEAR: 2002
COST CURVE %: 0
BUSINESS AS USUAL %: 0
INTEREST: 7

SAVE  BACK

FIG. 29

ORGANISATION DETAILS - BUYER/SUPPLIER — 2702

| Field | Value |
|---|---|
| NAME | JOHN'S CATTLE COMPANY — 2704 |
| DESCRIPTION | JOHN'S CATTLE COMPANY IS A COMPANY THAT — 2706 |
| STARTING CASH | 5900000 — 2710    BORROWING LIMIT    11800000 — 2708 |
| YEARLY CASH ALLOC | 5900000    YEARLY CASH CHANGE    0.5 — 2712 |
| INDUSTRY TYPE | POWER GENERATOR - COAL-BROWN — 2714 |
| COUNTRY | UTOPIA — 2716 |

INSTRUMENT CREATION

ISSUE CLASS   IR — 2718    PROJECT TYPE    INTERNAL REDUCTIONS — 2720

(SAVE) — 2722    (COST CURVE) — 2724    (YEARLY VALUES) — 2726

Sidebar menu:
- ORGANISATION
- POSITION
- ORIGINATE
- TRADE
- NEWS
- REPORTING
- TIMELINE
- MAINTAIN REAL TIMES
- CUSTOMISE NEWS_LINKS
- DISPLAY CATEGORY WINNERS
- SIMULATION MAINTENANCE
- ORGANISATION MAINTENANCE
- COUNTRY MAINTENANCE
- START/STOP SIMULATION
- LOG OUT
- ABOUT THE SIMULATION

2700

COPYRIGHT ©2001 CO2e.COM LLC. ALL RIGHTS RESERVED.

| | | |
|---|---|---|
| 2500000 | 2600000 | 50 |
| 2600000 | 2700000 | 50 |
| 2700000 | 2800000 | 65 |
| 2800000 | 2900000 | 65 |
| 2900000 | 3000000 | 65 |
| 3000000 | 3100000 | 65 |
| 3100000 | 3200000 | 65 |
| 3200000 | 3300000 | 65 |
| 3300000 | 3400000 | 65 |
| 3400000 | 3500000 | 65 |
| 3500000 | 3600000 | 65 |
| 3600000 | 3700000 | 65 |
| 3700000 | 3800000 | 65 |
| 3800000 | 3900000 | 65 |
| 3900000 | 4000000 | 65 |
| 4000000 | 4100000 | 65 |
| 4100000 | 4200000 | 65 |
| 4200000 | 4300000 | 65 |
| 4300000 | 4400000 | 65 |
| 4400000 | 4500000 | 65 |
| 4500000 | 4600000 | 65 |
| 4600000 | 4700000 | 65 |
| 4700000 | 4800000 | 65 |
| 4800000 | 4900000 | 65 |
| 4900000 | 5000000 | 65 |

APPLY LAST COST TO REST  ○YES ●NO

SAVE

MAINTAIN ORGANISATION YEARLY VALUES

| | ORGANISATION |
|---|---|
| | POSITION |
| | ORIGINATE |
| | TRADE |
| | NEWS |
| | REPORTING |
| | TIMELINE |
| | MAINTAIN REAL TIMES |
| | CUSTOMISE NEWS LINKS |
| | DISPLAY CATEGORY WINNERS |
| | SIMULATION MAINTENANCE |
| | ORGANISATION MAINTENANCE |
| | COUNTRY MAINTENANCE |
| | START/STOP SIMULATION |
| | LOG OUT |
| | ABOUT THE SIMULATION |

DEFAULT YEARLY VALUES

| YEAR | BAU | KYOTO ALLOCATION | FORECAST LOW | FORECAST HIGH |
|---|---|---|---|---|
| 1 | 809000 | 0 | 0 | 0 |
| 2 | 809000 | 0 | 0 | 0 |
| 3 | 809000 | 744500 | 595600 | 893400 |
| 4 | 809000 | 731500 | 585200 | 877800 |
| 5 | 809000 | 719000 | 575200 | 862800 |
| 6 | 809000 | 707500 | 566000 | 849000 |
| 7 | 809000 | 694500 | 555600 | 833400 |
| 8 | 817000 | 689500 | 551600 | 827200 |
| 9 | 825500 | 683500 | 546800 | 820200 |
| 10 | 833500 | 677500 | 542000 | 813000 |
| 11 | 842000 | 672000 | 537600 | 806400 |
| 12 | 850500 | 665500 | 532400 | 798600 |
| 13 | | | | |
| 14 | | | | |
| 15 | | | | |
| 16 | | | | |
| 17 | | | | |
| 18 | | | | |
| 19 | | | | |
| 20 | | | | |
| 21 | | | | |
| 22 | | | | |
| 23 | | | | |
| 24 | | | | |
| 25 | | | | |

FIG. 33

ELECTRONIC TRADING SYSTEM FOR SIMULATING THE TRADING OF CARBON DIOXIDE EQUIVALENT EMISSION REDUCTIONS AND METHODS OF USE

This application claims the benefit of U.S. provisional patent application No. 60/313,842, filed Aug. 21, 2001, which is hereby incorporated by reference herein in its entirety.

BACKGROUND OF THE INVENTION

The present invention relates to electronic trading and more particularly, to an electronic trading system for simulating the trading of carbon dioxide equivalent emission reductions and methods of use.

Carbon dioxide equivalent ($CO_2e$) is the universal unit of measurement used to indicate the global warming potential of greenhouse gases. Some examples of greenhouse gases are carbon dioxide ($CO_2$), water vapor ($H_2O$), methane ($CH_4$), chlorofluorocarbons (CFCs), nitrous oxide ($N_2O$), hydrofluorocarbons (HFCs), perfluorocarbons (PFCs), and sulfur hexafluoride ($SF_6$). Possible methods of reducing $CO_2e$ emissions include reducing actual emissions, avoiding potential emissions, or removing and storing atmospheric carbon in a sink. Emission reductions may qualify for accreditation under future international regulatory regimes, domestic regulatory regimes, or both.

In an evolving $CO_2e$ emission reductions trading market, entities such as countries, corporations, or non-profit organisations may desire to simulate their participation prior to entry to gain a deeper understanding of the market. Such entities may, for example, need to understand their emission profiles, assess their potential obligations and associated liabilities, and learn to trade $CO_2e$ emissions reductions.

It is therefore desirable to provide an electronic trading system for simulating the trading of carbon dioxide equivalent emission reductions and methods of use.

SUMMARY OF THE INVENTION

In accordance with the present invention, an electronic trading system for simulating the trading of carbon dioxide equivalent emission reductions and methods of use are provided. The electronic trading system may be used to provide an electronic trading simulation to users of various computer equipment. An electronic trading application may be used to provide the users with the ability to use the electronic trading simulation.

In some embodiments, a user may be provided with the ability to create an organisation to participate in a trading simulation. This organisation may have characteristics that are similar to an organisation with which the user is affiliated. For example, if the user is affiliated with a certain company, then the organisation created for the trading simulation may have similar attributes as the user's company, such as financial and geographic attributes. In another example, if the user is affiliated with a certain country, then the organisation created for the trading simulation may have similar attributes as the user's country has on the whole, such as financial and geographic attributes.

The user's organisation may participate in the trading simulation along with any number of participants and a simulation administrator. The simulation may include the simulated trading of $CO_2e$ emission reductions. The simulation may include news releases throughout the duration of the trading simulation. Such news releases may affect the user's organisation directly, thereby creating a risk factor in the trading simulation. In another suitable approach, such news releases may provide noise, thereby distracting the user from other aspects of the simulation.

A simulation administrator may take part in the simulation. The electronic trading application may provide the simulation administrator with the ability to modify various aspects of the simulation in real-time. For example, the simulation administrator may create news releases, such as those described above, that may be released to the users of the simulation during the simulation.

The simulation administrator may modify a real-time timeline for the electronic trading simulation, modify parameters in connection with the electronic trading simulation, modify parameters in connection with an organisation that is participating in the electronic trading simulation, modify parameters in connection with a country that is participating in the electronic trading simulation, or any other suitable modification in connection with the electronic trading simulation.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which:

FIG. 4 shows an illustrative log on screen that may be provided to the user by the electronic trading application in accordance with some embodiments of the present invention;

FIG. 6 shows an illustrative introductory screen that may be provided to the user by the electronic trading application in accordance with some embodiments of the present invention;

FIG. 8 shows an illustrative information screen that may be provided to the user by the electronic trading application in accordance with some embodiments of the present invention;

FIG. 10 shows an illustrative organisation review screen that may be provided to the user by the electronic trading application in accordance with some embodiments of the present invention;

FIG. 13 shows an illustrative origination screen that may be provided to the user by the electronic trading application in accordance with some embodiments of the present invention;

FIG. 16 shows an illustrative position review screen that includes a late breaking news announcement that may be provided to the user by the electronic trading application in accordance with some embodiments of the present invention;

FIG. 18 shows an illustrative timeline screen that may be provided to the user by the electronic trading application in accordance with some embodiments of the present invention;

FIG. 21 shows another illustrative information screen that may be provided to the user by the electronic trading application in accordance with some embodiments of the present invention;

FIG. 22 shows an illustrative real times maintenance screen that may be provided to a user such as a simulation administrator by the electronic trading application in accordance with some embodiments of the present invention;

FIG. 27 shows an illustrative simulation parameter edit screen that may be provided to a user such as a simulation administrator by the electronic trading application in accordance with some embodiments of the present invention;

FIG. 29 shows an illustrative organisation details screen that may be provided to a user such as a simulation administrator by the electronic trading application in accordance with some embodiments of the present invention;

FIGS. 30-31 show an illustrative cost curve maintenance screen that may be provided to a user such as a simulation administrator by the electronic trading application in accordance with some embodiments of the present invention;

FIGS. 32-33 show an illustrative yearly values maintenance screen that may be provided to a user such as a simulation administrator by the electronic trading application in accordance with some embodiments of the present invention;

DETAILED DESCRIPTION OF THE INVENTION

Figure 1:
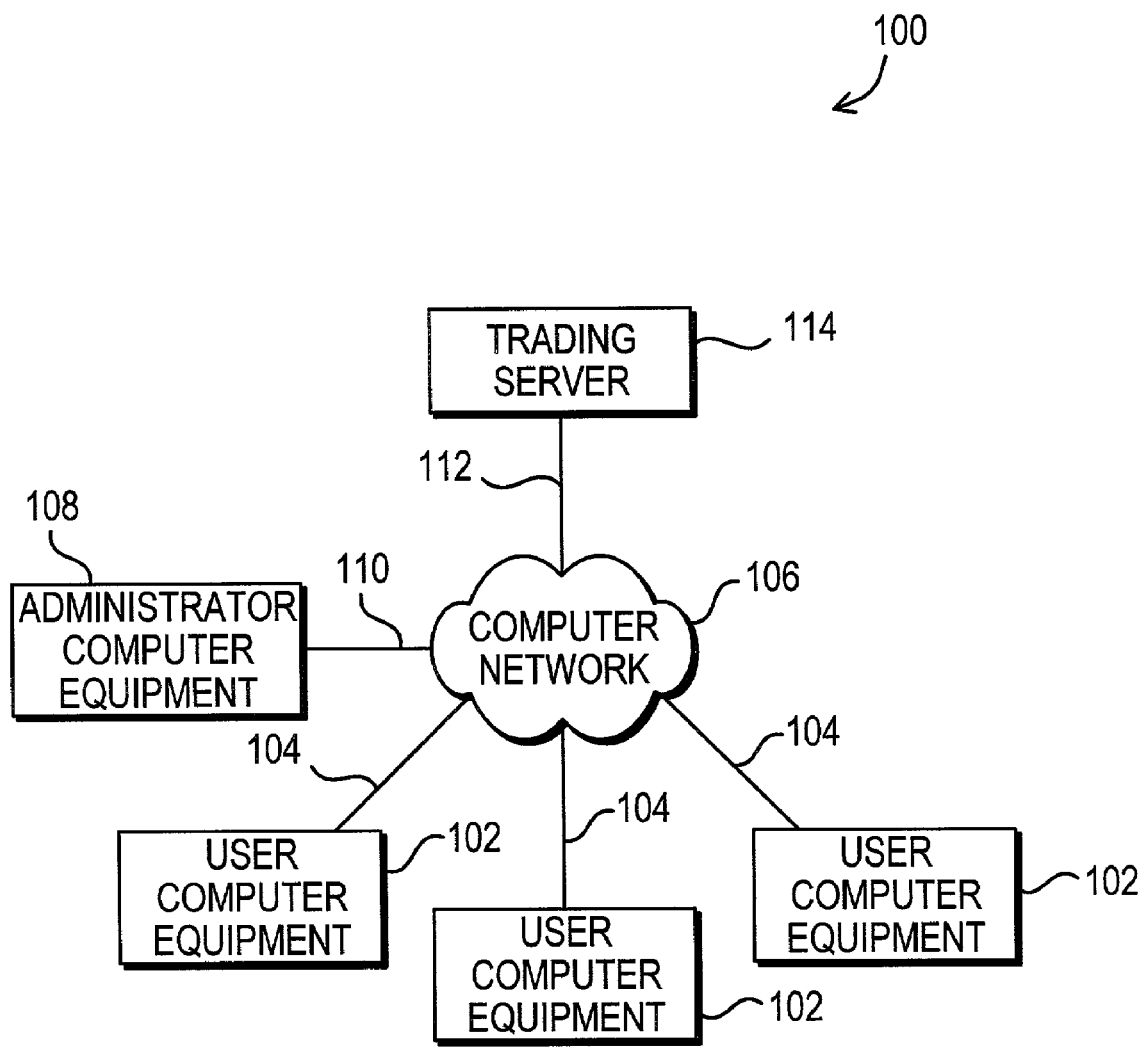
FIG. 1 is a schematic diagram of an illustrative electronic trading system suitable for implementation of an electronic trading simulation in accordance with some embodiments of the present invention.

FIG. 1 is a schematic diagram of an illustrative electronic trading system 100 suitable for implementation of an electronic trading simulation in accordance with some embodiments of the present invention. Aspects of the invention apply to various types of electronic trading, but are described herein primarily in the context of electronic trading of carbon dioxide equivalent ($CO_2e$) emission reductions for specificity and clarity.

System 100 may be used to provide an electronic trading simulation to users of various computer equipment. An electronic trading application may be used to provide the users with the ability to use the electronic trading simulation. In one suitable approach, the electronic trading application may run locally on computer equipment. Computer equipment, such as user computer equipment 102 and administrator computer equipment 108, may include a computer, processor, personal computer, laptop computer, handheld computer, personal digital assistant, computer terminal, any other suitable computing device, or a combination of such devices. In another suitable approach, the electronic trading application may run using a client-server or distributed architecture where a portion of the electronic trading application may be implemented locally on the computer equipment in the form of, for example, a client process. Another portion of the electronic trading application may be implemented at a remote location, such as on a server or any other suitable equipment as, for example, a server process. A server such as trading server 114 may be any suitable server, processor, computer, data processing device, or a combination of such devices. In one example, trading server 114 may be a server powered by eSpeed, Inc. These arrangements are merely illustrative. Any other suitable arrangement for implementing the electronic trading application may be used.

As shown in FIG. 1, system 100 may include user computer equipment 102 that is connected by one or more communication links 104 to a computer network 106. System 100 may include administrator computer equipment 108 that is connected by one or more communication links 110 to computer network 106. Administrator computer equipment 108 and user computer equipment 102 may be similar to one another. However, a simulation administrator uses administrator computer equipment 108 to perform administrative tasks in connection with the electronic trading simulation, while a user of the electronic trading simulation uses user computer equipment 102 to participate in the electronic trading simulation. A generalized schematic diagram of computer equipment, such as user computer equipment 102 and administrator computer equipment 108, is shown in FIG. 2.

Figure 2:
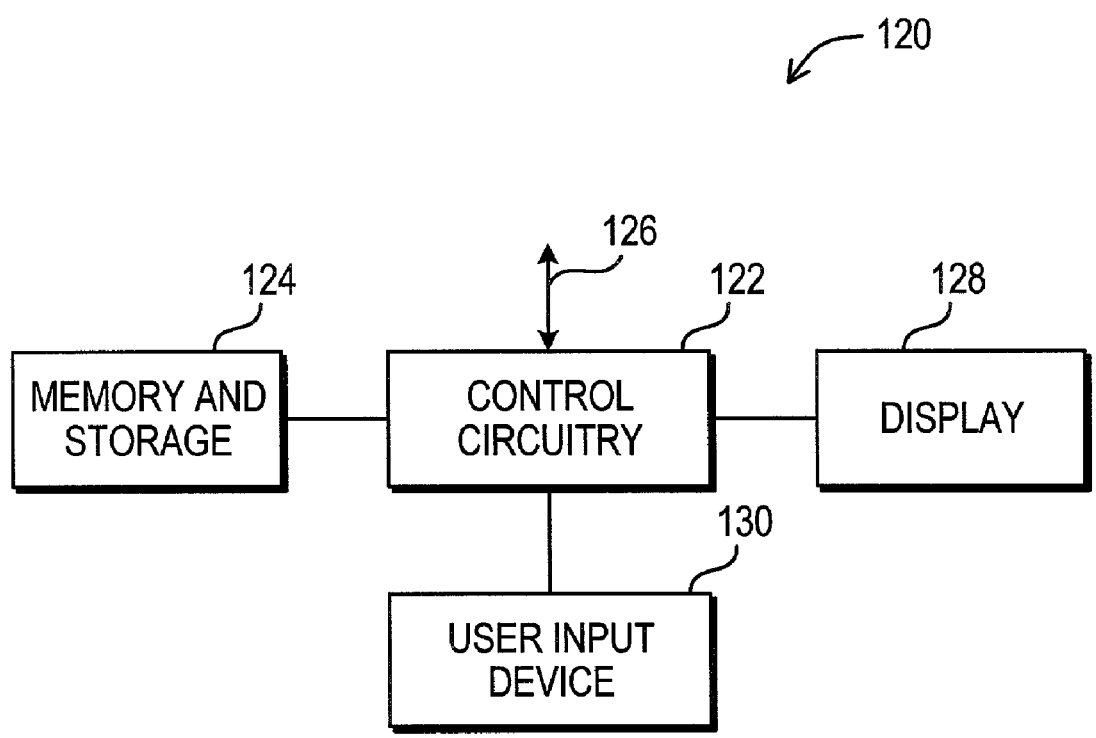
FIG. 2 is a schematic diagram of illustrative computer equipment in accordance with some embodiments of the present invention.

FIG. 2 is a schematic diagram of illustrative computer equipment 120. Control circuitry 122 and memory and storage 124 may have communications, memory, and processing circuitry suitable for supporting functions such as accessing the electronic trading application over line 126. Line 126 may be coupled to communications links such as links 104 and 110 of FIG. 1. Text and graphics associated with the electronic trading simulation may be presented to a user using a display 128. Display 128 may be a computer monitor, a handheld computer display, a laptop computer display, a personal digital assistant display, or any other suitable display equipment.

The user may interact with control circuitry 122 using any suitable user input device 130, such as a keyboard, a wireless keyboard, a mouse, a trackball, a touch pad, or any other suitable input device.

Referring back to FIG. 1, computer network 106 may be a hub linking user computer equipment 102, administrator computer equipment 108, and trading server 114. Trading server 114 may be connected to computer network 106 by one or more communication links 112. Computer network 106 may be any suitable computer network including the Internet, an Intranet, a wide-area network (WAN), a local-area network (LAN), a wireless network, a digital subscriber line (DSL) network, a frame relay network, an asynchronous transfer mode (ATM) network, a virtual private network (VPN), or a combination of such networks.

The components of system 100 may be interconnected using various communications Links, such as links 104, 110, and 112. Communications links 104, 110, and 112 may include satellite paths, coaxial cable paths, fiber-optic paths, twisted pair paths, other wire or cable-based links, modems, wireless paths through free space, any other suitable paths, or a combination of such paths. Communications over communications links such as links 104, 110, and 112 may involve analog transmissions, digital transmissions, wireless transmissions, microwave transmissions, radio-frequency transmissions, optical transmissions, audio transmissions, any other suitable type of transmissions, or a combination of such transmissions. Communications may involve Internet transmissions, private network transmissions, packet-based transmissions, television channel transmissions, transmissions in the vertical blanking interval (VBI) of a television channel or on a television sideband, MPEG transmissions, or any other suitable type of transmissions. Communications may involve wireless pager or other messaging transmissions. Communications links 104, 110, and 112 may include cable connected to cable modems, digital subscriber lines, integrated services digital network (ISDN) lines, or any other suitable paths.

Users at user computer equipment 102 may participate in the electronic trading simulation by providing trading information and by otherwise interacting with the electronic trading simulation. The electronic trading simulation may provide a user at user computer equipment 102 with screens containing various simulation information. For example, the user may be presented with screens that allow the user to make trades, view and update information on the user's trading organisation, or any other suitable screen in connection with the simulation.

The electronic trading simulation may provide the user with interactive screens containing menus and selectable options that allow the user to navigate through the electronic trading simulation and participate in the electronic trading simulation. With user computer equipment 102, the user may use a keyboard, mouse, trackball, touch pad, or other suitable input or pointing device to navigate the various menus and selectable options.

The user may interact with the electronic trading simulation by accessing the electronic trading application with user computer equipment 102. The user may access the electronic trading application by browsing to an Internet web site or a site on a private network, by running a local program, or by any other suitable method.

Simulation administrators may interact with the electronic trading simulation in substantially the same manner as users. The electronic trading simulation may, however, provide simulation administrators with access to additional functions of the electronic trading simulation so that simulation administrators may perform administrative tasks.

An electronic trading system for simulating the trading of carbon dioxide equivalent ($CO_2e$) emission reductions and methods of use are provided. Users may be corporations, countries, or any other suitable entity that desires to simulate the trading of greenhouse gas emission reductions. Emission reductions may refer to a reduction in actual emissions, avoidance of potential emissions, or the removal and storage of atmospheric carbon in a sink. Users may, for example, invest in emission reductions in the anticipation that those reductions will qualify for accreditation under future international regulatory regimes, domestic regulatory regimes, or both. Emission reductions are referred to as carbon dioxide equivalent ($CO_2e$) emission reductions.

Referring now to FIGS. 3-34, illustrative screens that may be provided by an electronic trading application are provided. Specifically, FIGS. 9-34 are illustrative screens that may be included in an electronic trading simulation of $CO_2e$ emission reductions. The screens may be displayed on a display such as display 128 of FIG. 2. The format and contents of such screens may be modified to accommodate displays of different sizes and shapes, such as computer monitors and laptop computer displays (as shown), handheld computer displays, personal digital assistant displays, or any other suitable displays.

Figure 3:
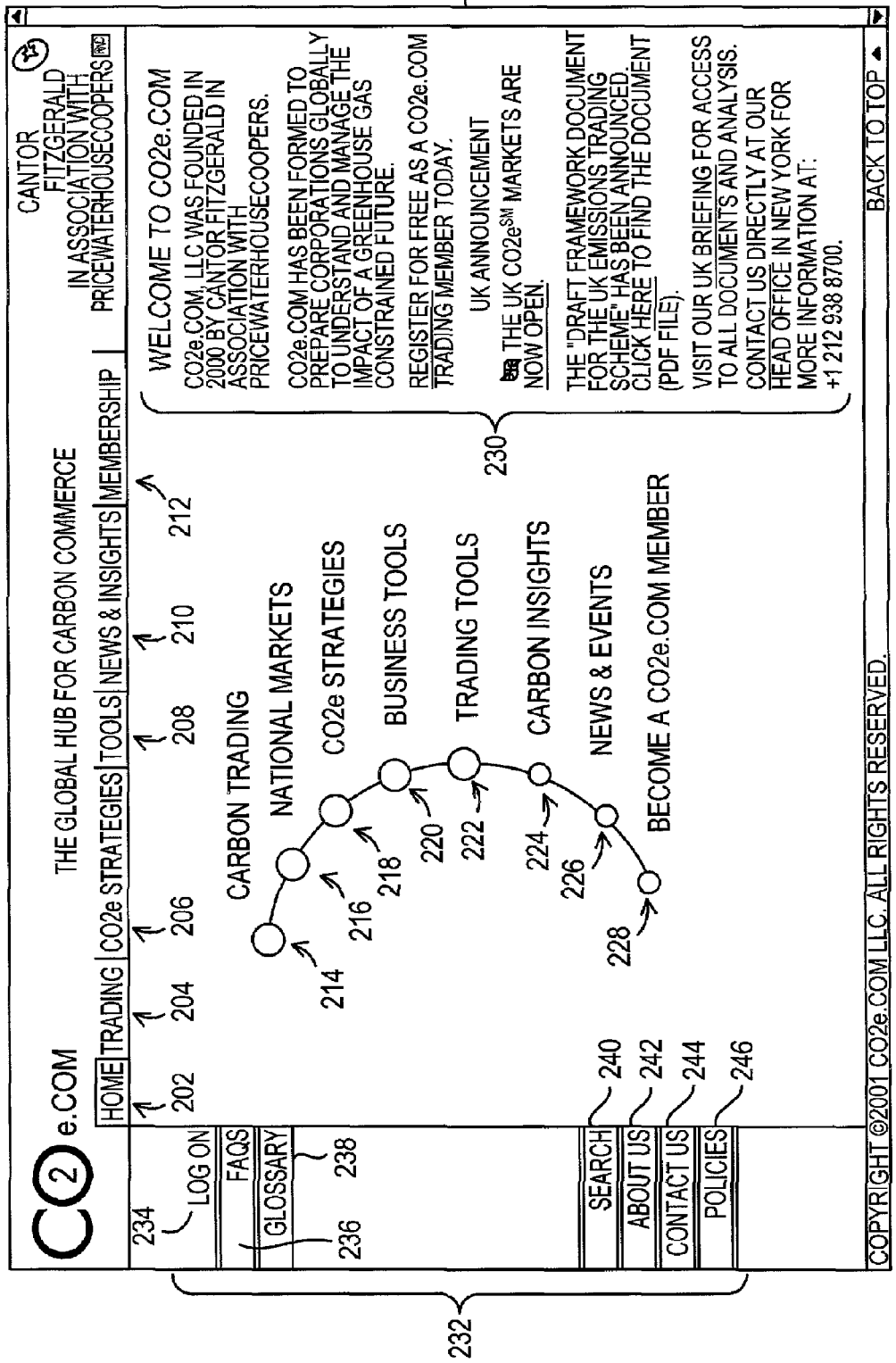
FIG. 3 shows an illustrative main menu screen that may be provided to a user by an electronic trading application in accordance with some embodiments of the present invention.

FIG. 3 shows an illustrative main menu screen 200 that may be provided to a user by the electronic trading application in accordance with some embodiments of the present invention. Main menu screen 200 may be provided when the user initially accesses the electronic trading application. Main menu screen 200 may provide the user with options in connection with electronic trading, including options to access the electronic trading simulation. As shown, main menu screen 200 may include tabs such as a home tab 202, a trading tab 204, a CO2e strategies tab 206, a tools tab 208, a news and insights tab 210, a membership tab 212, or any other suitable tab. These tabs may allow the user to access menu screens associated with the tabs by, for example, navigating a pointer arrow over the tabs and pressing an appropriate key on a mouse or a keyboard. The user may use such an approach or any other suitable approach in this screen and the screens that follow to select any on-screen selectable options.

Main menu screen 200 may include options such as a carbon trading option 214, a national markets option 216, a CO2e strategies option 218, a business tools option 220, a trading tools option 222, a carbon insights option 224, a news and events option 226, a become a CO2e.com member option 228, or any other suitable option. When the user selects an option, the electronic trading application may display a menu screen associated with the option. The menu screen displayed when the user selects an option may correspond to a menu screen provided when the user selects a corresponding tab.

For example, the electronic trading application may provide the user with the same menu screen when the user selects membership tab 212 and when the user selects become a CO2e.com member option 228.

Main menu screen 200 may include an announcements area 230. Announcements area 230 may include greetings, information about the trading web site, contact information, current news items that are related to the web site or to $CO_2e$ emission reductions, or any other suitable announcements.

Main menu screen 200 may include a side menu area 232 that provides the user with selectable options. Side menu area 232 may be accessible from various screens of the electronic trading application. Side menu area 232 may include a log on option 234, a frequently asked questions (FAQs) option 236, a glossary option 238, a search option 240, an about us option 242, a contact us option 244, a policies option 246, or any other suitable option.

Main menu screen 200 of FIG. 3 and the screens provided in FIGS. 4-34 may include a scroll bar 248. Scroll bar 248 allows the user to scroll up and down on a screen to portions of the screen that are not visible due to size limitations of the display device.

Various screens of the electronic trading application, such as information screens that contain general information about the trading application, may be available to any user of the trading application. However, to access screens provided by the electronic trading application that are reserved for registered users only, the user may log onto the trading application or register to become a member. The user may select log on option 234 from side menu area 232 to access a log on screen such as that displayed in FIG. 4.

FIG. 4 shows an illustrative log on screen 300 that may be provided to the user by the electronic trading application in accordance with some embodiments of the present invention. As shown, log on screen 300 may include a username text box 302, a password text box 304, a log on button 306, a trading member registration button 308, a log on help area 310, or any other suitable items related to logging onto the electronic trading application.

Username text box 302 may be any suitable area where the user of the electronic trading application may enter a username. Password text box 304 may be any suitable area where the user may enter a password corresponding to the username entered in username text box 302. The user may enter the username and password by, for example, navigating a pointer arrow over text boxes 302 and 304, pressing an appropriate key on a mouse or a keyboard such that a cursor appears, and inputting text using a keyboard or other suitable device. The user may use such an approach in this screen and the screens that follow to enter text in a text box.

The user may select log on button 306 after entering the username and password in boxes 302 and 304, respectively. When the user selects log on button 306, the electronic trading application may log the user onto the web site provided by the electronic trading application.

Trading member registration button 308 may provide a user who is not already a trading member with a registration screen (not shown) that may allow the user to register as a trading member.

Log on help area 310 may provide the user with assistance in logging onto the web site. For example, log on help area 310 may help the user recover a forgotten username or password.

When the user selects log on button 306 of FIG. 4, the electronic trading application may provide the user with main menu screen 200 of FIG. 3. The electronic trading application may, however, provide a log out option in the place of a log on option 234. Because the user is logged on, the electronic trading application may provide the user with access to a trading tools menu screen. The user may access the trading tools menu screen such as the screen displayed in FIG. 5 by selecting tools tab 208 or trading tools option 222 of FIG. 3. From the trading tool, menu screen, the electronic trading application may provide the user with access to the electronic trading simulation.

Figure 5:
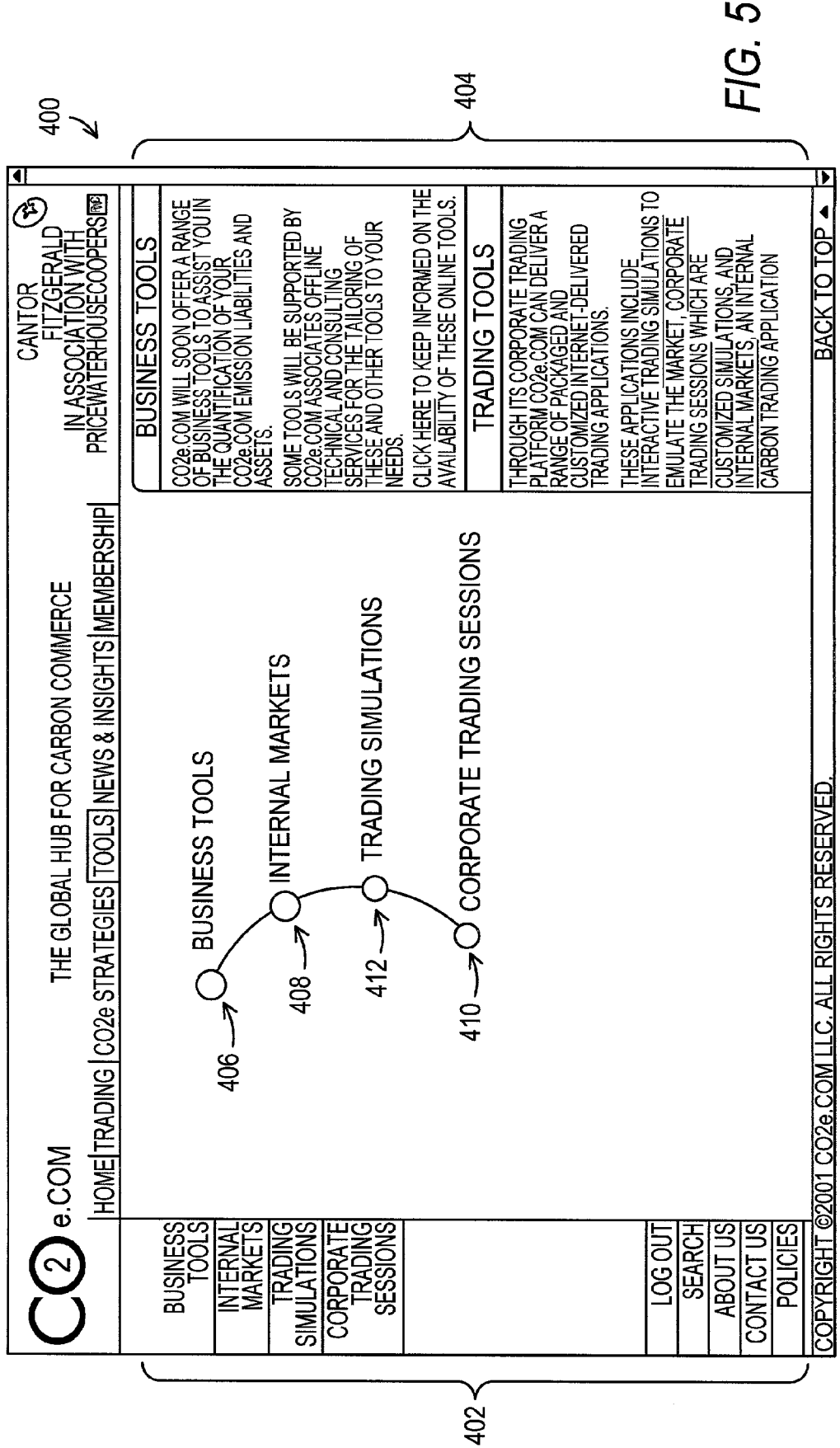
FIG. 5 shows an illustrative trading tools menu screen that may be provided to the user by the electronic trading application in accordance with some embodiments of the present invention.

FIG. 5 shows an illustrative trading tools menu screen 400 that may be provided to the user by the electronic trading application in accordance with some embodiments of the present invention. From this menu, the user may access trading tools related to $CO_2e$ emission reductions. One such tool is the electronic trading simulation of $CO_2e$ emission reductions. As shown, trading tools menu screen 400 may include a side menu area 402 and an announcements area 404. Trading tools menu screen 400 may include options such as a business tools option 406, an internal markets option 408, a corporate trading sessions option 410, a trading simulations option 412, or any other suitable option related to trading tools.

Side menu area 402 may include options that provide the user with the ability to access screens that are related to trading tools. For example, side menu area 402 may include a business tools option, an internal markets option, a trading simulations option, a corporate trading sessions option, or any other suitable option related to trading tools. Side menu area 402 may include general options such as a log out option, a search option, an about us option, a contact us option, a policies option, or any other suitable general options. Announcements area 404 may include information related to business tools, trading tools, internal markets, trading simulations, corporate trading sessions, or any other suitable information.

When the user selects an option such as business tools option 406, the electronic trading application may provide the user with access to various business tools to assist the user in the quantification of emission liabilities and assets. When the user selects an option such as internal markets option 408, the electronic trading application may provide the user with access to an internal carbon trading application. When the user selects corporate trading sessions option 410, the electronic trading application may provide the user with the ability to engage in customized corporate trading sessions. When the user selects trading simulations option 412, the electronic trading application may provide the user with access to the electronic trading simulation.

The electronic trading simulation of the present invention may allow the user to simulate the trading of $CO_2e$ emission reductions. The user may create an organisation to participate in a trading simulation that has characteristics that are similar to an organisation with which the user is affiliated. For example, if the user is affiliated with a certain company, then the organisation created for the trading simulation may have similar attributes as the user's company, such as financial and geographic attributes. In another example, if the user is affiliated with a certain country, then the organisation created for the trading simulation may have similar attributes as the user's country has on the whole, such as financial and geographic attributes. The user's organisation may participate in the trading simulation along with any number of participants. Such participants may include other users, the simulation administrator, or a combination of both. Through the simulation, the user may develop an understanding of the operation of a $CO_2e$ emission reductions market.

FIG. 6 shows an illustrative introductory screen 500 that may be provided to the user by the electronic trading application in accordance with some embodiments of the present invention. The electronic trading application may display introductory screen 500 when the user selects trading simulations option 412 of FIG. 5. Introductory screen 500 may include an introductory description of the trading simulation. As shown, introductory screen 500 may include a description region 502, a review registration option 504, and a run option 506.

Description region 502 may include introductory information in connection with the trading simulation, such as how to become a participant in the simulation, the benefits of participating in the simulation, the software requirements of the simulation, or any other suitable introductory information. Review registration option 504 may provide the user with the ability to review any registration options associated with the user.

Run option 506 may provide the user with the ability to access the main menu screen for the electronic trading simulation. When the user selects run option 506, the electronic trading application may display a screen that welcomes the user to the electronic trading simulation.

Figure 7:
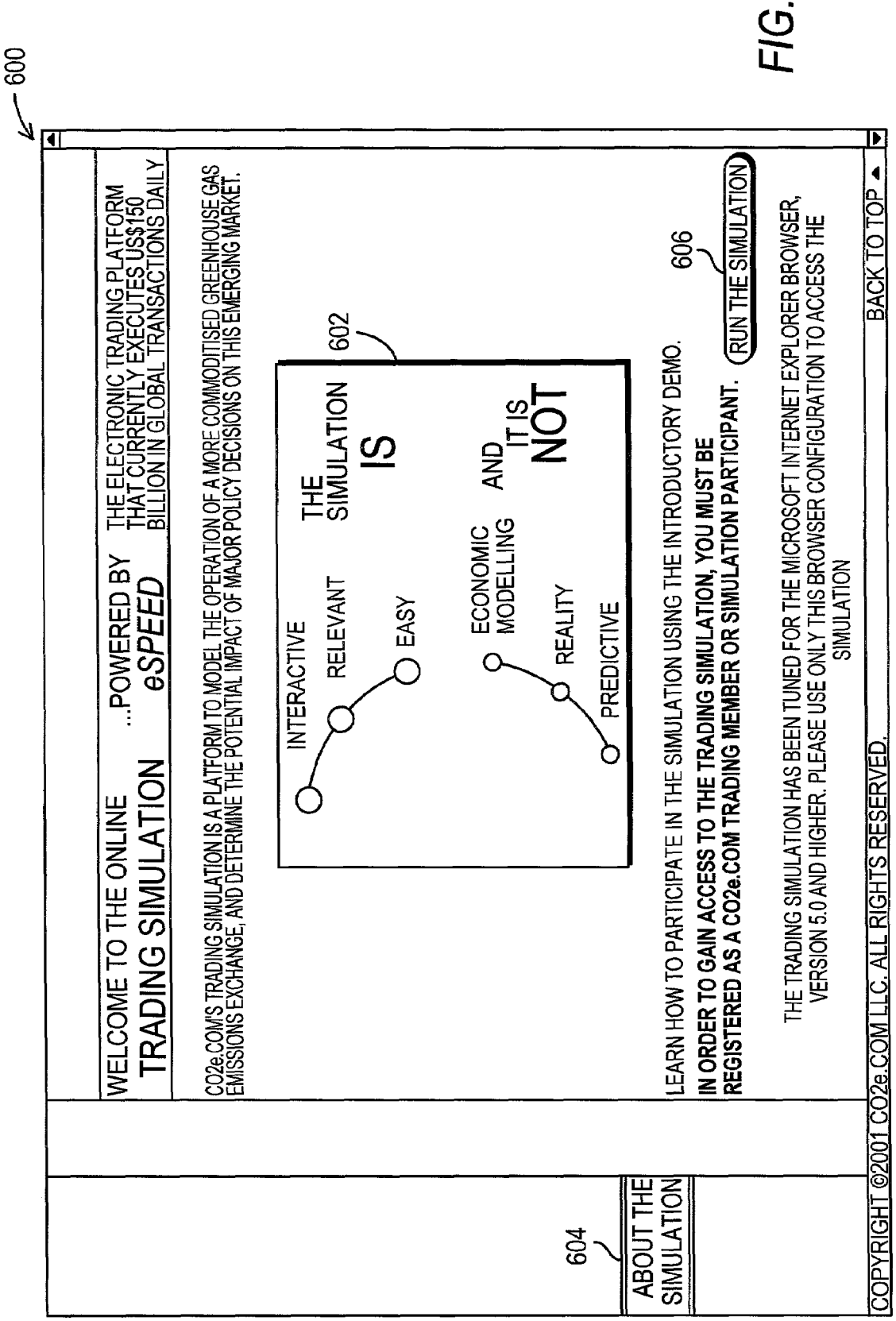
FIG. 7 shows an illustrative welcome screen that may be provided to the user by the electronic trading application in accordance with some embodiments of the present invention.

FIG. 7 shows an illustrative welcome screen 600 that may be provided to the user by the electronic trading application in accordance with some embodiments of the present invention. As shown, welcome screen 600 may include an information region 602, an about the simulation option 604, and a run button 606. Information region 602 may include information in connection with the trading simulation. When the user selects about the simulation option 604, the electronic trading application may display a screen that includes information in connection with the electronic trading simulation.

FIG. 8 shows an illustrative information screen 700 that may be provided to the user by the electronic trading application in accordance with some embodiments of the present invention. The electronic trading application may display information screen 700 when the user selects about the simulation option 604 of FIG. 7. Information screen 700 may provide the user with a description of the electronic trading simulation in a simulation description region 702. Description region 702 may include any assumptions that were made in the design of the electronic trading simulation, a list of the possible participants in the electronic trading simulation, instructions for participating in the electronic trading simulation, or any other information relevant to the user's participation in the electronic trading simulation.

Referring back to welcome screen 600 of FIG. 7, when the user selects run button 606, the electronic trading application may provide the user with access to the electronic trading simulation. The electronic trading application may display a set-up screen that allows the user to create an organisation for participation in the electronic trading simulation.

Figure 9:
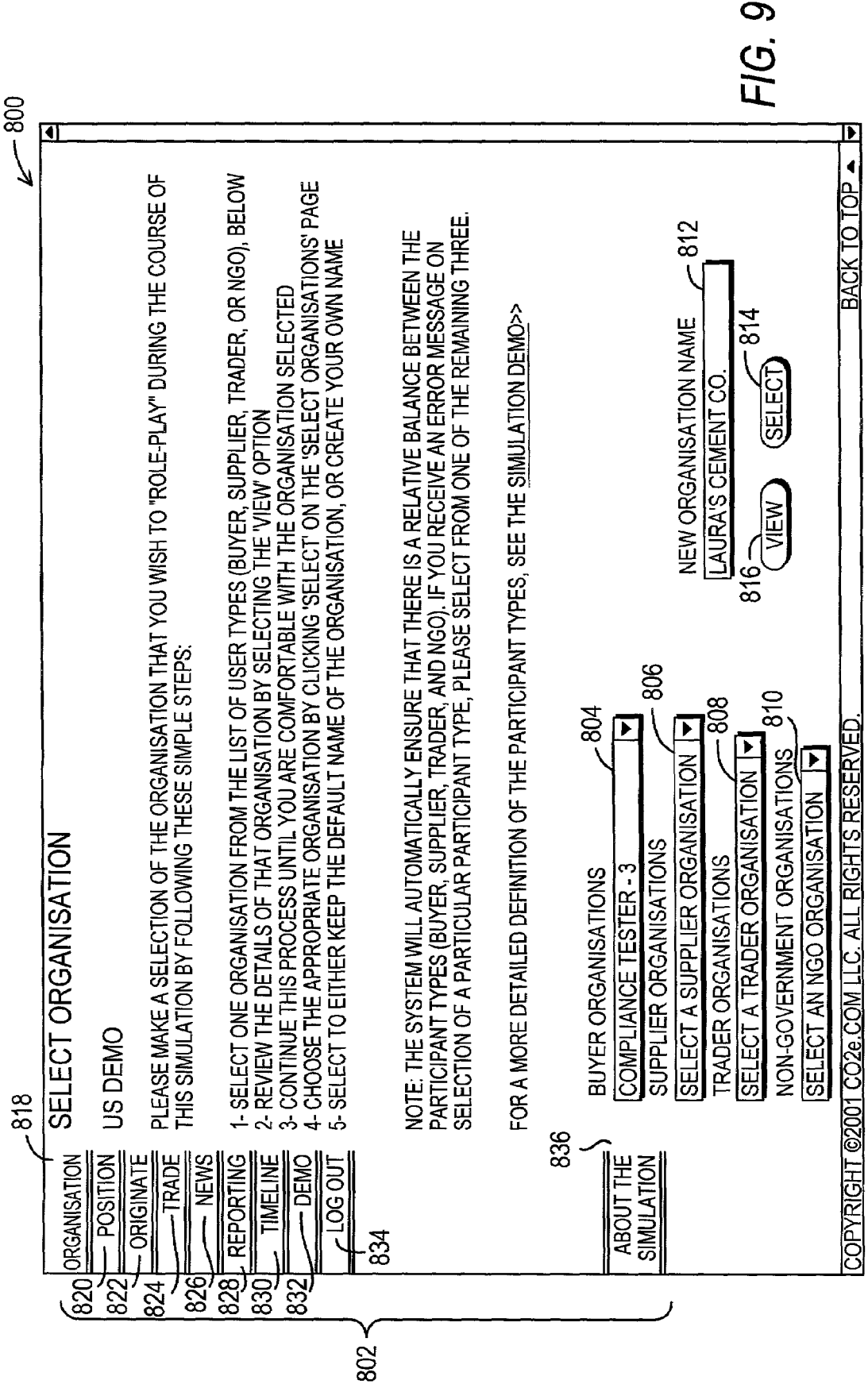
FIG. 9 shows an illustrative organisation menu screen that may be provided to the user by the electronic trading application in accordance with some embodiments of the present invention.

FIG. 9 shows an illustrative organisation menu screen 800 that may be provided to the user by the electronic trading application in accordance with some embodiments of the present invention. The electronic trading application may display organisation menu screen 800 when the user selects run button 606 of FIG. 7 to run the electronic trading simulation. In another suitable approach, the electronic trading application may display organisation menu screen 800 when the user selects an organisation option 818 from a side menu area 802. Side menu area 802 may be included in any of FIGS. 9-21 (e.g., the screens that are provided to a user of the trading simulation). Side menu area 802 may include options related to the trading simulation such as organisation option 818, a position option 820, an originate option 822, a trade option 824, a news option 826, a reporting option 828, a demo option 830, a log out option 834, and an about the simulation option 836. The options included in side menu area 802 may allow the user to access various screen within the electronic trading simulation. For example, when the user selects log out option 834 from organisation menu screen 800, the electronic trading application may display a log out screen.

Organisation menu screen 800 may provide the user with the ability to select an organisation for participation in the trading simulation. For example, the user may select one of four different organisations: buyers, suppliers, traders, or non-government. However, the electronic trading application may provide the user with the ability to select an organisation from any number of possible organisations. The user may select an organisation that represents a projected position within the $CO_2e$ emission reductions trading market. For example, if the user wishes to simulate $CO_2e$ emission reduction trading as an oil company, then the user may select a buyer organisation. This allows the user to gain a more accurate understanding of how the user's corporation will fare in the greenhouse gas market.

The user may select a specific organisation by utilizing the drop-down menu available for each organisation in, for example, a buyer organisation region 804, a supplier organisation region 806, a trader organisation region 808, or a non-government organisation region 810. As shown in buyer organisation region 804, the user has chosen a buyer organisation (e.g., Compliance Tester-3). Compliance Tester-3 may be a buyer organisation that was set-up prior to the trading simulation by, for example, the simulation administrator. Compliance Tester-3 may have attributes that are similar to those of the user's actual organisation (i.e., the organisation that the user wishes to simulate). The name assigned to the organisation, for example, Compliance Tester-3, may be assigned by the simulation administrator as a reference for the organisation until the user changes the name, described as follows. In a new organisation name text box 812, the user may input a desired name for the selected organisation. As shown, the user has inputted "Laura's Cement Co." in new organisation name text box 812. The user may select a select button 814 to finalize the selection of the organisation made in organisation menu screen 800.

When the user selects a view button 816, the electronic trading application may present the user with a detailed description of the selected organisation (e.g., the buyer organisation Compliance Tester-3).

FIG. 10 shows an illustrative organisation review screen 900 that may be provided to the user by the electronic trading application in accordance with some embodiments of the present invention. The electronic trading application may display organisation review screen 900 when the user selects view button 816 of FIG. 9. Organisation review screen 900 may include a details region 902 and a position data button 904.

Details region 902 may include details in connection with the organisation selected in FIG. 9 (e.g., the buyer organisation Compliance Tester-3). As described above, such details may be provided by the user prior to the trading simulation and may, for example, be inputted by the simulation administrator. These details may be attributes of the user's actual organisation (e.g., the user's actual company, country, non-profit organisation, or other suitable entity), and may thereby provide a more realistic simulation of the user's organisation in the $CO_2e$ emission reduction trading market.

Details region 902 may include the organisation name (e.g., Laura's Cement Co.), the organisation type (e.g., buyer), the current status of the organisation (e.g., solvent), the country of the electronic trading simulation in which the organisation is situated (e.g., Utopia), the annual cash allowance (e.g., US$ 1,000,000/year), the borrowing limit (e.g., US$ 10,000,000), the credit type or types created (e.g., IR-Internal Reductions), and the description of the organisation (e.g., owns and operates a single-cycle gas power generation facility).

In details region 902, the current status may represent the organisation's status in real-time or at the end of each round of the trading simulation. Possible statuses are solvent or insolvent. Solvent organisations are those that have money, and insolvent organisations are those that are bankrupt (e.g., organisations that have no money remaining to participate in the simulation).

In one suitable arrangement, the country in details region 902 may be one of three fictitious countries, such as Narnia, Utopia, or Gondwana. Countries such as Narnia and Utopia may be Annex B countries. An Annex B country, as defined by the Kyoto Protocol, is an industrialized country that has a cap on its emissions. A country such as Gondwana may be a non-Annex B country. A non-Annex B country is a developing nation. Although this example describes the trading simulation as having three countries, the simulation may have any number of countries, and each country may be one of a developing country, an industrialized country, or any other type of country as defined under the Kyoto Protocol or other $CO_2e$ emission reduction guidelines.

The borrowing limit in details region 902 may be an amount that the user's organisation can borrow from a lending institution. This amount of money may be borrowed with an interest rate corresponding to the current interest rate. For example, if the user is participating in the trading simulation in the United States, then the interest rate on the loan may be the current interest rate in the United States al the time of the trading simulation. This helps to make the trading simulation as realistic as possible.

When the user selects position data button 904, the electronic trading application may provide additional data in connection with the user's organisation. For example, the electronic trading application may provide the user with data in connection with the organisation's emissions, available cash, or any other suitable attribute.

Figure 11:
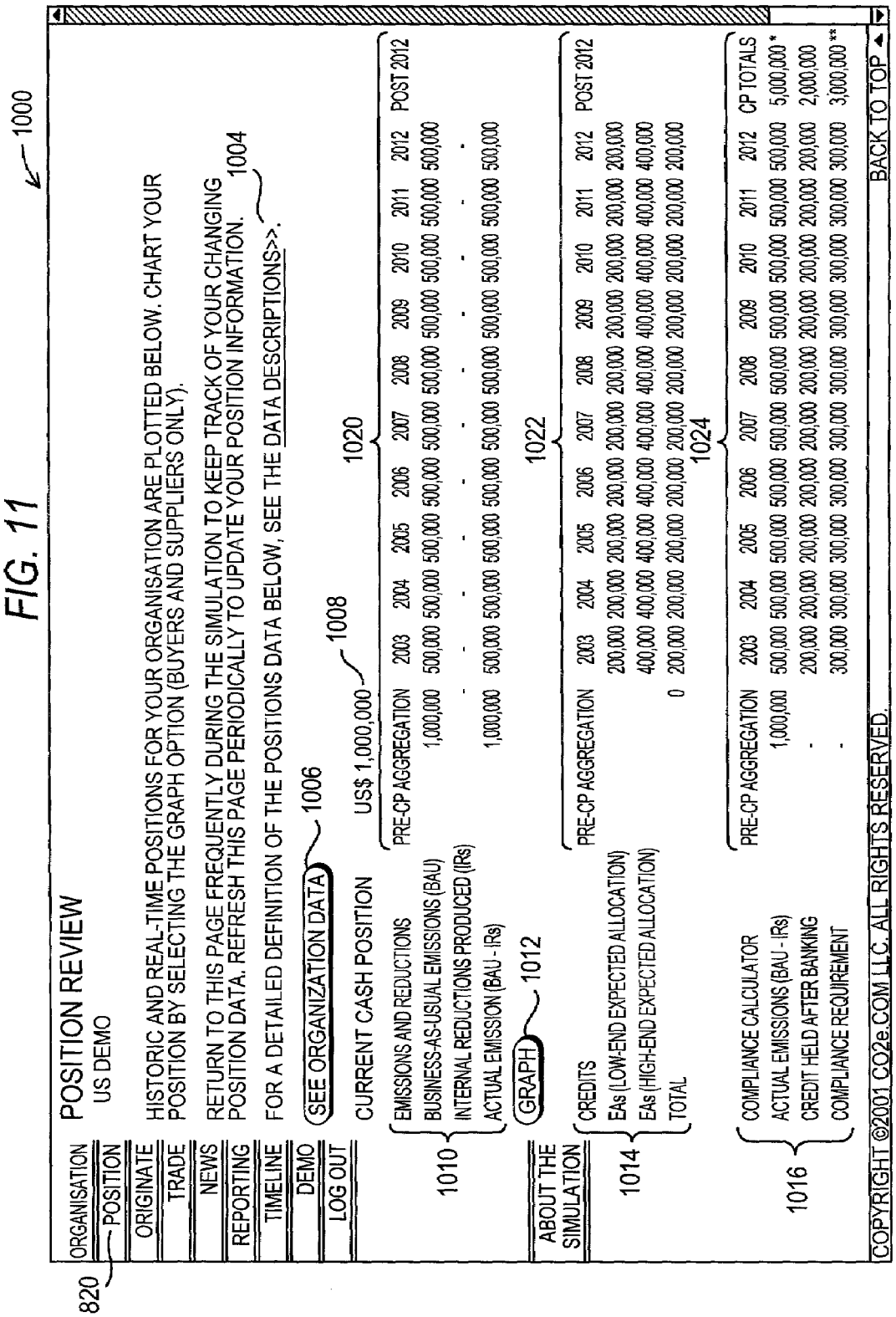
FIG. 11 shows an illustrative position review screen that may be provided to the user by the electronic trading application in accordance with some embodiments of the present invention.

FIG. 11 shows an illustrative position review screen 1000 that may be provided to the user by the electronic trading application in accordance with some embodiments of the present invention. The electronic trading application may display position review screen 1000 when the user selects position data button 904 of FIG. 10. In another suitable approach, the electronic trading application may display position review screen 1000 when the user selects position option 820 from side menu area 802 of any other screen.

Position review screen 1000 may include data in connection with the user's organisation. For example, the user may be provided with data in connection with the organisation's emissions, available cash, or any other suitable attributes. For a description of the data included in position review screen 1000, the user may select a data description option 1004. When the user selects data description option 1004, the electronic trading application may display a screen (not shown) providing detailed definitions of specific data fields. For example, the electronic trading application may provide a glossary of position data terms, such as business-as-usual, internal reductions, compliance period, or any other terms related to position data.

The user may select an organisation data button 1006 to view data in connection with the user's organisation. When the user selects organisation data button 1006, the electronic trading application may display a screen such as organisation review screen 900 of FIG. 10.

The electronic trading application may provide the user with a current cash position 1008 that represents the amount of cash currently available to the user's organisation. This value may be affected by sales, purchases, penalties, or any other suitable transaction in connection with the trading simulation.

The electronic trading application may provide the user with a number of data tables in connection with the user's organisation. For example, an emissions and reductions table 1010 may provide the user with values for business-as-usual (BAU) emissions and internal reductions (IRs) over a span of time. Business-as-usual emissions are an estimate of an organisation's future and current emissions under normal operating circumstances. Internal reductions are reductions in $CO_2e$ emissions that are made within an organisation. The values provided in emissions and reductions table 1010 may be given in metric tons, or tonnes.

A year region 1020 may present the user with a year corresponding to each emission and reduction value. The electronic trading application may present any number of years to the user. The electronic trading application may provide the user with the value of business-as-usual emissions minus internal reductions and may provide a graph related to the calculation when the user selects a graph button 1012.

Figure 12:
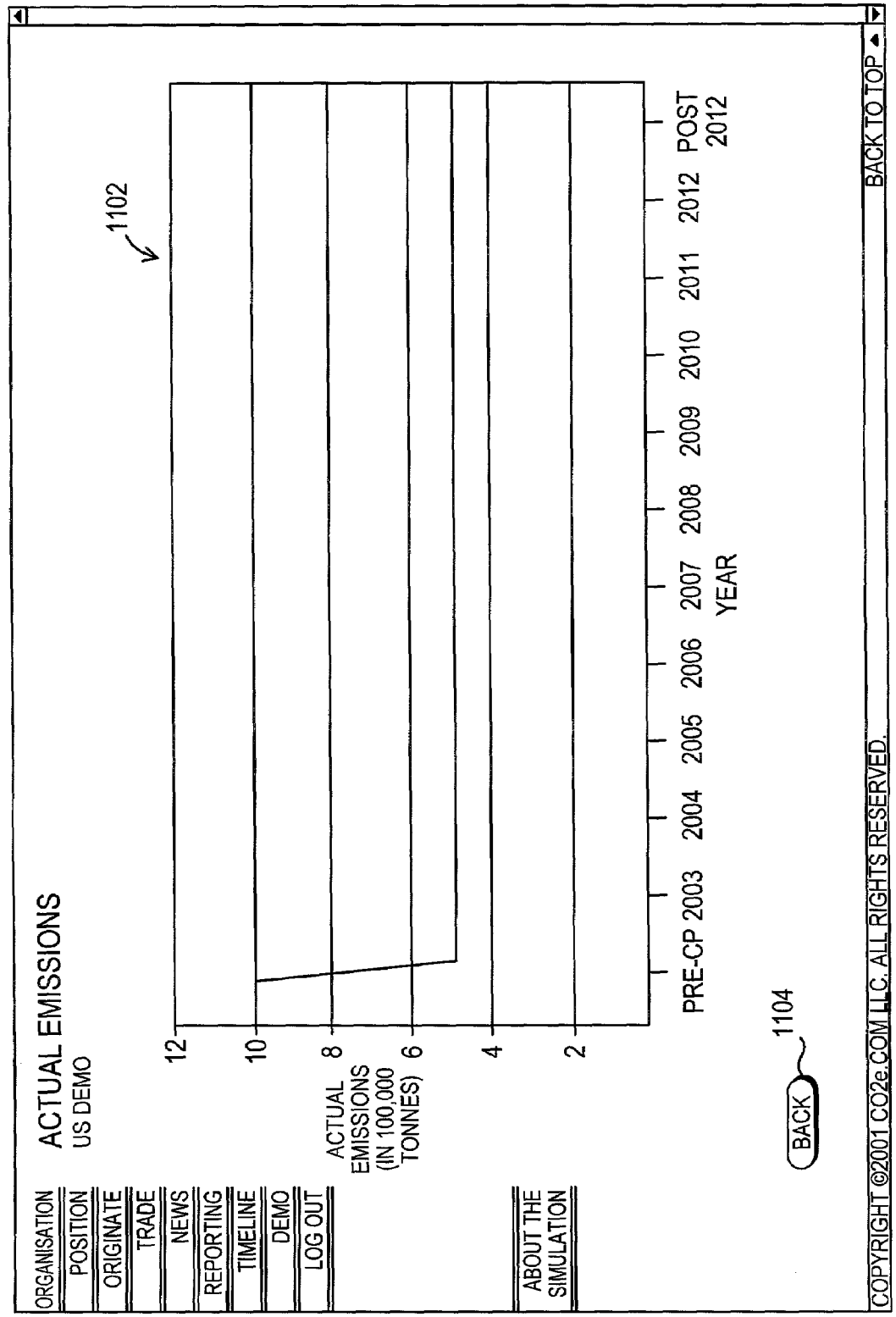
FIG. 12 shows an illustrative graphing screen that may be provided to the user by the electronic trading application in accordance with some embodiments of the present invention.

FIG. 12 shows an illustrative graphing screen 1100 that may be provided to the user by the electronic trading application in accordance with some embodiments of the present invention. Graphing screen 1100 may be provided in response to a selection of graph button 1012 of FIG. 11. Graphing screen 1100 may provide the user with a graph showing the relationship between the actual emissions of $CO_2e$ and the year. Graphing screen 1100 may include a graph region 1102 and a back button 1104. Graph region 1102 may include a graph that is related to the data in emissions and reductions table 1010 (FIG. 11). Back button 1104 may provide the user with the ability to return to the previous screen. For example, when the user selects back button 1104, the electronic trading application may display position screen 1000 of FIG. 11.

Referring back to FIG. 11, the electronic trading application may provide the user with a data table such as a credits table 1014. Credits table 1014 may provide the user with values for emission allowances (EAs). Emission allowances are the total emissions allowed to be released by an organisation during a given period of time. Prior to determination of the exact emission allowance per year by the simulation administrator, the electronic trading application may provide the user with a low-end expected allocation and a high-end expected allocation. These allocation values are estimates between which the exact emission allowance may fall. The electronic trading application may provide the emission allowances in tonnes and over a span of time. A year region 1022 may present the user with a year corresponding to each emission allowance allocation value. Credits table 1014 may present any number of years to the user.

The electronic trading application may provide the user with a data table such as a compliance calculator table 1016. Compliance calculator table 1016 may provide the user with a comparison between actual emissions and credits. Emissions and reductions table 1010 may provide the values for the actual emissions in compliance calculator table 1016. For example, the actual emissions may be the business-as-usual emissions minus the internal reductions produced by the user's organisation. Credits table 1014 may provide the values for the credits. For example, the credits may be the emission allowances allotted to the user's organisation. The electronic trading application may provide the comparison between the actual emissions and credits as a compliance requirement. The compliance requirement is the amount of $CO_2e$ emission reductions that the user's organisation must achieve by the end of each trading session (e.g., a year) in order to comply with, for example, the Kyoto Protocol. Compliance calculator table 1016 may provide the compliance requirements in tonnes. A year region 1024 may present the user with a year corresponding to each compliance requirement value. Year region 1024 may present any number of years to the user.

The electronic trading application may provide the user with the ability to generate credits (e.g., for supplier organisations) or internal reductions (e.g., for buyer organisations). From a screen such as position review screen 1000 of FIG. 11, the electronic trading application may provide the user with access to such an origination screen.

FIG. 13 shows an illustrative origination screen 1200 that may be provided to the user by the electronic trading application in accordance with some embodiments of the present invention. The electronic trading application may display origination screen 1200 when the user selects originate option 822 from side menu area 802 of any other screen. Origination screen 1200 may provide the user with the ability to generate credits or internal reductions (IRs), depending on the type of organisation. For example, if the user's organisation is a supplier, then the organization may generate credits. The credits created by a supplier organisation are tradable. In another example, if the user's organisation is a buyer, then the organisation may generate internal reductions. The internal reductions created by a buyer organisation are not tradable due to regulations within $CO_2e$ emission reductions trading markets.

Origination screen 1200 may include an instruction region 1204, a total volume text box 1206, a calculate button 1208, an accept button 1210, a cancel button 1212, a marginal abatement/supply cost table 1214, a total originated field 1216, an origination description option 1218, and a graph button 1220.

The electronic trading application may provide the user with instructions in connection with the origination of credits or internal reductions in instruction region 1204. Instruction region 1204 may provide the user with steps to follow in order to originate credits or internal reductions. For example, the first step that is provided may be to input the total amount of tonnes of credits or internal reductions desired in a specified text box. The next step may be to click a calculation button to determine the total cost for the origination of credits or internal reductions. The total cost may be a function of the user's organisation's marginal abatement/supply cost curve. The final step may be to click an accept button to input the origination of credits or internal reductions, or to click a cancel button to reset origination screen 1200 to its original values.

In total volume text box 1206, the electronic trading application may provide the user with the ability to enter a number for the total volume of credits or internal reductions for the user's organisation to generate over a span of time. For example, the user's organisation, Compliance Tester-3, is a buyer and therefore generates IRs. As shown, the user has inputted an entry of 100,000 tonnes of internal reductions over a span of ten years. In this example, the cost of generating one tonne of internal reductions is one dollar. Therefore, the generation of 100,000 tonnes of internal reductions costs $100,000. The electronic trading application may provide the user with a calculate button 1208. When the user selects calculate button, the electronic trading application may calculate the effect that this internal reduction may have on the user's organisation. When the user selects calculate button 1208, the electronic trading application may update marginal abatement/supply cost table 1214 accordingly. Total originated field 1216 may update accordingly when the user selects calculate button 1208.

The user may select accept button 1210 if the effect that the selected internal reduction (as shown in total volume text box 1206) has on the user's organisation is acceptable. The user may select cancel button 1212 if the effect that the selected internal reduction has on the user's organisation is unacceptable. When the user selects cancel button 1212, the electronic trading application may delete the value in total volume text box 1206 so that the user may enter a different value.

Origination screen 1200 may include marginal abatement/supply cost table 1214. As described above, marginal abatement/supply cost table 1214 may update accordingly when the user selects calculate button 1208. Origination screen 1200 may include origination description option 1218. The user may select origination description option 1218 to view a screen (not shown) providing definitions and descriptions of the elements of origination screen 1200.

The electronic trading application may provide a graph related to marginal abatement/supply cost table 1214 when the user selects graph button 1220.

Figure 14:
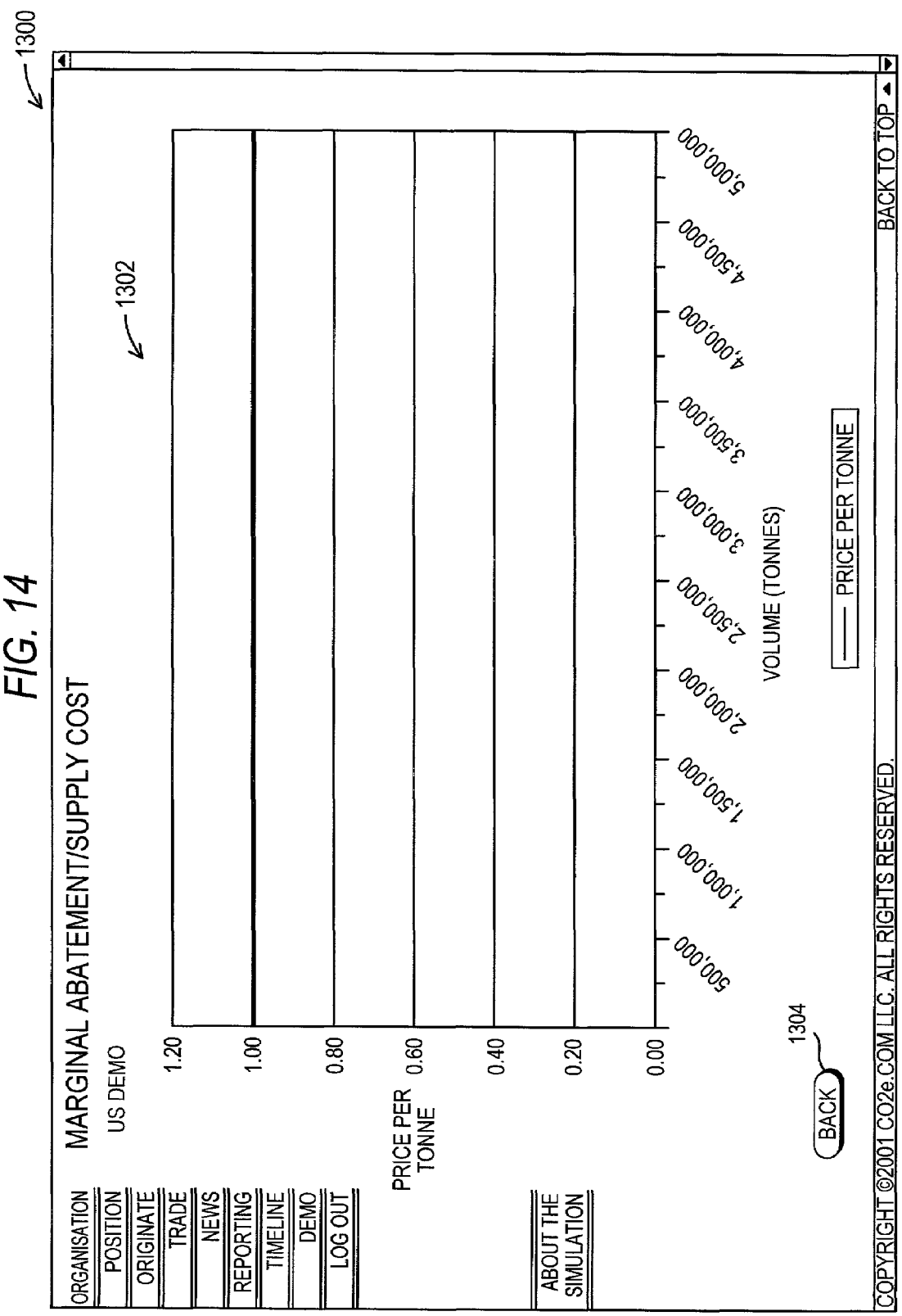
FIG. 14 shows an illustrative graphing screen that may be provided to the user by the electronic trading application in accordance with some embodiments of the present invention.

FIG. 14 shows an illustrative graphing screen 1300 that may be provided to the user by the electronic trading application in accordance with some embodiments of the present invention. The electronic trading application may display graphing screen 1300 when the user selects graph button 1220 of FIG. 13. Graphing screen 1300 may provide the user with a graph showing the relationship between the volume of $CO_2e$ and the price. Graphing screen 1300 may include a graph region 1302 and a back button 1304.

Graph region 1302 may include a graph that is related to the data in marginal abatement/supply cost table 1214 (FIG. 13). Back button 1304 may provide the user with the ability to return to the previous screen. For example, when the user selects back button 1304, the electronic trading application may provide origination screen 1200 of FIG. 13 to the user.

The trading simulation provided by the electronic trading application may include a trading screen. The trading screen may allow the user to place bids and offers for $CO_2e$ emission reductions, buy and sell emission reductions, or perform any other tasks in connection with $CO_2e$ emission reductions trading. The electronic trading application may provide the user with the ability to access the trading screen at any time during the trading simulation.

Figure 15:
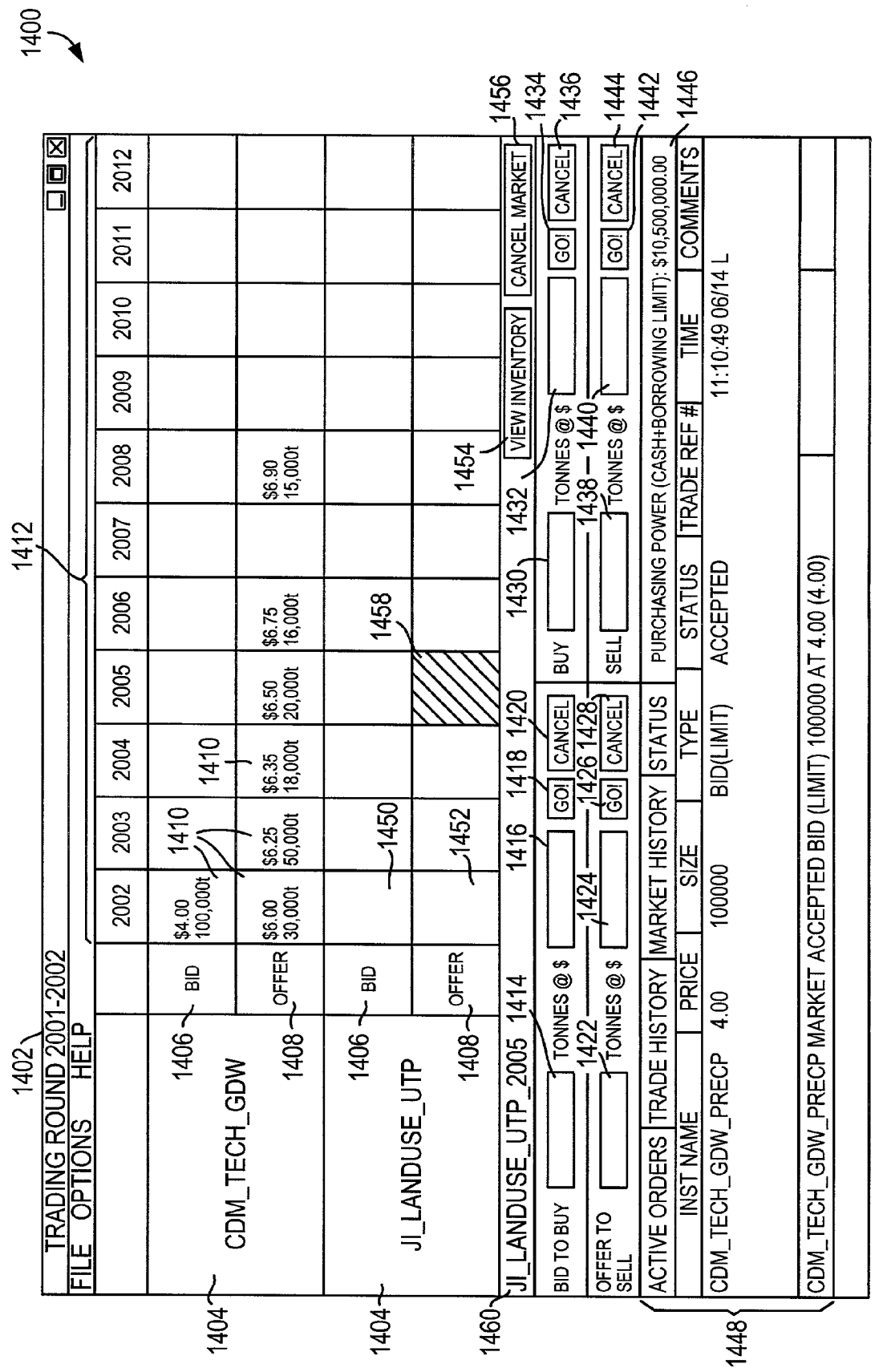
FIG. 15 shows an illustrative trading screen that may be provided to the user by the electronic trading application in accordance with some embodiments of the present invention.

FIG. 15 shows an illustrative trading screen 1400 that may be provided to the user by the electronic trading application in accordance with some embodiments of the present invention. The electronic trading application may display trading screen 1400 when the user selects trade option 824 from side menu area 802 of any other screen. In another suitable approach, the electronic trading application may display trading screen 1400 when the user selects a trading button or link included in any suitable screen. Trading screen 1400 may be provided in a new window over another screen (e.g., over the screen from which trading screen 1400 was selected).

Trading screen 1400 may include a trading round region 1402. Trading round region 1402 may present the user with the current trading round. For example, the current trading round may be year 2001 to year 2002. Trading screen 1400 may include one or more trade type fields 1404. Trade type fields 1404 may present possible trade types to the user. For example, one organisation participating in the simulation may be a supplier from the country of Utopia (e.g., Annex B). This type of organisation may create joint implementation (JI) credits. Joint implementation credits are credits produced as a result of projects jointly implemented by organisations within different industrial nations. In contrast to a supplier in an Annex B nation, a supplier from a country such as Gondwana, a third-world country (e.g., non-Annex B), may produce clean development mechanism (CDM) credits. Clean development mechanism credits are credits produced as a result of emission reduction projects in developing countries.

Credits such as joint implementation and clean development mechanism credits may be created in emission reduction categories such as forest sequestration, land conservation, soil conservation and land use, waste $CO_2$ recovery and deep injection, building efficiency, commercial and industrial efficiency, fuel switching, renewable energy, transportation, animal waste methane recovery, coal bed methane, landfill biomass capture, process change, or any other suitable category for emission reduction.

Trading screen 1400 shows two trade type fields 1404 that include the text "CDM_Tech_GDW" and "JI_LandUse_UTP". In another suitable arrangement, any number of trade type fields 1404 may be provided to the user. CDM_Tech_GDW, for example, may signify clean development mechanism credits (CDM) of a technology category (Tech) in the country of Gondwana ((DW). JI_LandUse_UTP, for example, may signify joint implementation credits (JI) of a land use category (Land Use) in the country of Utopia (UTP).

Trading screen 1400 may include one or more bid fields 1406 and one or more offer fields 1408. One bid field 1406 and one offer field 1408 may be associated with a trade type as indicated by trade type field 1404. Current trade fields 1410, found adjacent to fields 1406 and 1408, may include bids and offers, respectively. Such bids and offers that are currently available may be associated with the corresponding trade type given in trade type field 1404. In one example, a user may make an offer to sell 18,000 tonnes of emission reductions at $6.35/tonne. Such an offer may be presented in one of the current trade fields 1410. The offer may be associated with a specific date, such as a year. The electronic trading application may provide a year region 1412 so that a trade found in one of the current trade fields 1410 may be associated with a specific year. As shown, the offer to sell 18,000 tonnes at $6.35/tonne was made for the year 2004.

The user may input bids to buy, offers to sell, actual purchases, and actual sales in various text boxes in trading screen 1400. Each bid, offer, purchase, and sale may be associated with a specific year. Prior to entering the desired bid, offer, purchase, or sale, the user may select a trade field corresponding to the desired year for the transaction to take place. For example, when the user selects a trade field 1458 (e.g., offer, JI_LandUse_UTP, year 2005), the electronic trading application may provide the user with the ability to enter an offer to sell $CO_2e$ emission reductions for the year 2005. As shown, a heading field 1460 may present a heading corresponding to the selected trade field 1458.

The electronic trading application may provide the user with the ability to input a bid to buy $CO_2e$ emission reductions. As described in general above, the user may select a year for the trade by selecting a suitable trade field. The user may input the bid to buy $CO_2e$ emission reductions in a buy text box 1414. For example, the user may enter a number of tonnes to buy in buy text box 1414. The user may enter a price per tonne of $CO_2e$ emission reductions in a price text box 1416. The electronic trading application may provide a go button 1418 so that the user may input the bid to buy $CO_2e$ emission reductions. When the user selects go button 1418, the bid made in buy text box 1414 and price text box 1416 may be entered in the appropriate current trade field 1410. For example, the current trading round shown in trading round region 1402 (e.g., 2001-2002) corresponds to the pre-commitment period. Thus, when the user selects go button 1418, the bid may appear in box 1450 (e.g., the box corresponding to JI_LandUse_UTP_2005, a bid, and the pre-commitment period). The electronic trading application may provide a cancel button 1420 to clear any text in buy text box 1414 and price text box 1416.

The electronic trading application may provide the user with the ability to input an offer to sell $CO_2e$ emission reductions. As described in general above, the user may select a year for the trade by selecting a suitable trade field. The user may input an offer to sell $CO_2e$ emission reductions in a sell text box 1422. For example, the user may enter a number of tonnes to sell in sell text box 1422. The user may enter a price per tonne of $CO_2e$ emission reductions in a price text box 1424. The electronic trading application may provide a go button 1426 so that the user may input the offer to sell $CO_2e$ emission reductions. When the user selects go button 1426, the offer made in sell text box 1422 and price text box 1424 may be entered in the appropriate current trade field 1410. For example, the offer may appear in box 1452 (e.g., the box corresponding to JI_LandUse_UTP_2005, an offer, and the pre-commitment period). The electronic trading application may provide a cancel button 1428 to clear any text in sell text box 1420 and price text box 1424.

The electronic trading application may provide the user with the ability to input a trade to buy $CO_2e$ emission reductions. As described in general above, the user may select a year for the trade by selecting a suitable trade field. The user may input a trade in a buy text box 1430. The electronic trading application may update price text box 1432 accordingly based on the user's request in buy text box 1430. For example, the electronic trading application may update price text box 1432 with the lowest offer price for such a trade. When the user selects a go button 1434, the electronic trading application may update the appropriate current trade field 1410 to reflect the purchase. When the user selects a cancel button 1436, the electronic trading application may clear any entries in buy text box 1430 and price text box 1432.

The electronic trading application may provide the user with the ability to input a trade to sell $CO_2e$ emission reductions. As described in general above, the user may select a year for the trade by selecting a suitable trade field. The user may input a trade in a sell text box 1438. The electronic trading application may update price text box 1440 accordingly based on the user's request in sell text box 1438. For example, the electronic trading application may update price text box 1440 with the highest bid price for such a sale. When the user selects a go button 1442, the electronic trading application may update the appropriate current trade field 1410 to reflect the sale. When the user selects a cancel button 1444, the electronic trading application may clear any entries in sell text box 1438 and price text box 1440.

Trading screen 1400 may include a purchasing power field 1446. Purchasing power field 1446 may provide the user with the amount of money that is available to the user to purchase $CO_2e$ emission reductions.

Trading screen 1400 may include a trade information region 1448. Trade information region 1448 may include information such as active orders, trade history, market history, status, or any other suitable information in connection with the trading simulation.

Trading screen 1400 may include a view inventory button 1454. When the user selects view inventory button 1454, the electronic trading application may display a screen that shows the user's $CO_2e$ emission reductions that are available for trading. Trading screen 1400 may include a cancel markets button 1456. When the user selects cancel markets button 1456, the electronic trading application may cancel any unaccepted bids or offers that the user has made.

The electronic trading application may provide the simulation administrator with the ability to create news announcements throughout the duration of the simulation. The news announcements may reflect current policy decisions, natural disasters, or any other suitable event related to $CO_2e$ emission reductions. The news announcements may impact the user's organisation (e.g., by reducing or increasing the organisation's emission reductions). In another suitable approach, the news announcements may create noise to simulate an actual trading environment, thereby drawing the user away from other portions of the trading simulation to a screen that presents any breaking news. The electronic trading application may provide the user with an announcement that there is breaking news in any screen of the trading simulation.

FIG. 16 shows another illustrative position review screen 1500 that includes a late breaking news announcement that may be provided to the user by the electronic trading application in accordance with some embodiments of the present invention. Position review screen 1500 is substantially similar to position review screen 1000 of FIG. 11. However, as illustrated, position review screen 1500 includes a late breaking news announcement 1502. Late breaking news announcement 1502 may inform the user that there are one or more news announcements available for review. The example of the position review screen including a breaking news announcement is merely illustrative. The electronic trading application may provide a late breaking news announcement to the user in any other trading simulation screen.

Figure 17:
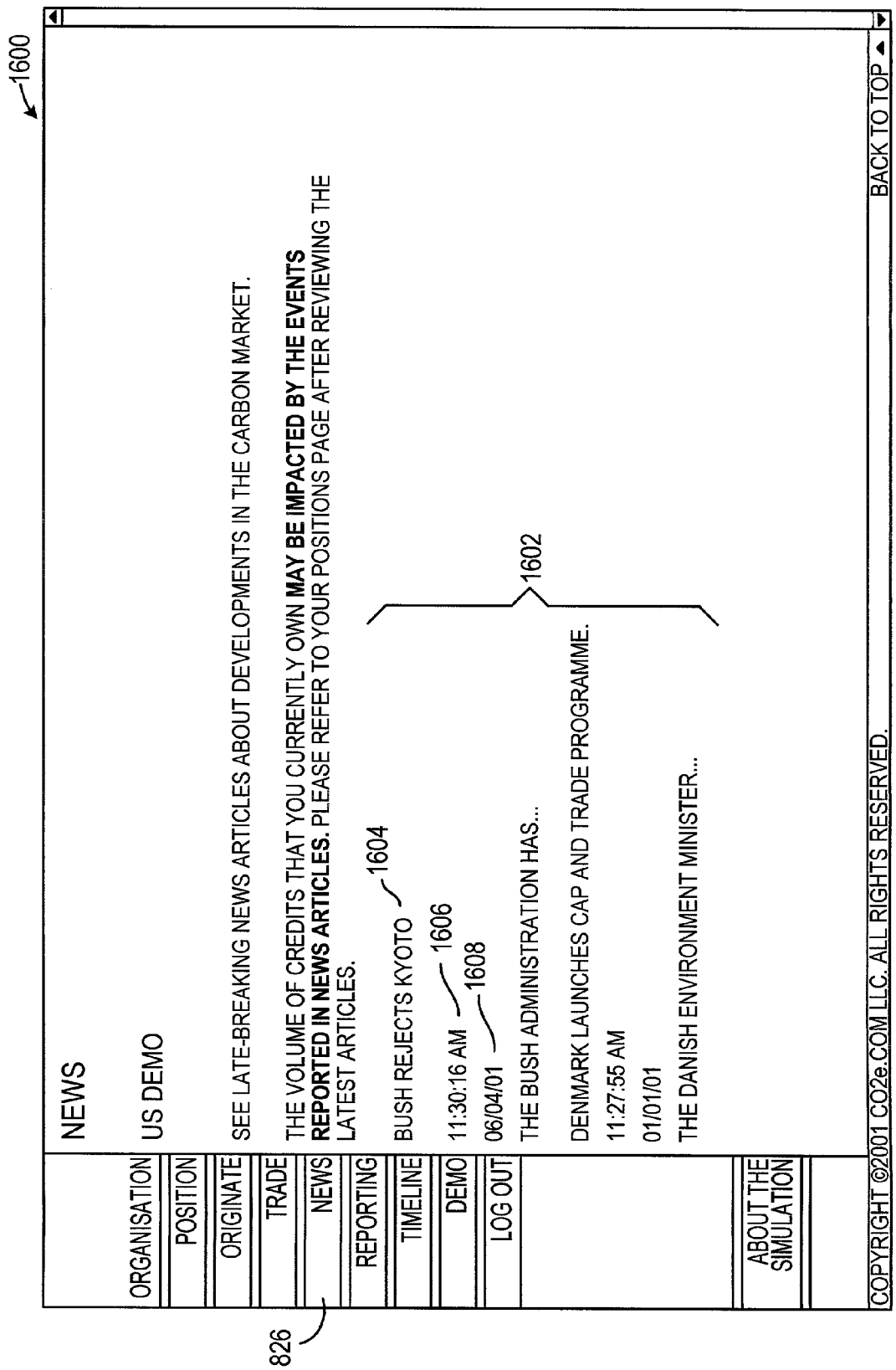
FIG. 17 shows an illustrative news screen that may be provided to the user by the electronic trading application in accordance with some embodiments of the present invention.

FIG. 17 shows an illustrative news screen 1600 that may be provided to the user by the electronic trading application in accordance with some embodiments of the present invention. The user may access news screen 1600 at anytime during the simulation to view breaking news announcements, news announcements that the user has already reviewed, or both. The electronic trading application may display news screen 1600 when the user selects news option 826 from side menu area 802 of any other screen.

News screen 1600 may include a news announcements region 1602. News announcements region 1602 may include one or more news announcements. A breaking news announcement in news announcements region 1602 may have a highlighted headline to alert the user to its presence. A news announcement that the user has already reviewed, in contrast, may have a headline in a normal, unhighlighted font.

In one suitable approach, a news announcement such as a news announcement 1604 may have an impact on the user's organisation. For example, the simulation administrator may input news announcement 1604 so that is reduces or increases the user's current level of $CO_2e$ emission reductions. News announcement 1604 has a headline stating that "Bush rejects Kyoto." A realistic impact of this news announcement may be a drastic reduction in value of an organisations emission reductions, especially for an organisation that is simulating an American corporation.

In another suitable approach, news announcement 1604 may create noise to simulate an actual trading environment. For example, news announcement 1604 may create a distraction to the user, thereby drawing the user away from other portions of the trading simulation to news screen 1600.

News announcement 1604 may include a date 1606 and a time 1608. Date 1606 and time 1608 show the user that news announcement 1604 is associated with a specific release date and time. However, date 1606 and time 1608 may differ from the date on which news announcement 1604 may impact the user's organisation. For example, the simulation administrator may create news announcement 1604 so that the impact, if any, is for a particular date in the future. This may allow news announcement 1604 to function as a realistic news release (e.g., the impact is not felt instantaneously upon the release of the news).

During the trading simulation, the electronic trading application may maintain a timeline of the various sessions that form the simulation. For example, the trading simulation may include sessions such as registration, analysis, trading, reconciliation, or any other suitable session. The electronic trading application may provide the user with access to a timeline screen.

FIG. 18 shows an illustrative timeline screen 1700 that may be provided to the user by the electronic trading application in accordance with some embodiments of the present invention. The electronic trading application may display timeline screen 1700 when the user selects timeline option 830 from side menu area 802 of any other screen. Timeline screen 1700 may include a timeline 1708 of the trading simulation. Timeline 1708 may include a list of sessions involved in the trading simulation, a start time for each session, an end time for each session, and a status for each session. Possible sessions may include registration, analysis, trading, reconciliation, or any other suitable trading session.

In the example shown in timeline 1708, the trading simulation may start with a registration session on Jun. 14, 2001. As shown, the registration session started at 10:50 AM and ended at 11:00 AM. The duration of a session, such as ten minutes for the registration session, is set by the simulation administrator either during the simulation or prior to the start of the simulation. Because the registration session has started and ended, the status of the registration session is "completed."

Following the registration session, the trading simulation may include a number of analysis and trading sessions. An analysis session is a session during which the user may make transactions, such as generating additional credits or internal reductions as shown in FIG. 13, in preparation for the next trading round. During an analysis session, trades may not be made. A trading session (as shown in FIG. 15) is a session during which the user may buy and sell $CO_2e$ emission reductions. As shown, in the trading session from year 2008 to year 2012, the status of the session is "executing." Thus, the session is not yet over, as demonstrated by the end time of 11:50 AM and a current server time 1706 of 11:49 AM.

Timeline screen 1700 may include a remaining time field 1704. Remaining time field 1704 may include the time remaining in the current round of the trading simulation (e.g., 11 seconds). Current server time field 1706 may include the date and time at the location of the trading server, for example, trading server 114 of FIG. 1. If the trading server is located in New York, for example, current server time field 1706 may include the current date and time in the Eastern time zone.

As shown in timeline 1708, the trading simulation may close with a session called reconciliation. During reconciliation, the electronic trading application may provide the user with one more chance to generate credits or internal reductions. Following reconciliation, when the trading simulation is finished, the electronic trading application may provide the user with a simulation report, alerting the user that the trading simulation is complete.

Figure 19:
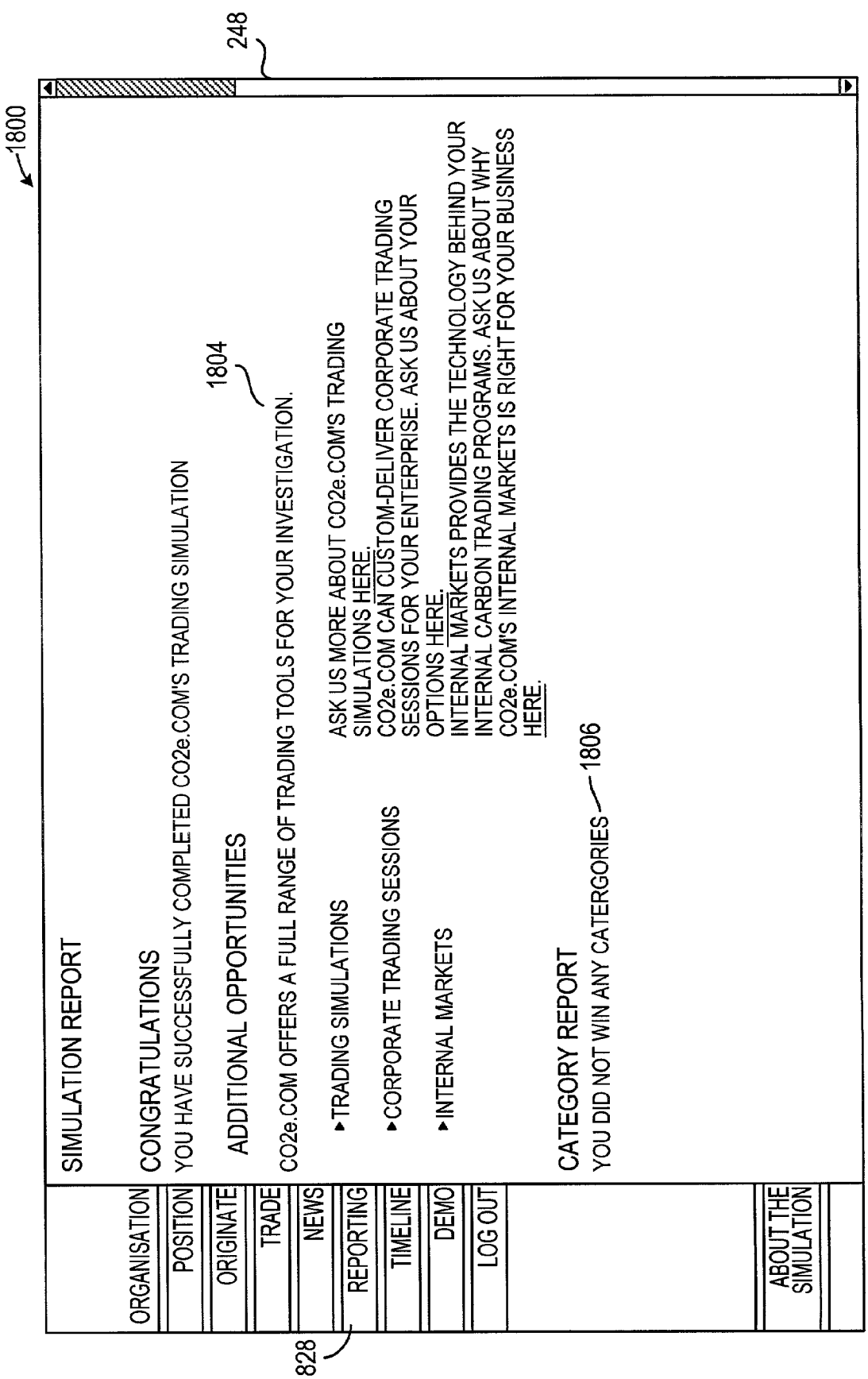
FIGS. 19-20 show an illustrative simulation report screen that may be provided to the user by the electronic trading application in accordance with some embodiments of the present invention.
Figure 20:
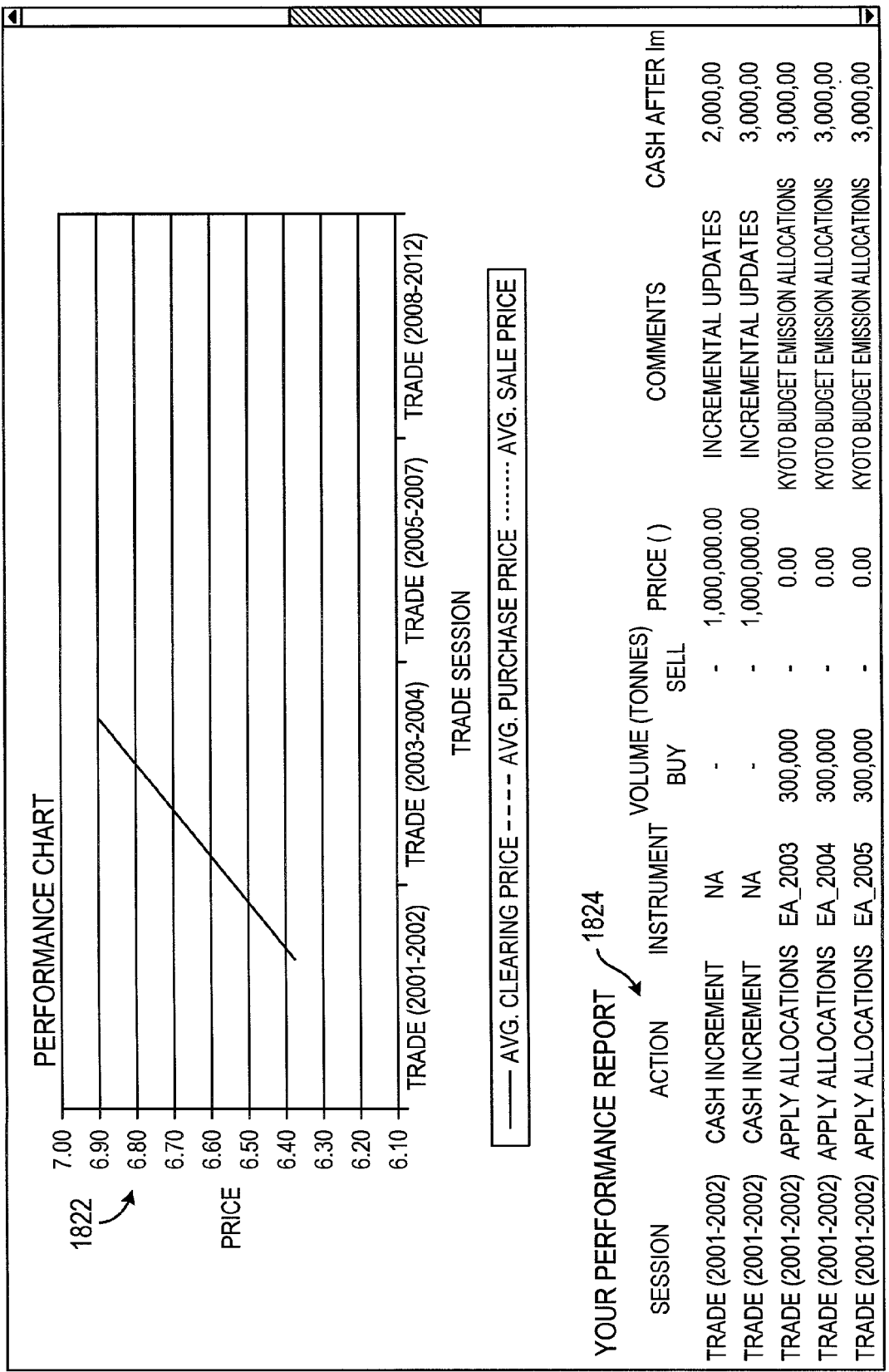

FIGS. 19-20 show an illustrative simulation report screen that may be provided to the user by the electronic trading application in accordance with some embodiments of the present invention. The simulation report screen in FIGS.

19-20 may provide the user with a final report of the trading simulation at the conclusion of the simulation. The electronic trading application may display the simulation report screens when the user selects reporting option 828 from side menu area 802 of any other screen.

FIG. 19 shows a portion 1800 of the simulation report screen. The electronic trading application may display another portion of the screen, as shown in FIG. 20, when the user uses scroll bar 248 to access the other portion. Simulation report screen 1800 may include an additional opportunities region 1804. Additional opportunities region 1804 may present the user with a list of trading tools that may help to familiarize the user with $CO_2e$ emission reductions trading. Category winners region 1806 may provide the user with a list of any categories that the user won. As shown, category winners region 1806 shows that the user "did not win any categories."

FIG. 20 is another portion 1820 of the simulation report screen. Simulation report screen 1820 may include a performance chart 1822 and a performance report table 1824. Performance chart 1822 may track an average clearing price per tonne of $CO_2e$ emission reductions, an average purchase prize per tonne of $CO_2e$ emission reductions, an average sale price per tonne of $CO_2e$ emission reductions, or any other suitable measure of performance. These prices may provide the user with a graphical representation of how the user performed throughout the duration of the trading simulation. As shown, only one curve is provided. However, any number of curves as described above may be provided.

Performance report table 1824 may provide the user with a list of one or more actions that the user performed during the trading simulation. Performance report table 1824 may provide the user with the session in which the action occurred, the action, the instrument (e.g., the type of trade), the volume bought or sold, the price, the comment on the action, the cash value available after the action, or any other suitable performance information.

At any time during or prior to the trading simulation, the electronic trading application may provide the user with access to a screen including general information about the trading simulation. For example, such a screen may include the rules of the simulation, any assumptions made in the simulation, or any other information relevant to the user's participation in the trading simulation.

FIG. 21 shows an illustrative information screen 1900 that may be provided to the user by the electronic trading application in accordance with some embodiments of the present invention. The electronic trading application may display information screen 1900 when the user selects about the simulation option 836 from side menu area 802 of any other screen. Information screen 1900 is substantially similar to information screen 700 of FIG. 8. However, as illustrated, information screen 1900 includes a side menu area. The side menu area may demonstrate that the user is logged onto the simulation and therefore has access to the screens for which links are provided in the side menu area.

FIGS. 22-34 show maintenance screens that may be provided to a user such as a simulation administrator by the electronic trading application in accordance with some embodiments of the present invention. The simulation administrator may take part in the trading simulation using, for example, administrator computer equipment 108 of FIG. 1. The simulation administrator may perform administrative tasks to maintain various aspects of the simulation. These maintenance tasks may be performed behind the scenes so that participants in the trading simulation are unaware of the tasks.

The simulation administrator may log onto the simulation in the same way as a user in the simulation (e.g., as shown in FIG. 4). The simulation administrator may enter a username and password that are unique to the administrator. Because the simulation administrator's username and password may be associated with the simulation administrator only, the electronic trading application may provide the simulation administrator with access to all screens of the trading simulation.

One of the simulation administrator's tasks may be to maintain the real-time aspect of the trading simulation. The simulation administrator may change start and end times for trading simulation sessions both during and prior to the start of the simulation.

FIG. 22 shows an illustrative real times maintenance screen 2000 that may be provided to a user such as a simulation administrator by the electronic trading application in accordance with some embodiments of the present invention. The electronic trading application may display real times maintenance screen 2000 when the administrator selects a maintain real times option 2022 from side menu area 2002 of any other screen.

Side menu area 2002 may be included in any of FIGS. 9-34 that require a side menu. Some of the options provided in side menu area 2002 may include the options provided in side menu area 802 for a user (e.g., organisation option, position option, originate option, trade option, news option, reporting option, timeline option, demo option, log out option, and about the simulation option). Side menu area 2002 may provide additional options for the simulation administrator. Side menu area 2002 may include a maintain real times option 2022, a customise news links option 2024, a display category winners option 2026, a simulation maintenance option 2028, an organisation maintenance option 2030, a country maintenance option 2032, a start/stop simulation option 2034, or any other suitable option related to the simulation administrator's tasks. The options included in side menu area 2002 may allow the simulation administrator to access various screens within the electronic trading simulation. For example, when the simulation administrator selects country maintenance option 2032 from real times maintenance screen 2000, the electronic trading application may display a country maintenance screen.

Real times maintenance screen 2000 may include a time entry region 2004 that provides the simulation administrator with the ability to maintain the real time aspect of the simulation. The simulation administrator may enter start times and end times for the various sessions of the trading simulation, such as registration, trading, and reconciliation. For example, the simulation administrator may enter a start time in a start date field 2014 and a start time field 2016. The simulation administrator may enter an end time in an end date field 2018 and an end time field 2020. As shown, the simulation administrator may only set some of the start and end times shown in time entry region 2004. This is because once a session has ended, the simulation administrator may no longer change the start and end times. This reflects the real-time aspect of the trading simulation.

The simulation administrator may enter a time in an increase time text box 2006 by which to increase all times in time entry region 2004. For example, the simulation administrator may enter a time of five minutes in increase time text box 2006. When the simulation administrator enters this time, the electronic trading application may increase all applicable start and end times in time entry region 2004 (e.g., times for sessions that have not yet finished) by five minutes.

When the simulation administrator selects a clear all button 2008, the electronic trading application may clear all entries in time entry region 2004. When the simulation administrator selects submit button 2010, the electronic trading application may update the start and end times for the simulation according to the entries in time entry region 2004. This update may be reflected in timeline screen 1700 of FIG. 18.

As described above in the context of FIGS. 16-17, the simulation administrator may release news announcements throughout the duration of the trading simulation. The electronic trading application may provide the simulation administrator with a customise simulation news screen so that the administrator may create these news announcements.

Figure 23:
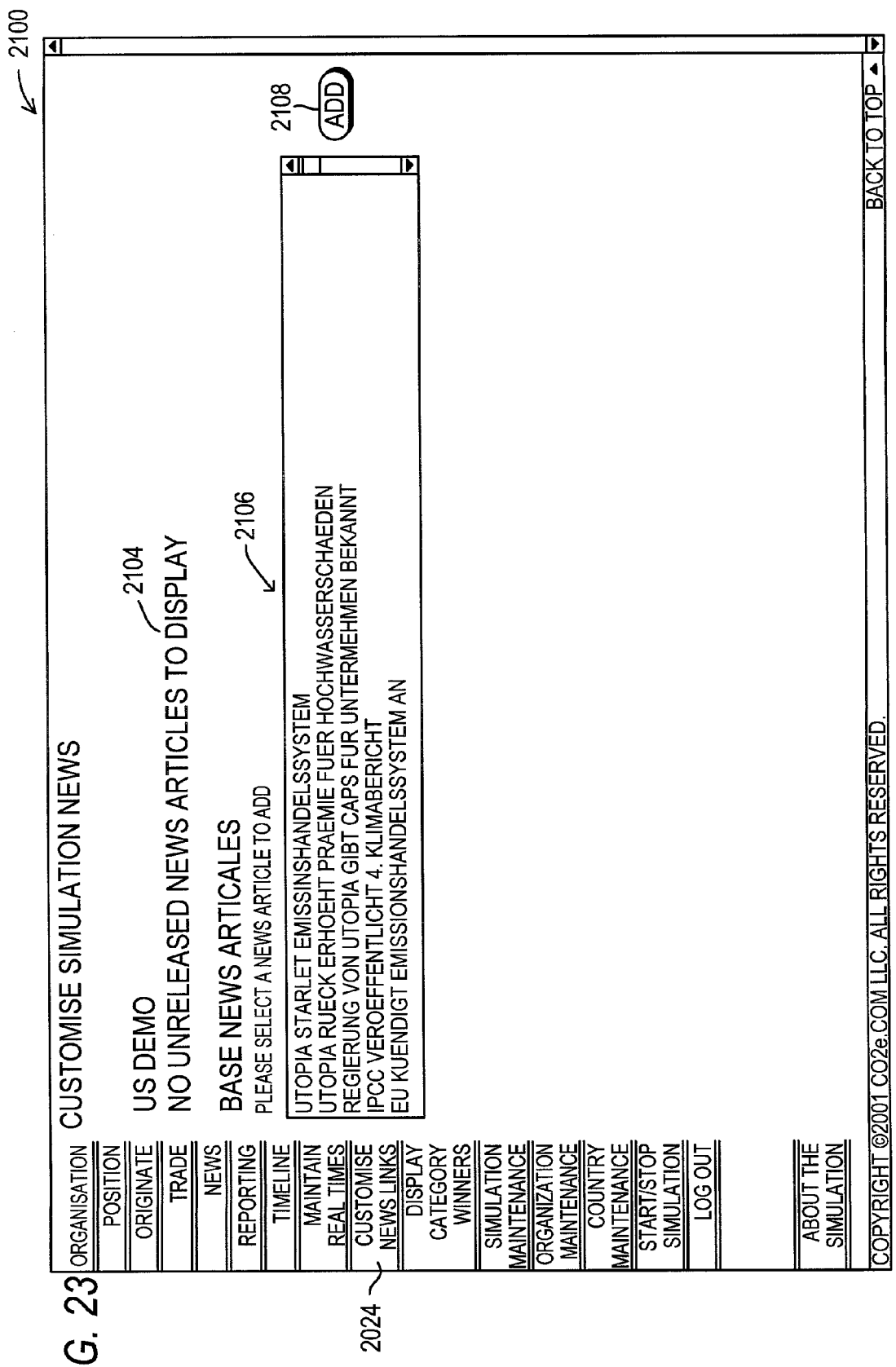
FIG. 23 is an illustrative customise simulation news screen that may be provided to a user such as a simulation administrator by the electronic trading application in accordance with some embodiments of the present invention.

FIG. 23 shows an illustrative customise simulation news screen 2100 that may be provided to a user such as a simulation administrator by the electronic trading application in accordance with some embodiments of the present invention. The electronic trading application may display customise simulation news screen 2100 when the simulation administrator selects customise news links option 2024 from side menu area 2002 of any other screen.

Customise simulation news screen 2100 may include a news article status region 2104. News article status region 2104 may provide the simulation administrator with a list of unreleased news articles, if any. For example, the simulation administrator may create a news announcement in customise simulation news screen 2100, but refrain from releasing the announcement to the participants in the simulation. As shown, there are no unreleased news articles to display. A news article list 2106 may provide the simulation administrator with a list of news articles to release to the participants in the simulation. As described above, these articles may be articles that the simulation administrator created but refrained from releasing. In another example, these articles may be articles that have already been released in previous simulations or in the same simulation. The simulation administrator may select a news article from news article list 2106. When the simulation administrator selects add button 2108, the electronic trading application may display a screen (not shown) that includes information on the article.

The simulation administrator may choose to create a new news announcement for release, instead of selecting an existing news article from news article list 2106. The electronic trading application may provide the simulation administrator with access to a news article creation screen, from which the simulation administrator may create a new news release.

Figure 24:
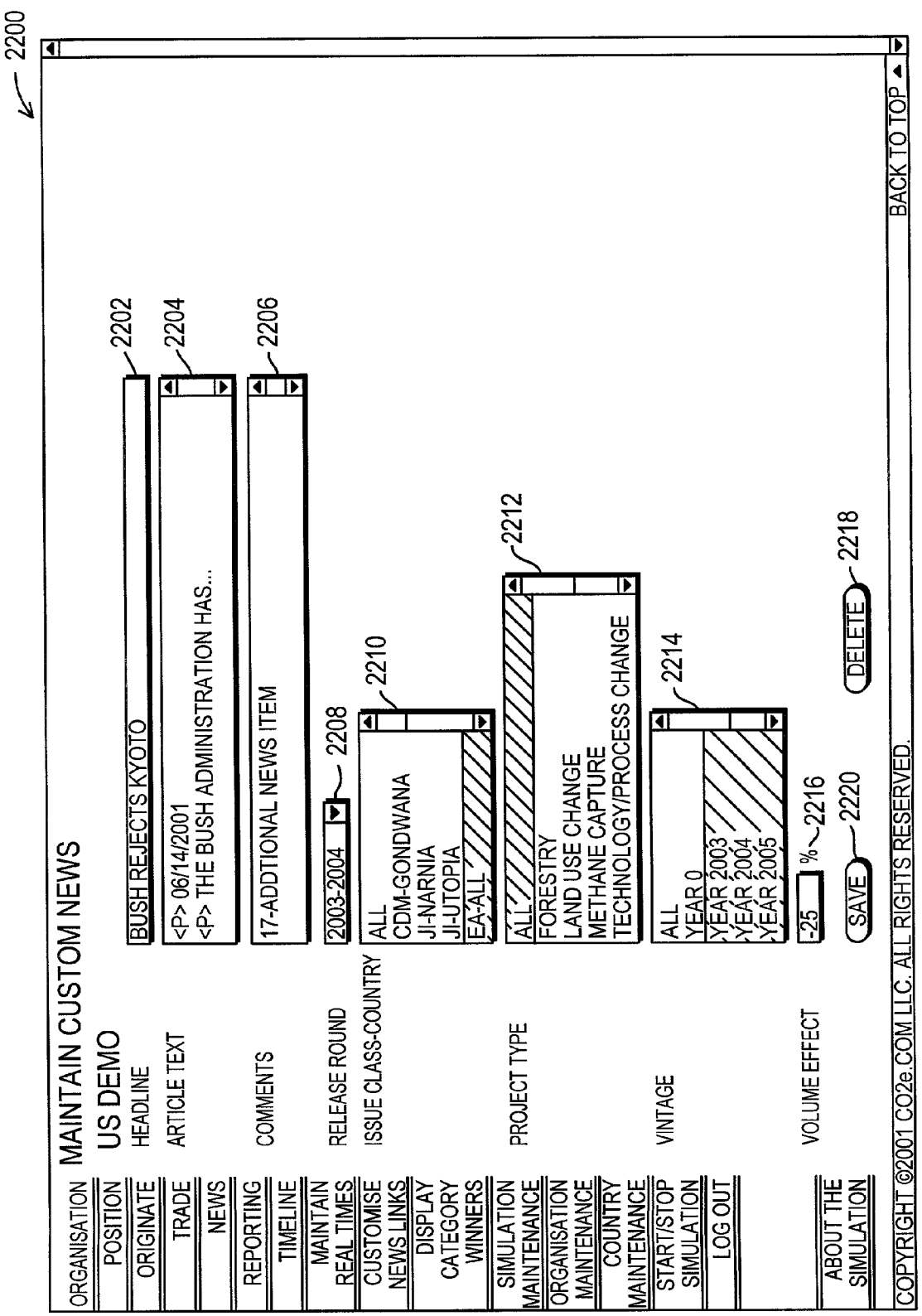
FIG. 24 shows an illustrative news article creation screen that may be provided to a user such as a simulation administrator by the electronic trading application in accordance with some embodiments of the present invention.

FIG. 24 shows an illustrative news article creation screen 2200 that may be provided to a user such as a simulation administrator by the electronic trading application in accordance with some embodiments of the present invention. In one example, the electronic trading application may display news article creation screen 2200 when the user selects acid button 2108 (FIG. 23) but does not select a news article to add from news article list 2106 (FIG. 23).

The simulation administrator may enter a headline for the news article in a headline text box 2202 (e.g., Bush rejects Kyoto). The text of the article may be entered in an article text box 2204 (e.g., The Bush administration has . . . ). Comments in connection with the article may be entered in a comments text box 2206. The comments may be for the reference of the simulation administrator. The simulation administrator may select a release round for the news article from a release round drop-down menu 2208 (e.g., 2003-2004). For example, the release round may be a specific range of years (e.g., a round) in which to release the news article to the participants in the simulation.

The simulation administrator may select an issue class and country from an issue class and country menu 2210. For example, the news article may affect a specific type of emission reductions, such as all types, clean development mechanisms (CDMs), joint implementations (JIs), emission allowances (EAs), or any other suitable type of emission reductions. Such emission reductions may be associated with a specific country assigned to the participants in the simulation, for example, Gondwana, Narnia, Utopia, or any other suitable country. As shown, the simulation administrator has chosen emission allowances as the issue class. The simulation administrator has selected "all countries" from issue class and country menu 2210 such that the emission allowances may be applied to all countries participating in the electronic trading simulation.

The simulation administrator may select a project type from a project type menu 2212. For example, the news article may affect any type of project, such as all types, forestry, land use change, methane, technology/process change, or any other suitable type of project. As shown, the simulation administrator has chosen a project type of all types.

The vintage may be selected from a vintage menu 2214. The vintage may be the year or years when the news article is scheduled to have an affect on the simulation participants. As shown, for example, the simulation administrator has chosen year 2003 through year 2005.

The simulation administrator may enter a percentage of volume of $CO_2e$ emission reductions to effect in a volume effect text box 2216. The percentage may be the percentage of volume of $CO_2e$ that the news article will affect in the selected vintage year or years. For example, the simulation administrator may enter a percentage of −25% in volume effect text box 2216. Thus, the emission reductions selected in issue class and country menu 2210 and project type menu 2212 will decrease in amount by 25 percent in the years 2003 through 2005. This effect demonstrates how news articles may create risk in the trading simulation. In another example, the news article may have no effect on the user's organisation. It may merely create noise to distract the user from other activities in the trading simulation. When the simulation administrator selects a delete button 2218, the electronic trading application may delete any entries made in news article creation screen 2200.

When the simulation administrator selects a save button 2220, the electronic trading application may save the entries made in news article creation screen 2200 and may display a customise simulation news screen that includes the new news announcement.

Figure 25:
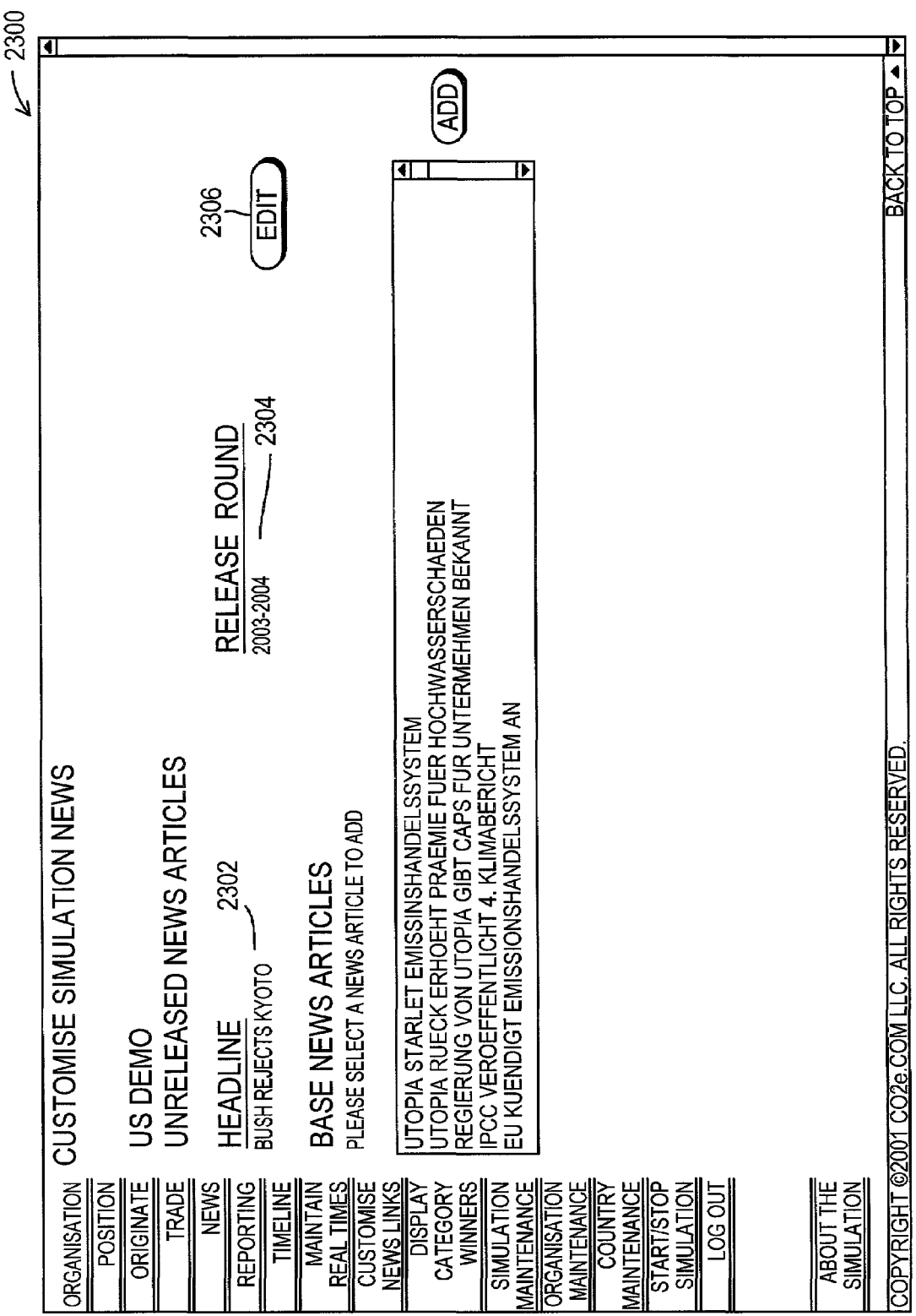
FIG. 25 shows an illustrative customise simulation news screen that includes the unreleased news article that may be provided to a user such as a simulation administrator by the electronic trading application in accordance with some embodiments of the present invention.

FIG. 25 shows another illustrative customise simulation news screen 2300 that includes the unreleased news article created in FIG. 24. Customise simulation news screen 2300 is substantially similar to customise simulation news screen 2100 of FIG. 23. However, as illustrated, customise simulation news screen 2300 includes an unreleased news article.

In connection with the unreleased news article, customise simulation news screen 2300 may include a headline 2302, a release round 2304, and an edit button 2306. Headline 2302 may be the headline that the simulation administrator entered in news article creation screen 2200 in headline text box 2202 (as shown in FIG. 24). Release round 2304 may be the release round that the simulation administrator selected from release round drop-down menu 2208 (FIG. 24). The simulation administrator may select edit button 2306 to make any changes to the article prior to release. When the simulation administrator selects edit button 2306, the electronic trading application may display a screen such as news article creation screen 2200 of FIG. 24.

The electronic trading application may provide the simulation administrator with the ability to maintain the simulation parameters throughout the simulation (e.g., the cost curve, business-as-usual curve, interest rate, or any other suitable simulation parameter).

Figure 26:
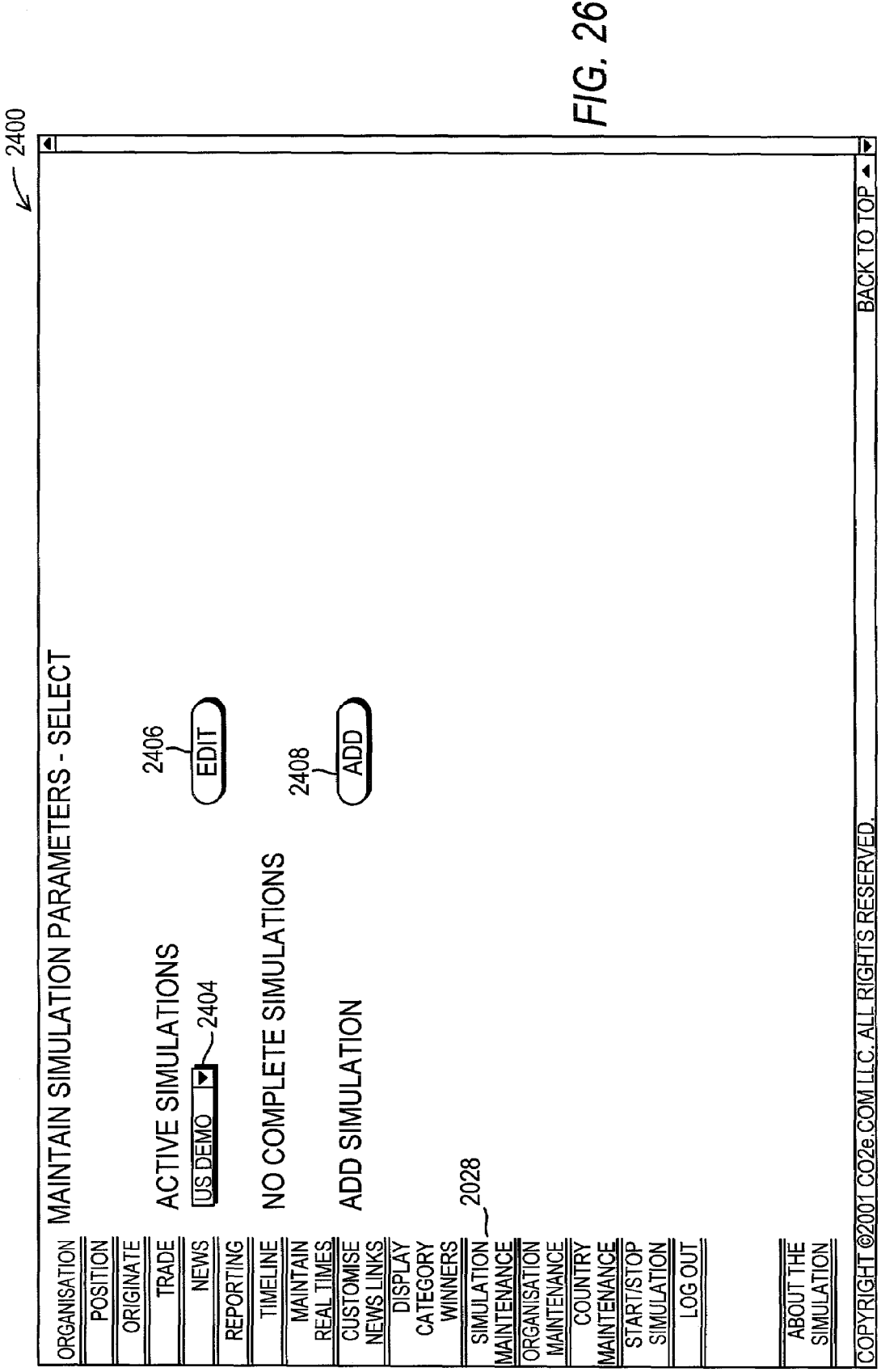
FIG. 26 shows an illustrative simulation maintenance screen that may be provided to a user such as a simulation administrator by the electronic trading application in accordance with some embodiments of the present invention.

FIG. 26 shows an illustrative simulation maintenance screen 2400 that may be provided to a user such as a simulation administrator by the electronic trading application in accordance with some embodiments of the present invention. The electronic trading application may display simulation maintenance screen 2400 when the simulation administrator selects simulation maintenance option 2028 from side menu area 2002 of any other screen.

The simulation administrator may acid a new simulation by selecting an add simulation button 2408. When the simulation administrator selects add simulation button 2408, the electronic trading application may display a screen (not shown) that allows the simulation administrator to create a new simulation.

The simulation administrator may maintain the parameters for an active simulation by selecting the active simulation from an active simulations drop-down menu 2404. The simulation administrator may select an edit button 2406 to access a screen from which to make edits to the selected simulation.

FIG. 27 shows an illustrative simulation parameter edit screen 2500 that may be provided to a user such as a simulation administrator by the electronic trading application in accordance with some embodiments of the present invention. The electronic trading application may display simulation parameter edit screen 2500 when the simulation administrator selects edit button 2406 of simulation maintenance screen 2400 (FIG. 26).

The simulation administrator may have the ability to edit the text presented in text boxes 2502, 2504, 2506, 2508, and 2510. The electronic trading application may present the name of the current simulation in name text box 2502, for example, US Demo. In announcement year text box 2504, the electronic trading application may present an announcement year, for example, year 2002. The announcement year may be the year in which the emission allowances for the participants in the simulation are to be announced. The electronic trading application may present a percentage for the slope of a cost curve in cost curve text box 2506, for example, zero percent. The cost curve (not shown) may graphically present the amount of money necessary to produce a certain amount of emission reductions over a span of time. For example, with a cost curve slope of zero percent, the cost of producing $CO_2e$ emission reductions over time does not change.

The electronic trading application may present a percentage for a slope of a business-as-usual curve in business-as-usual text box 2508, for example, zero percent. The business-as-usual curve (not shown) may graphically present the amount of carbon dioxide equivalent emissions produced by a participant over a span of time. For example, with a business-as-usual curve slope of zero percent, the emissions produced by the participant does not change over time.

The electronic trading application may present an interest rate in interest text box 2510, for example, seven percent. The interest rate in interest percentage text box 2510 may correspond to the current interest rate. For example, if the user of the simulation is participating in the trading simulation from the United States, the simulation administrator may input an interest rate corresponding to the current interest rate in the United States. This helps to make the trading simulation as realistic as possible.

When the simulation administrator selects a save button 2512, the electronic trading application may update any changes made to one or more of text boxes 2502, 2504, 2506, 2508, and 2510 accordingly. When the simulation administrator selects a back button 2514, the electronic trading application may display the previous screen, such as simulation maintenance screen 2400 of FIG. 26.

As described above in the context of FIGS. 26-27, the simulation administrator may edit various parameters of the trading simulation. The electronic trading application may also provide the simulation administrator with the ability to edit various parameters in connection with any organisations participating in the simulation.

Figure 28:
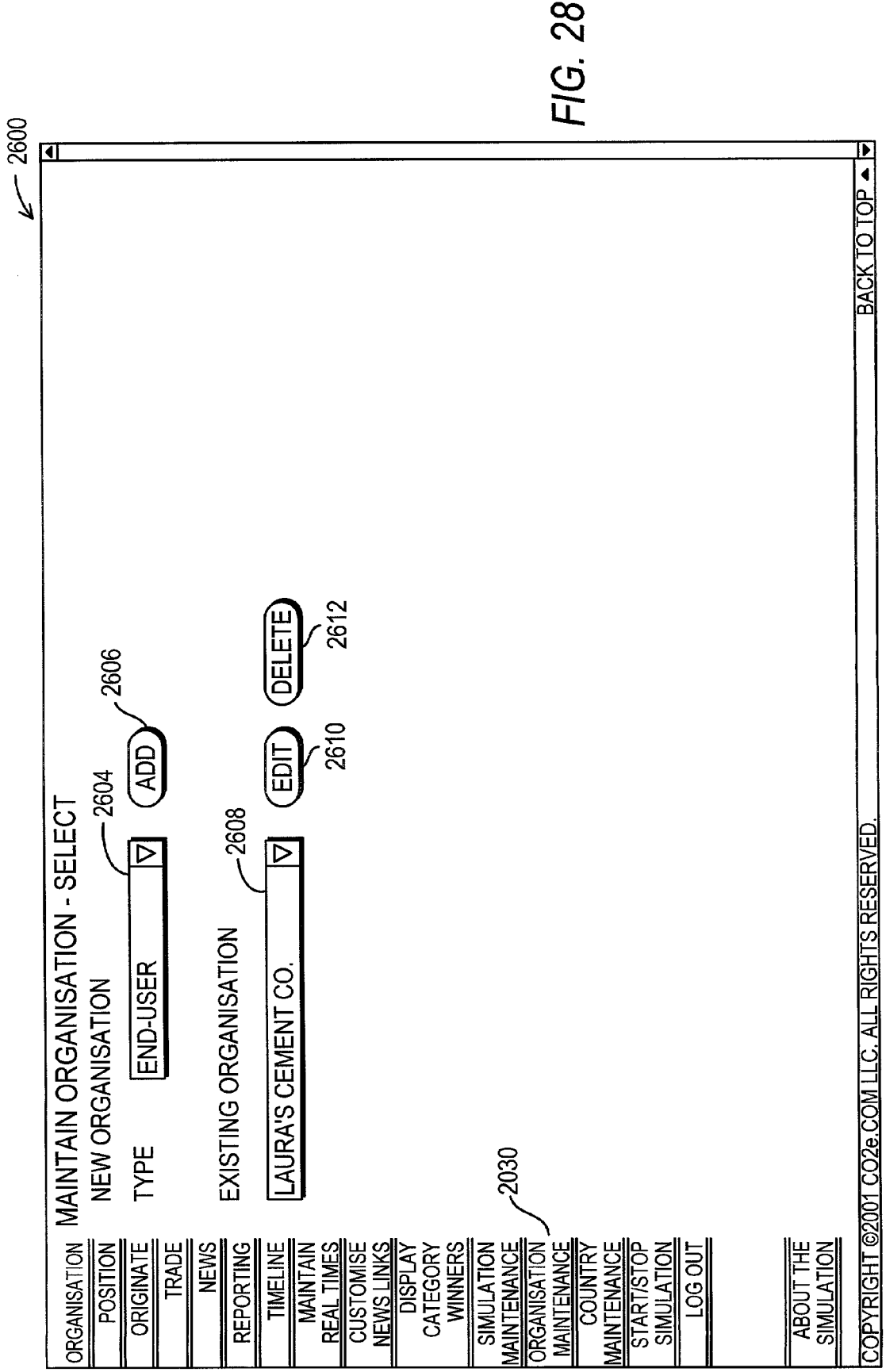
FIG. 28 shows an illustrative organisation maintenance screen that may be provided to a user such as a simulation administrator by the electronic trading application in accordance with some embodiments of the present invention.

FIG. 28 shows an illustrative organisation maintenance screen 2600 that may be provided to a user such as a simulation administrator by the electronic trading application in accordance with some embodiments of the present invention. The electronic trading application may display organisation maintenance screen 2600 when the simulation administrator selects organisation maintenance option 2030 from side menu area 2002 of any other screen.

The simulation administrator may select an existing organisation (e.g., an organisation that is already set-up to participate in the trading simulation) from an existing organisation drop-down menu 2608. When the simulation administrator selects an edit button 2610 to edit various attributes of the organisation, the electronic trading application may provide the simulation administrator with a screen (not shown) that includes the attributes of the organisation for editing. When the simulation administrator selects a delete button 2612, the electronic trading application may delete the selected organisation from the simulation.

Organisation maintenance screen 2600 may include an organisation type drop-down menu 2604. The electronic trading application may provide the simulation administrator with the ability to add a new organisation in addition to any organisations already existing in the simulation by selecting a type from organisation type drop-down menu 2604. When the simulation administrator selects an add button 2606, the electronic trading application may display a screen in which the administrator may input attributes of the new organisation.

FIG. 29 shows an illustrative organisation details screen 2700 that may be provided to EL user such as a simulation administrator by the electronic trading application in accordance with some embodiments of the present invention. The electronic trading application may display organisation details screen 2700 when the simulation administrator selects add button 2606 of FIG. 28 to add a new organisation to the trading simulation.

The details that the simulation administrator may enter in organisation details screen 2700 may reflect an actual entity (e.g., an entity that a specific user represents). For example, the details may be attributes of a user's actual organisation (e.g., company, country, non-profit organisation, or any other suitable entity). The simulation administrator may enter a name for the new organisation in a name text box 2702, for example, John's Cattle Company. The simulation administrator may emitter a description of the new organisation (e.g., John's Cattle Company is a company that . . . ) in a description text box 2704. The description may be a short synopsis of the new organisation.

In text boxes 2706, 2708, 2710, and 2712, the simulation administrator may input values corresponding the new organisation's available cash. For example, an amount of starting cash may be entered in starting cash text box 2706. A borrowing limit (e.g., an amount of money that the new organisation may borrow throughout the duration of the trading simulation) may be entered in borrowing limit text box 2708. A yearly cash allocation may be entered in yearly cash allocation text box 2710, and the corresponding yearly cash change may be entered in yearly cash change text box 2712.

An industry type may be selected from drop-down menu 2714. As shown, for example, an industry type such as "Power Generator" may be selected.

The simulation administrator may select a country for the new organisation (e.g., Utopia) from a country drop-down menu 2716. The corresponding issue class and project type may be selected from crop-down menus 2718 and 2720, respectively. To save information entered or selected in organisation details screen 2700, the simulation administrator may select save button 2722. When the simulation administrator selects save button 2722, the electronic trading application may display organisation maintenance screen 2600 of FIG. 28.

To access the values that create a cost curve for the new organisation, the simulation administrator may select a cost curve button 2724. When the simulation administrator selects cost curve button 2724, the electronic trading application may display a cost curve screen.

Figure 30:
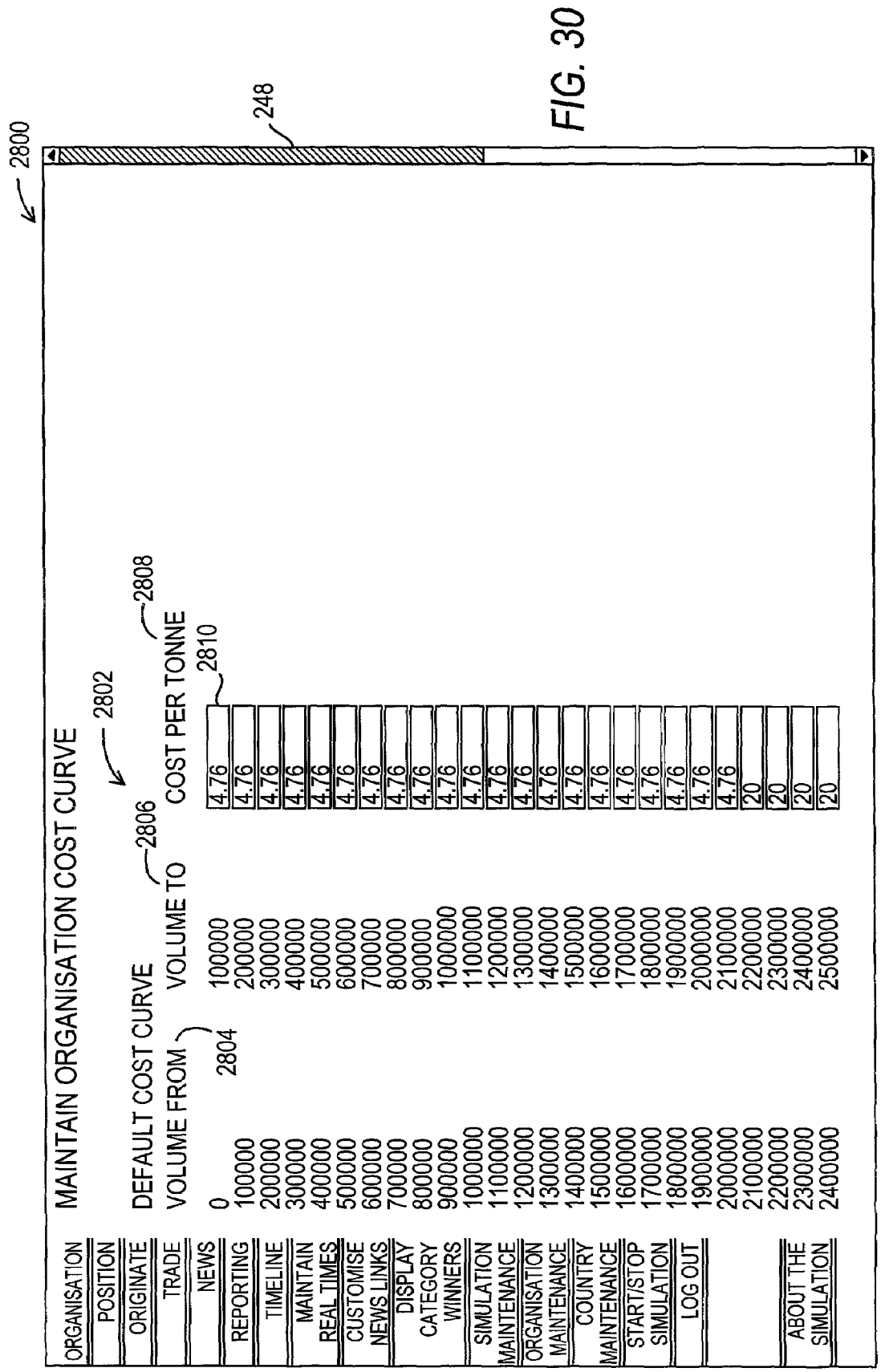

FIGS. 30-31 show an illustrative cost curve maintenance screen that may be provided to a user such as a simulation administrator by the electronic trading application in accordance with some embodiments of the present invention. The electronic trading application may display the cost curve maintenance screen when the simulation administrator selects cost curve button 2724 of FIG. 29.

FIG. 30 shows a portion 2800 of the illustrative cost curve maintenance screen. The electronic trading application may display another portion of the screen, as shown in FIG. 31, when the simulation administrator uses scroll bar 248.

Cost curve maintenance screen 2800 may include a cost curve table 2802. Cost curve table 2802 may track the cost of $CO_2e$ emission reductions in a selected volume increment. For example, cost curve table 2802 may track the cost per tonne of $CO_2e$ emission reductions in increments of 100,000 tonnes. The increments are shown as starting at a value given in a column 2804 and ending at a value given in a column 2806. The electronic trading application may provide a cost per tonne column 2808 for entry of the cost per tonne of $CO_2e$ emission reductions in text boxes 2810. Cost per tonne column 2808 may include as many text boxes 2810 as necessary to accurately define the cost curve.

FIG. 31 shows another portion 2820 of the cost curve maintenance screen. Cost curve maintenance screen 2820 may include an apply last cost to rest option with corresponding yes and no boxes 2822 and 2824, respectively. The option to apply the last cost to rest may provide the simulation administrator with the ability to apply a value in the last cost per tonne text box 2810 in cost per tonne column 2808 to the entirety of the column. Using this option, the simulation administrator may not need to enter identical cost values in all of the text boxes 2810. When the simulation administrator selects a save button 2826, the electronic trading application may save the values entered in cost per tonne column 2808 and return to FIG. 29.

Referring back to FIG. 29, to access the yearly values (e.g., business-as-usual values and allocations following from the Kyoto Protocol) for the organisation, the simulation administrator may select a yearly values button 2726. When the simulation administrator selects yearly values button 2726, the electronic trading application may display a yearly values maintenance screen.

Figure 33:
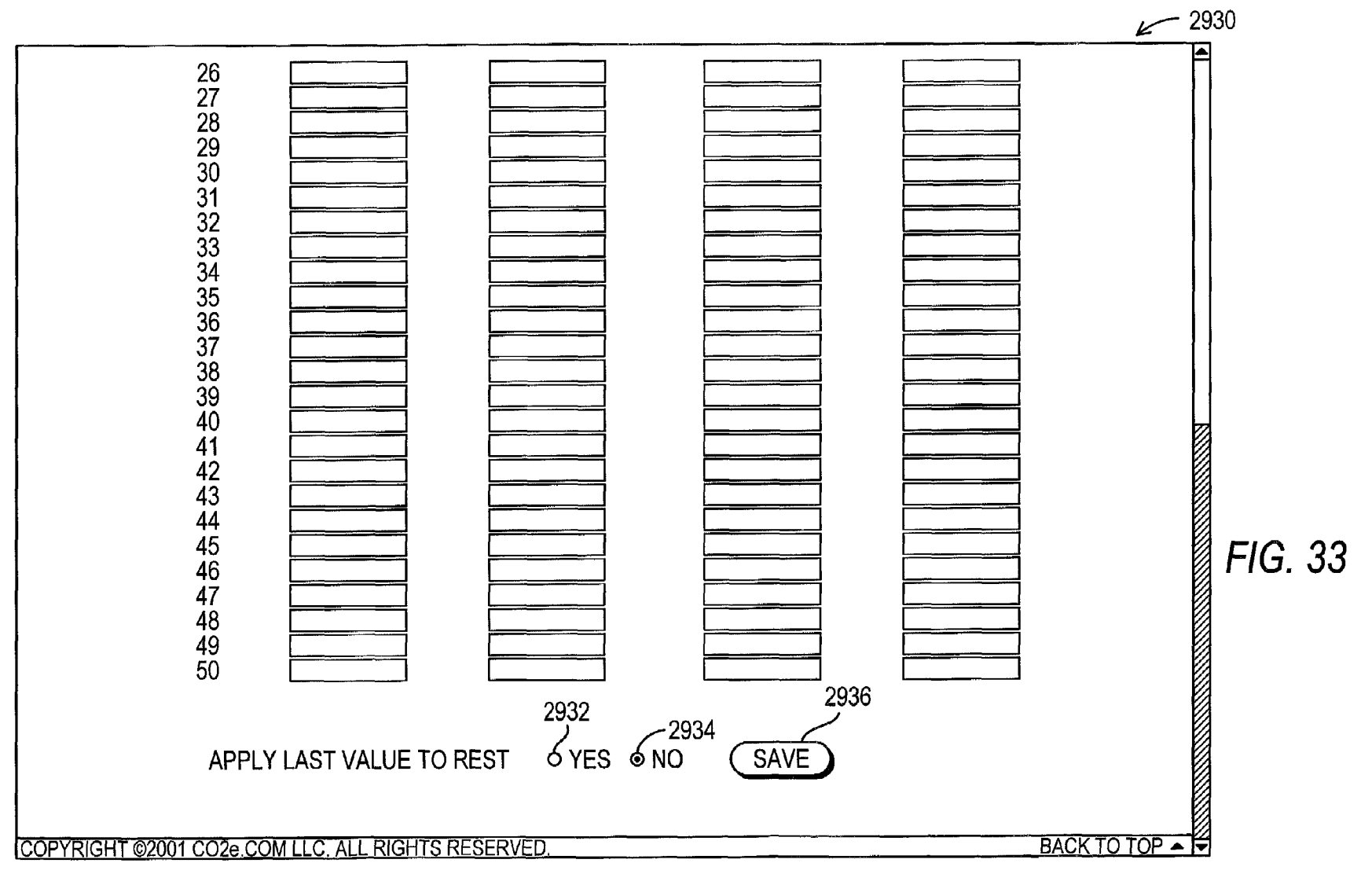

FIGS. 32-33 show an illustrative yearly values maintenance screen that may be provided to a user such as a simulation administrator by the electronic trading application in accordance with some embodiments of the present invention. The electronic trading application may display the yearly values maintenance screen when the simulation administrator selects yearly values button 2726 of FIG. 29.

FIG. 32 shows a portion 2900 of the yearly values maintenance screen. The electronic trading application may display another portion of the screen, as shown in FIG. 33, when the simulation administrator uses scroll bar 248.

Yearly values maintenance screen 2900 may include a yearly values table 2902. Yearly values table 2902 may track various attributes pertaining to the new organisation created in organisation details screen 2700 of FIG. 29. For example, yearly values table 2902 may include a business-as-usual column 2904 that includes values for $CO_2e$ emissions over a span of time in text boxes 2906. Such values may be provided in tonnes.

Yearly values table 2902 may include a Kyoto allocation column 2908 that includes values of $CO_2e$ emissions in text boxes 2910. Such values may be values that the new organisation may be limited to in order to comply with the guidelines of the Kyoto Protocol. Forecast low and forecast high columns 2912 and 2916, respectively, may include a range of Kyoto allocation values in text boxes 2914 and 2918. For example, forecast low column 2912 may include low values of $CO_2e$ emissions in text boxes 2914 (e.g., a worst case scenario). Forecast high column 2916 may include high values of $CO_2e$ emissions in text boxes 2918 (e.g., a best case scenario).

FIG. 33 shows another portion 2930 of the yearly values maintenance screen. Yearly values maintenance screen 2930 may include an apply last value to rest option with corresponding yes and no boxes 2932 and 2934, respectively. The option to apply the last value to rest may provide the simulation administrator with the ability to apply a value in the last of each of text boxes 2906, 2910, 2914, 2918 to the entirety of the corresponding columns. Using this option, the simulation administrator may not need to enter identical values in all text boxes 2906, 2910, 2914, 2918. When the simulation administrator selects save button 2936, the electronic trading application may save the values entered in columns 2904, 2908, 2912, and 2916 and display FIG. 29.

As described above in the context of FIGS. 28-33, the electronic trading application may provide the simulation administrator with the ability to edit various attributes of organisations participating in the trading simulation. The electronic trading application may also provide the simulation administrator with the ability to edit various parameters in connection with any countries that are set-up for participation in the simulation.

Figure 34:
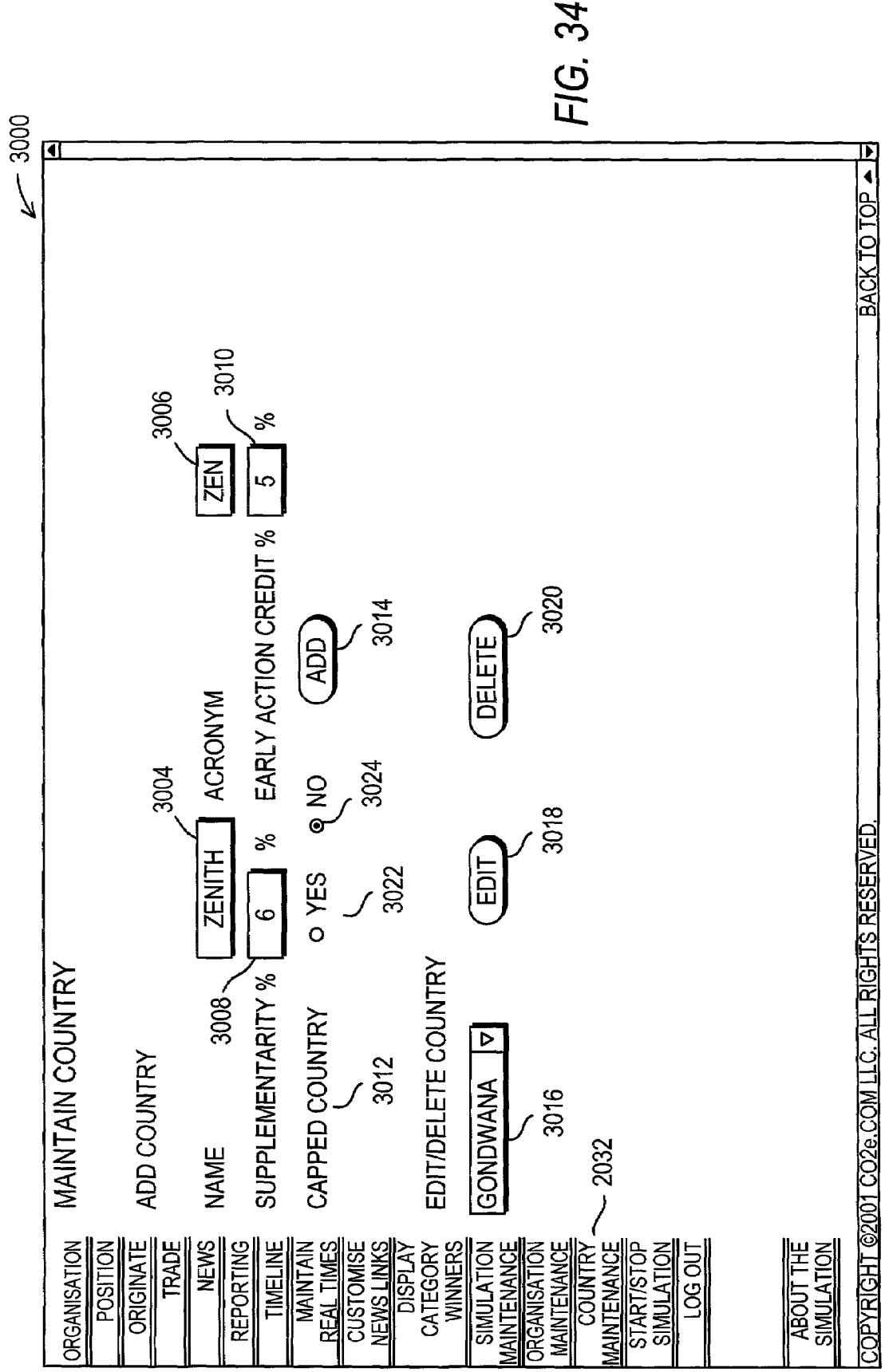
FIG. 34 shows an illustrative country maintenance screen that may be provided to a user such as a simulation administrator by the electronic trading application in accordance with some embodiments of the present invention.

FIG. 34 shows an illustrative country maintenance screen 3000 that may be provided to a user such as a simulation administrator by the electronic trading application in accordance with some embodiments of the present invention. The electronic trading application may display country maintenance screen 3000 when the simulation administrator selects country maintenance option 2032 from side menu area 2002 of any other screen.

Country maintenance screen 3000 may include various text boxes to define a new country for the trading simulation. The simulation administrator may enter a name for the new country in a name text box 3004, for example, Zenith. An acronym for the new country may be entered in an acronym text box 3006, for example, ZEN. In a supplementarity text box 3008, the simulation administrator may enter a percentage of supplementarity for the new organisation. Supplementarity is the percentage of $CO_2e$ emission reductions that a country may not sell. For example, if the supplementarity percentage for the new country is six percent, then six percent of all $CO_2e$ emission reductions created the country may not be traded.

The simulation administrator may enter a percentage for early action credit in an early action credit text box 3010. Early action credit may be the percentage of an organisation's $CO_2e$ emission reductions that may be credited back to the organisation in response to emission reductions that occur before a specific date. Such a date may be a date in connection with the Kyoto Protocol, such as the start of a period of time in which countries must comply with the Kyoto Protocol (e.g., the Kyoto Protocol Commitment Period).

A capped country option 3012 may provide the simulation administrator with the ability to cap the new country's emission allowances. For example, the simulation administrator may select a yes option 3022 to cap the country's emissions. The simulation administrator may select a no option 3024 so that the new country does not have a cap on its emissions. When the simulation administrator selects an add button 3014, the electronic trading application may make the new country as defined in country maintenance screen 3000 available as an option in the trading simulation.

The simulation administrator may edit the attributes of an existing country in the trading simulation by selecting a country from a country drop-down menu 3016 (e.g., Gondwana). When the simulation administrator selects an edit button 3018, the electronic trading application may display a screen (not shown) that includes attributes of the selected country. Such a screen may include attributes such as those shown in country maintenance screen 3000. When the simulation administrator selects a delete button 3020, the electronic trading application may delete the selected country from the simulation.

The screens shown in FIGS. 3-34 are merely illustrative. Any other suitable menus, options, button, text boxes, or other content may be provided.

Figure 35:
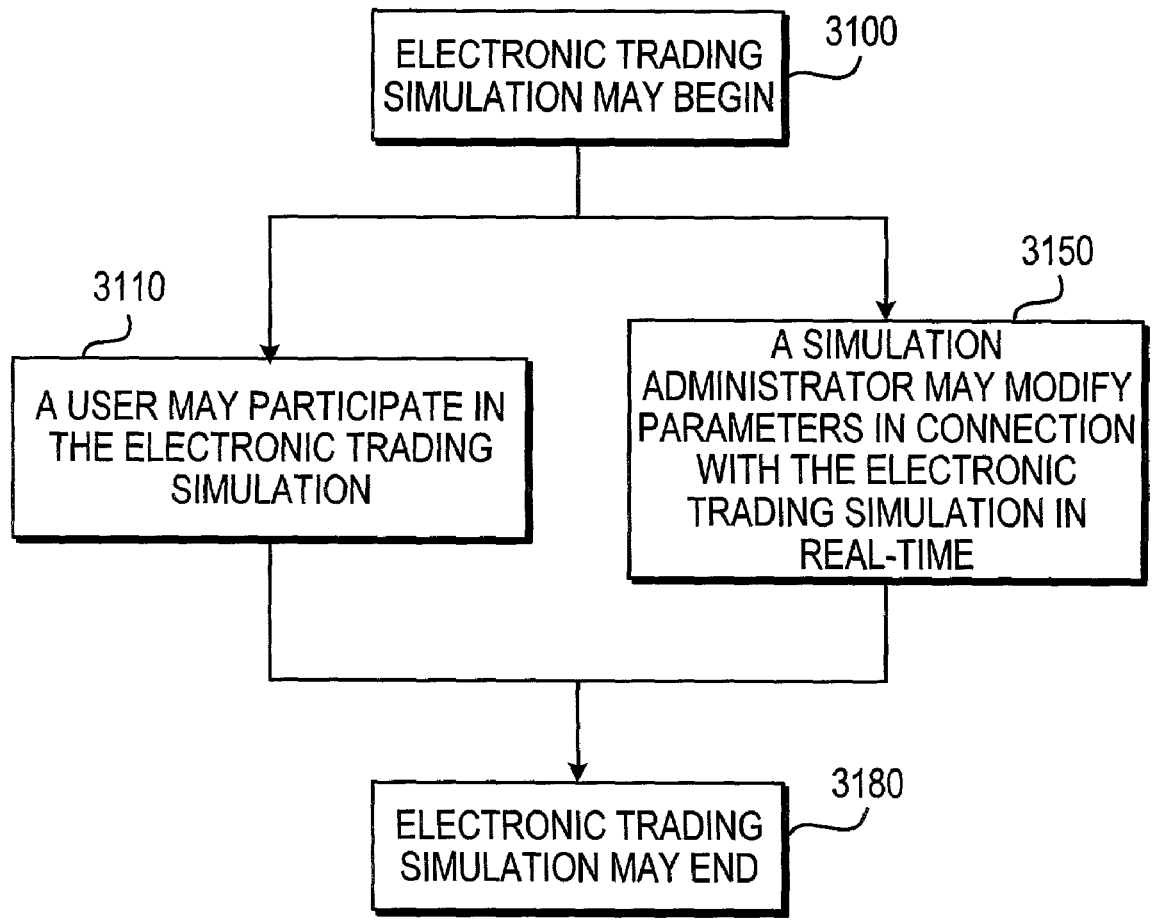
FIG. 35 shows a flow chart of illustrative steps involved in simulating the trading of carbon dioxide equivalent emission reductions in accordance with some embodiments of the present invention.
Figure 36:
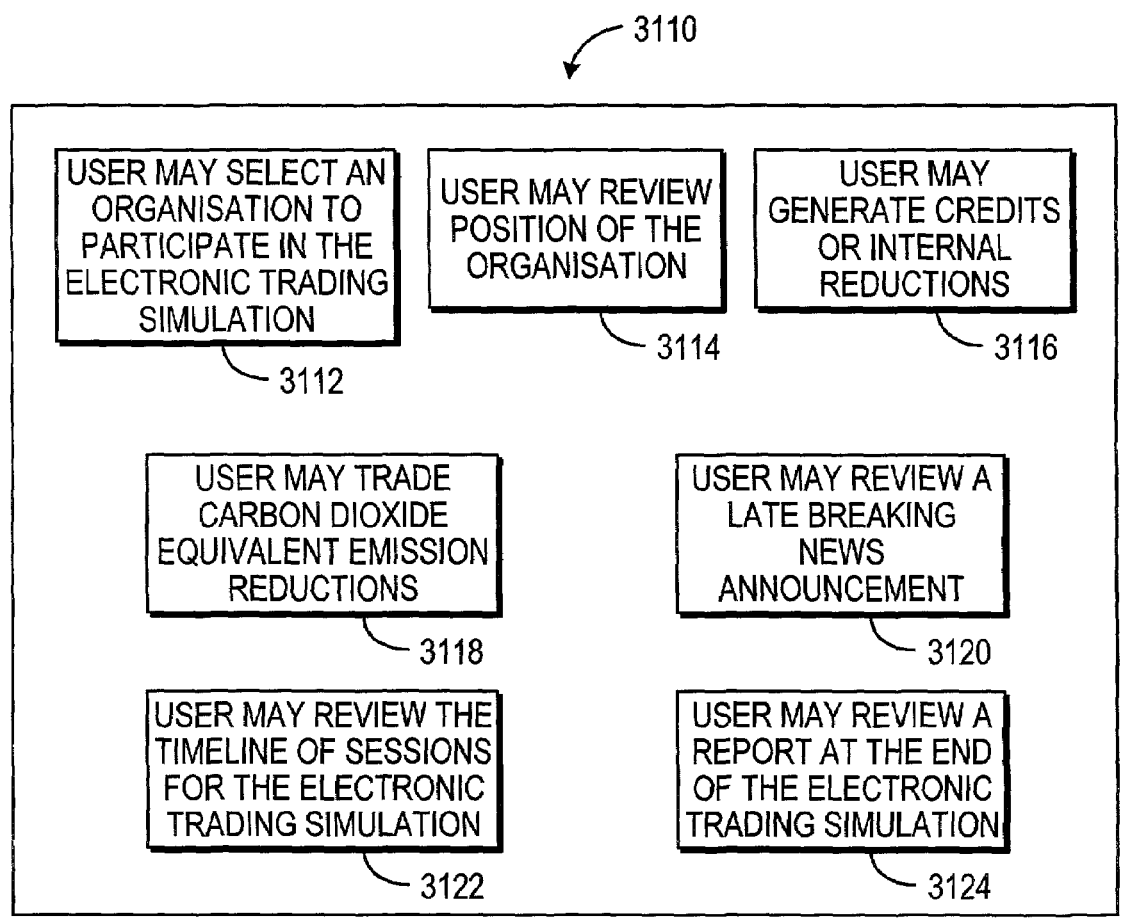
FIG. 36 shows a flow chart of illustrative steps involved in the user's participation in the trading simulation of FIG. 35 in accordance with some embodiments of the present invention.
Figure 37:
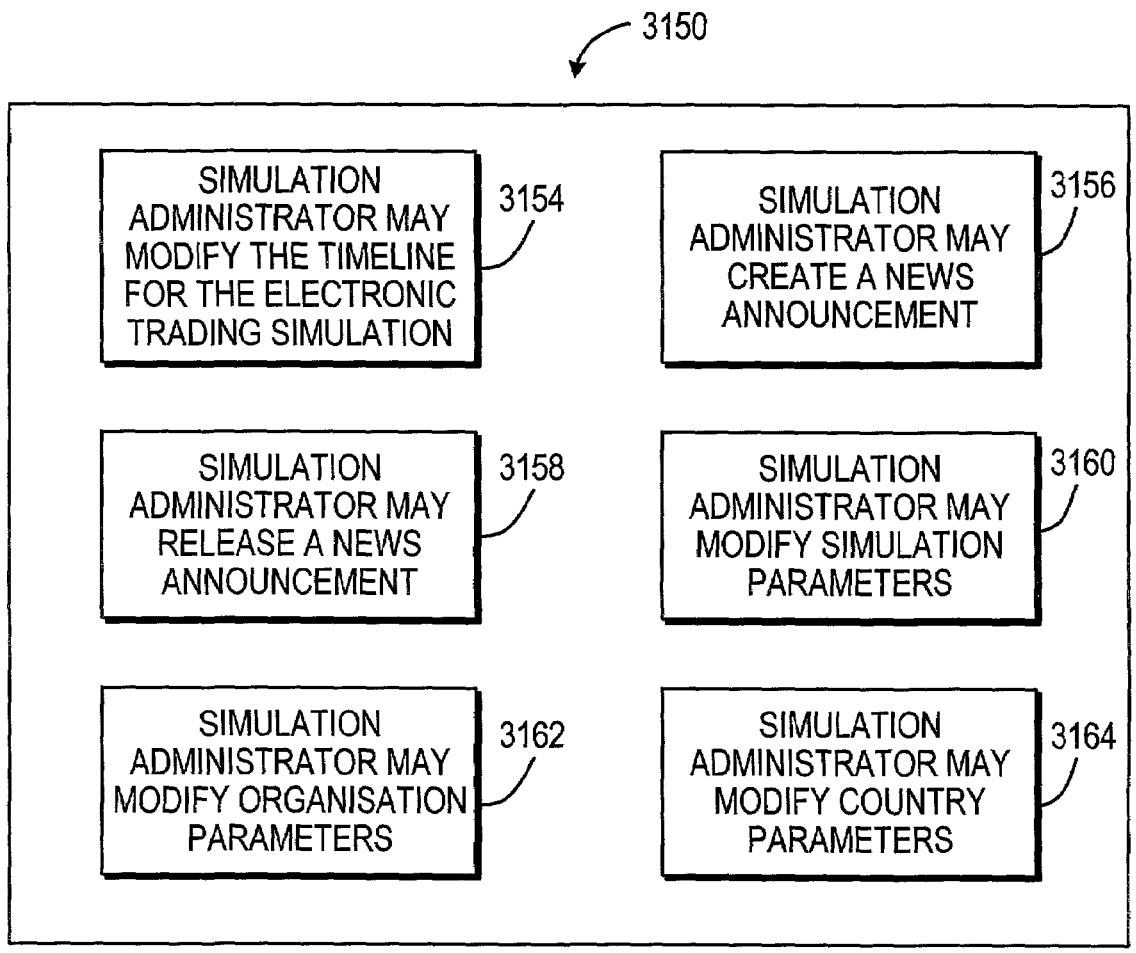
FIG. 37 shows a flow chart of illustrative steps involved in the simulation administrator's maintenance of the trading simulation in real-time of FIG. 35 in accordance with some embodiments of the present invention.

FIGS. 35-37 show flow charts of illustrative steps involved in simulating the trading of carbon dioxide equivalent emission reductions in accordance with the present invention. Some or all of the steps may be performed.

FIG. 35 shows a flow chart of illustrative steps involved in the electronic trading simulation in accordance with some embodiments of the present invention. At step 3100, the electronic trading simulation may begin. For example, the electronic trading simulation may begin when a user or a simulation administrator selects run button 606 of FIG. 7. Following the start of the electronic trading simulation, at step 3110a user may participate in the electronic trading simulation. The user may participate in the electronic trading simulation by interacting with the screens shown in FIGS. 9-21. At step 3150, a simulation administrator may modify parameters in connection with the electronic trading simulation in real-time. For example, the simulation administrator may modify parameters in connection with the electronic trading simulation by interacting with the screens shown in FIGS. 22-34. At step 3180, the electronic trading simulation may end.

FIG. 36 shows a flow chart of illustrative steps involved in a user's participation in the electronic trading simulation (e.g., step 3110 of FIG. 35) in accordance with some embodiments of the present invention. At step 3112, the user may select an organisation to participate in the trading simulation. An illustrative example of step 3112 is shown in organisation menu screen 800 of FIG. 9 and organisation review screen 900 of FIG. 10.

At step 3114, the user may review The position of the organisation. An illustrative example of step 3114 is shown in position review screen 1000 of FIG. 11 and graphing screen 1100 of FIG. 12. At step 3116, the user may generate credits or internal reductions. An illustrative example of step 3116 is shown in origination screen 1200 of FIG. 13 and graphing screen 1300 of FIG. 14. At step 3118, the user may trade carbon dioxide equivalent emission reductions. An illustrative example of step 3118 is shown in trading screen 1400 of FIG. 15. At step 3120, the user may review a late breaking news announcement. An illustrative example of step 3120 is shown in position review screen 1500 of FIG. 16 and news screen 1600 of FIG. 17.

At step 3122, the user may review the timeline of sessions for the electronic trading simulation. An illustrative example of step 3122 is shown in timeline screen 1700 of FIG. 18. At step 3124, the user may review a report at the end of the electronic trading simulation. An illustrative example of step 3124 is shown in the simulation report screen illustrated in FIGS. 19 and 20.

FIG. 37 shows a flow chart of illustrative steps involved in the simulation administrator's maintenance of the electronic trading simulation in real-time (e.g., step 3150 of FIG. 35) in accordance with some embodiments of the present invention. At step 3154, the simulation administrator may modify the timeline for the electronic trading simulation. An illustrative example of step 3154 is shown in real times maintenance screen 2000 of FIG. 22. At step 3156, the simulation administrator may create a news announcement. An illustrative example of step 3156 is shown in news article creation screen 2200 of FIG. 24.

At step 3158, the simulation administrator may release a news announcement. An illustrative example of step 3158 is shown in customise simulation news screen 2100 of FIG. 23. At step 3160, the simulation administrator may modify simulation parameters. An illustrative example of step 3160 is shown in simulation maintenance screen 2400 of FIG. 26 and simulation parameter edit screen 2500 of FIG. 27. At step 3162, the simulation administrator may modify organisation parameters. An illustrative example of step 3162 is shown in organisation maintenance screen 2600 of FIG. 28, organisation details screen 2700 of FIG. 29, the cost curve maintenance screen illustrated in FIGS. 30 and 31, and the yearly values maintenance screen illustrated in FIGS. 32 and 33. At step 3164, the simulation administrator may modify country parameters. An illustrative example of this step is shown in country maintenance screen 3000 of FIG. 34.

Thus, an electronic trading system for simulating the trading of carbon dioxide equivalent emission reductions and methods of use are provided. One skilled in the art will realize that the present invention can be practiced by other than the described embodiments, which are presented for purposes of illustration and not of limitation, and that the present invention is limited only by the claims which follow.

What is claimed is:

1. An apparatus comprising a computing device programmed to:
   store for a computer-based representation of a first entity an amount of available cash;
   receive from an administrator a representation of a marginal abatement cost curve, in which the marginal abatement cost curve comprises an indication of an amount of money for the first entity to produce internal reductions of carbon dioxide equivalent emissions;
   based on a request received from a first user, generate for the first entity a computer-based representation of a volume of internal reductions of carbon dioxide equivalent emissions that the first entity may produce;
   calculate, based on the marginal abatement cost curve, a cost for the generated volume of internal reductions of carbon dioxide equivalent emissions;

based on the cost for the generated volume of internal reductions of carbon dioxide equivalent emissions, decrease for the first entity the amount of available cash;

based on a command received from the first user, purchase for the first entity credits of carbon dioxide equivalent emission reductions;

based on the purchased credits of carbon dioxide equivalent emission reductions, decrease for the first entity the amount of available cash; and cause the amount of available cash for the first entity to be displayed to the first user.

2. The apparatus of claim 1, in which the computing device is further programmed to:

store for a computer-based representation of a second entity an amount of available cash;

receive from the administrator a representation of a supply cost curve, in which the supply cost curve comprises an indication of an amount of money for the second entity to produce reductions of carbon dioxide equivalent emissions, in which the reductions of carbon dioxide equivalent emissions produced by the second entity result in credits of carbon dioxide equivalent emission reductions that may be traded by the second entity;

based on a request received from a second user, generate for the second entity a computer-based representation of a volume of credits of carbon dioxide equivalent emission reductions;

calculate, based on the supply cost curve, a cost for the generated volume of credits of carbon dioxide equivalent emission reductions;

based on the cost for the generated volume of credits of carbon dioxide equivalent emission reductions, decrease for the second entity the amount of available cash;

based on a command received from the second user, sell for the second entity at least a portion of the generated volume of credits of carbon dioxide equivalent emission reductions;

based on the sale of the at least portion of the generated volume of credits of carbon dioxide equivalent emission reductions, increase for the second entity the amount of available cash; and cause the amount of available cash for the second entity to be displayed to the second user.

3. The apparatus of claim 2, in which the first user and the second user are permitted to trade credits of carbon dioxide equivalent emission reductions during at least one trading session, in which the trading session comprises a duration of time; and in which the computing device is further programmed, in response to an indication received from the administrator, to modify the duration of time.

4. The apparatus of claim 3, in which the computing device is further programmed to modify the duration of time during the trading session.

5. The apparatus of claim 2, in which the computing device is further programmed to:

store a volume of credits of carbon dioxide equivalent emission reductions owned by the first entity;

store a volume of credits of carbon dioxide equivalent emission reductions owned by the second entity;

receive from the administrator a simulated event; and change, based on the simulated event, at least one of:

the volume of credits of carbon dioxide equivalent emission reductions owned by the first entity, and the volume of credits of carbon dioxide equivalent emission reductions owned by the second entity.

6. The apparatus of claim 5, in which the simulated event comprises a simulated news announcement.

7. The apparatus of claim 6, in which the computing device is further programmed to cause the simulated news announcement to be displayed to at least one of the first user and the second user.

8. The apparatus of claim 6, in which the computing device is further programmed to:

upon receiving the simulated news announcement from the administrator, store the simulated news announcement, in which the simulated news announcement comprises a release time specified by the administrator; and cause the simulated news announcement to be displayed to at least one of the first user and the second user at the release time.

9. The apparatus of claim 6, in which the computing device is further programmed to:

cause an interface screen to be presented to the administrator, in which the interface screen includes at least one field for creating the simulated news announcement; and receive from the administrator a value for the at least one field.

10. The apparatus of claim 9, in which the at least one field comprises an amount by which the at least one of the volume of credits of carbon dioxide equivalent emission reductions owned by the first entity, and the volume of credits of carbon dioxide equivalent emission reductions owned by the second entity should change.

11. The apparatus of claim 2, in which the computing device is further programmed to:

receive from the administrator a change to the marginal abatement cost curve;

based on another request received from the first user, generate for the first entity a computer-based representation of an additional volume of internal reductions of carbon dioxide equivalent emissions that the first entity may produce;

calculate, based on the changed marginal abatement cost curve, a cost for the additional generated volume of internal reductions of carbon dioxide equivalent emissions; and based on the cost for the additional generated volume of internal reductions of carbon dioxide equivalent emissions, decrease for the first entity the amount of available cash.

12. The apparatus of claim 11, in which the computing device is further programmed to:

receive from the administrator a change to the supply cost curve;

based on another request received from the second user, generate for the second entity a computer-based representation of an additional volume of credits of carbon dioxide equivalent emission reductions;

calculate, based on the changed supply cost curve, a cost for the additional generated volume of credits of carbon dioxide equivalent emission reductions; and based on the cost for the additional generated volume of credits of carbon dioxide equivalent emission reductions, decrease for the second entity the amount of available cash.

13. The apparatus of claim 2, in which command received from the first user comprises at least one of:

a bid to buy credits of carbon dioxide equivalent emission reductions, and a trade to buy credits of carbon dioxide equivalent emission reductions; and in which the command received from the second user comprises at least one of:
an offer to sell credits of carbon dioxide equivalent emission reductions, and
a trade to sell credits of carbon dioxide equivalent emission reductions.

14. The apparatus of claim 1, in which the computing device is further programmed to:
receive from the first user a request to form the first entity; and
in response to the request, form the computer-based representation of the first entity.

15. The apparatus of claim 1, in which the computing device is further programmed to:
receive from the first user a request to review a position of the first entity; and
in response to the request, cause to be displayed to the first user an interface screen in which the interface screen comprises:
a first value representing a volume of carbon dioxide equivalent emissions emitted by the first entity;
a second value representing at least a portion of the generated volume of internal reductions of carbon dioxide equivalent emissions; and
a third value representing at least a portion of a volume of credits of carbon dioxide equivalent emission reductions owned by the first entity.

16. The apparatus of claim 1, in which the computing device is further programmed to:
receive from the first user a request to review a simulated news announcement; and
in response to the request, cause the simulated news announcement to be displayed to the first user.

17. The apparatus of claim 1,
in which the first user is permitted to trade credits of carbon dioxide equivalent emission reductions during trading sessions; and
in which the computing device is further programmed to:
receive from the first user a request to review a timeline of trading sessions; and
in response to the request, cause to be displayed to the first user an interface screen in which the interface screen comprises:
an indication of a first trading session, in which the indication of the first trading session comprises a start time, an end time, and a designation that the first trading session has completed; and
an indication of a second trading session in which the indication of second trading session comprises a start time, an end time, and a designation that the second trading session is executing.

18. The apparatus of claim 1,
in which the first user is permitted to trade credits of carbon dioxide equivalent emission reductions during trading sessions; and
in which the computing device is further programmed to:
receive from the first user a request to review a report at an end of a trading of credits; and
in response to the request, cause to be displayed to the first user an interface screen in which the interface screen comprises:
an indication of a first trading session, in which the first trading session comprises a volume of credits of carbon dioxide equivalent emission reductions purchased by the first user for the first entity during the first trading session; and
an indication of a second trading session, in which the second trading session comprises a volume of credits of carbon dioxide equivalent emission reductions purchased by the first user for the first entity during the second trading session.

19. The apparatus of claim 1, in which the computing device is further programmed to:
store a volume of credits of carbon dioxide equivalent emission reductions owned by the first entity; and
receive from the administrator a simulated event in which the simulated event causes a monetary value of at least a portion of the volume of credits of carbon dioxide equivalent emission reductions owned by the first entity to change.

20. The apparatus of claim 19,
in which the volume of credits of carbon dioxide equivalent emission reductions owned by the first entity comprises a volume of allowances of carbon dioxide equivalent emissions;
in which the volume of allowances of carbon dioxide equivalent emissions comprises a volume of carbon dioxide equivalent emissions the first entity is allowed to release; and
in which the at least portion of the volume of credits for which the monetary value changes comprises the volume of allowances of carbon dioxide equivalent emissions.

21. The apparatus of claim 1, in which the computing device is further programmed to:
store a volume of credits of carbon dioxide equivalent emission reductions owned by the first entity;
receive from the administrator a simulated event; and
change, based on the simulated event, the volume of credits of carbon dioxide equivalent emission reductions owned by the first entity.

22. The apparatus of claim 21,
in which the volume of credits of carbon dioxide equivalent emission reductions owned by the first entity comprises a volume of allowances of carbon dioxide equivalent emissions;
in which the volume of allowances of carbon dioxide equivalent emissions comprises a volume of carbon dioxide equivalent emissions the first entity is allowed to release; and
in which to change the volume of credits comprises to change the volume of allowances of carbon dioxide equivalent emissions.

23. The apparatus of claim 1, in which the computing device is further programmed to:
receive from the administrator a representation of an interest rate for borrowing money;
add to the amount of available cash for the first entity a loan to cover at least one of:
the cost for the generated volume of internal reductions of carbon dioxide equivalent emissions, and
the purchased credits of carbon dioxide equivalent emission reductions; and
charge the first entity a cost for the loan based on the interest rate.

24. The apparatus of claim 1, in which the first entity comprises a country.

25. The apparatus of claim 1, in which the computing device is further programmed to:
receive from the first user a request to review a position of the first entity; and
in response to the request, cause to be displayed to the first user an interface screen in which the interface screen comprises a value representing a compliance requirement for the first entity, in which the compliance requirement comprises a difference between a volume of carbon dioxide equivalent emissions emitted by the first entity and a combination of at least a portion of the generated volume of internal reductions of carbon dioxide equivalent emissions and at least portion of a volume of credits of carbon dioxide equivalent emission reductions owned by the first entity.

26. The apparatus of claim 25, in which the at least portion of the volume of credits of carbon dioxide equivalent emission reductions owned by the first entity comprises a volume of allowances of carbon dioxide equivalent emissions, in which the volume of allowances of carbon dioxide equivalent emissions comprises a volume of carbon dioxide equivalent emissions the first entity is allowed to release.

27. The apparatus of claim 26, in which the compliance requirement comprises a volume of carbon dioxide equivalent emission reductions the first entity must achieve to avoid a penalty.

28. The apparatus of claim 27, in which the computing device is further programmed to:
  receive from the administrator a representation of the volume of carbon dioxide equivalent emissions emitted by the first entity; and
  receive from the administrator a representation of the volume of allowances of carbon dioxide equivalent emissions.

29. The apparatus of claim 1, in which the generated volume of internal reductions of carbon dioxide equivalent emissions does not result in credits of carbon dioxide equivalent emission reductions that may be traded by the first entity.

* * * * *